US009553755B2

(12) United States Patent  
Anisimov et al.

(10) Patent No.: US 9,553,755 B2  
(45) Date of Patent: *Jan. 24, 2017

(54) METHOD FOR IMPLEMENTING AND EXECUTING COMMUNICATION CENTER ROUTING STRATEGIES REPRESENTED IN EXTENSIBLE MARKUP LANGUAGE

(75) Inventors: Nikolay Anisimov, Concord, CA (US); Petr Makagon, San Francisco, CA (US); Herbert Willi Artur Ristock, Walnut Creek, CA (US); David Anderson, Hillsborough, NC (US); Colin Michael Leonard, Raleigh, NC (US); Yi Zhang, Daly City, CA (US); Vitaliy Teryoshin, Daly City, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 321 days.

This patent is subject to a terminal disclaimer.

(21) Appl. No.: 13/045,220

(22) Filed: Mar. 10, 2011

(65) Prior Publication Data

US 2011/0182418 A1  Jul. 28, 2011

Related U.S. Application Data

(63) Continuation of application No. 11/317,105, filed on Dec. 22, 2005, now Pat. No. 7,907,598, which is a
(Continued)

(51) Int. Cl.
*H04M 3/51* (2006.01)
*H04M 3/523* (2006.01)
(Continued)

(52) U.S. Cl.
CPC ............. *H04L 29/06* (2013.01); *H04L 65/104* (2013.01); *H04L 65/1009* (2013.01);
(Continued)

(58) Field of Classification Search
CPC .... H04M 3/51; H04M 3/42323; H04M 3/523; H04M 7/006; H04M 7/1255; H04L 29/06; H04L 29/06027; H04L 65/1043; H04L 65/104; H04L 65/1009; H04Q 3/64; H04Q 2213/13034; H04Q 2213/1307; H04Q 2213/13097; H04Q 2213/13196; H04Q 2213/13204; H04Q 2213/1322; H04Q 2213/13389
(Continued)

(56) References Cited

U.S. PATENT DOCUMENTS 3,914,559 A    10/1975  Knollman
4,048,452 A    9/1977   Oehring et al.
(Continued)

FOREIGN PATENT DOCUMENTS

AT    270486    7/2004
AT    281039    11/2004
(Continued)

OTHER PUBLICATIONS

"Competitive Gateway Product," Nikkei Communications, Japan, No. 257, Nov. 1997, 18 pages.
(Continued)

*Primary Examiner* — Sonia Gay
(74) *Attorney, Agent, or Firm* — Lewis Roca Rothgerber Christie LLP

(57) ABSTRACT

A method is provided for supplementing existing interaction routines in a contact center with added capability including acts for (a) creating at least one rule having at least one rule attribute; (b) creating one or more processes, the processes integral to the rule; (c) defining the at least one rule and integral processes as a strategy; and (d) linking the strategy to the interaction routine, the link serving to cause execution of the strategy during an interaction between an entity and
(Continued)

the routine, execution thereof promoting further interaction defined in the strategy.

17 Claims, 21 Drawing Sheets

Related U.S. Application Data continuation-in-part of application No. 09/827,608, filed on Apr. 6, 2001, now Pat. No. 6,985,478, which is a continuation-in-part of application No. 09/024,923, filed on Feb. 17, 1998, now Pat. No. 8,130,749.

(60) Provisional application No. 60/267,294, filed on Feb. 7, 2001.

(51) Int. Cl.
| | |
|---|---|
| *H04M 3/42* | (2006.01) |
| *H04L 29/06* | (2006.01) |
| *H04L 12/64* | (2006.01) |
| *H04M 7/00* | (2006.01) |
| *H04M 7/12* | (2006.01) |
| *H04Q 3/64* | (2006.01) |

(52) U.S. Cl.
CPC .......... *H04L 65/1043* (2013.01); *H04M 3/51* (2013.01); *H04M 3/523* (2013.01); *H04M 7/006* (2013.01); *H04M 7/1255* (2013.01); *H04Q 3/64* (2013.01); *H04L 29/06027* (2013.01); *H04L 2012/6443* (2013.01); *H04M 3/42323* (2013.01); *H04Q 2213/1307* (2013.01); *H04Q 2213/1322* (2013.01); *H04Q 2213/13034* (2013.01); *H04Q 2213/13097* (2013.01); *H04Q 2213/13196* (2013.01); *H04Q 2213/13204* (2013.01); *H04Q 2213/13389* (2013.01)

(58) Field of Classification Search
USPC .... 379/265.01; 717/106, 114, 115, 136, 137
See application file for complete search history.

(56) References Cited

U.S. PATENT DOCUMENTS

| | | |
|---|---|---|
| 4,056,683 A | 11/1977 | Suehiro |
| 4,290,141 A | 9/1981 | Anderson et al. |
| 4,320,256 A | 3/1982 | Freeman |
| 4,345,315 A | 8/1982 | Cadotte et al. |
| 4,355,207 A | 10/1982 | Curtin |
| 4,355,372 A | 10/1982 | Johnson et al. |
| 4,400,587 A | 8/1983 | Taylor et al. |
| 4,439,636 A | 3/1984 | Newkirk et al. |
| 4,451,700 A | 5/1984 | Kempner et al. |
| 4,489,438 A | 12/1984 | Hughes |
| 4,512,011 A | 4/1985 | Turner |
| 4,517,410 A | 5/1985 | Williams et al. |
| 4,521,643 A | 6/1985 | Dupuis et al. |
| 4,523,055 A | 6/1985 | Hohl et al. |
| 4,528,643 A | 7/1985 | Freeny, Jr. |
| 4,539,435 A | 9/1985 | Eckmann |
| 4,555,903 A | 12/1985 | Heaton |
| 4,558,180 A | 12/1985 | Scordo |
| 4,559,415 A | 12/1985 | Bernard et al. |
| 4,566,030 A | 1/1986 | Nickerson et al. |
| 4,567,323 A | 1/1986 | Lottes et al. |
| 4,577,062 A | 3/1986 | Hilleary et al. |
| 4,577,067 A | 3/1986 | Levy et al. |
| 4,578,700 A | 3/1986 | Roberts et al. |
| 4,580,012 A | 4/1986 | Matthews et al. |
| 4,584,602 A | 4/1986 | Nakagawa |
| 4,587,379 A | 5/1986 | Masuda |
| 4,598,367 A | 7/1986 | DeFrancesco et al. |
| 4,603,232 A | 7/1986 | Kurland et al. |
| 4,611,094 A | 9/1986 | Asmuth et al. |
| 4,625,276 A | 11/1986 | Benton et al. |
| 4,630,200 A | 12/1986 | Ohmae et al. |
| 4,630,201 A | 12/1986 | White |
| 4,634,809 A | 1/1987 | Paulsson et al. |
| 4,649,563 A | 3/1987 | Riskin |
| 4,654,482 A | 3/1987 | DeAngelis |
| 4,667,287 A | 5/1987 | Allen et al. |
| 4,674,044 A | 6/1987 | Kalmus et al. |
| 4,679,189 A | 7/1987 | Olson et al. |
| 4,696,029 A | 9/1987 | Cohen |
| 4,697,282 A | 9/1987 | Winter et al. |
| 4,737,983 A | 4/1988 | Frauenthal et al. |
| 4,756,020 A | 7/1988 | Fodale |
| 4,757,267 A | 7/1988 | Riskin |
| 4,763,191 A | 8/1988 | Gordon et al. |
| 4,763,317 A | 8/1988 | Lehman et al. |
| 4,763,353 A | 8/1988 | Canale et al. |
| 4,771,425 A | 9/1988 | Baran et al. |
| 4,785,408 A | 11/1988 | Britton et al. |
| 4,788,715 A | 11/1988 | Lee |
| 4,811,382 A | 3/1989 | Sleevi |
| 4,812,843 A | 3/1989 | Champion, III et al. |
| 4,829,563 A | 5/1989 | Crockett et al. |
| 4,831,518 A | 5/1989 | Yu et al. |
| 4,852,001 A | 7/1989 | Tsushima et al. |
| 4,866,756 A | 9/1989 | Crane et al. |
| 4,881,261 A | 11/1989 | Oliphant et al. |
| 4,893,328 A | 1/1990 | Peacock |
| 4,896,345 A | 1/1990 | Thorne |
| 4,897,866 A | 1/1990 | Majmudar et al. |
| 4,908,850 A | 3/1990 | Masson et al. |
| 4,924,488 A | 5/1990 | Kosich |
| 4,943,995 A | 7/1990 | Daudelin et al. |
| 4,953,204 A | 8/1990 | Cuschleg, Jr. et al. |
| 4,972,461 A | 11/1990 | Brown et al. |
| 4,994,985 A | 2/1991 | Cree et al. |
| 5,001,710 A | 3/1991 | Gawrys et al. |
| 5,008,930 A | 4/1991 | Gawrys et al. |
| 5,017,917 A | 5/1991 | Fisher et al. |
| 5,020,095 A | 5/1991 | Morganstein et al. |
| 5,036,535 A | 7/1991 | Gechter et al. |
| 5,058,152 A | 10/1991 | Solomon et al. |
| 5,062,103 A | 10/1991 | Davidson et al. |
| 5,073,890 A | 12/1991 | Danielsen |
| 5,095,504 A | 3/1992 | Nishikawa et al. |
| 5,117,225 A | 5/1992 | Wang |
| 5,136,633 A | 8/1992 | Tejada et al. |
| 5,155,761 A | 10/1992 | Hammond |
| 5,164,983 A | 11/1992 | Brown et al. |
| 5,168,515 A | 12/1992 | Gechter et al. |
| 5,175,800 A | 12/1992 | Galis et al. |
| 5,179,589 A | 1/1993 | Syu |
| 5,181,236 A | 1/1993 | LaVallee et al. |
| 5,181,239 A | 1/1993 | Jolissaint |
| 5,185,782 A | 2/1993 | Srinivasan |
| 5,202,828 A | 4/1993 | Vertelney et al. |
| 5,206,903 A | 4/1993 | Kohler et al. |
| 5,208,745 A | 5/1993 | Quentin et al. |
| 5,212,727 A | 5/1993 | Ramkumar |
| 5,214,688 A | 5/1993 | Szlam et al. |
| 5,231,670 A | 7/1993 | Goldhor et al. |
| 5,247,569 A | 9/1993 | Cave |
| 5,249,223 A | 9/1993 | Vanacore |
| 5,253,288 A | 10/1993 | Frey et al. |
| 5,256,863 A | 10/1993 | Ferguson et al. |
| 5,261,096 A | 11/1993 | Howarth |
| 5,271,058 A | 12/1993 | Andrews et al. |
| 5,274,635 A | 12/1993 | Rahman et al. |
| 5,274,700 A | 12/1993 | Gechter et al. |
| 5,274,782 A | 12/1993 | Chalasani et al. |
| 5,278,898 A | 1/1994 | Cambray et al. |
| 5,278,977 A | 1/1994 | Spencer et al. |
| 5,280,625 A | 1/1994 | Howarter et al. |
| 5,283,638 A | 2/1994 | Engberg et al. |
| 5,283,856 A | 2/1994 | Gross et al. |
| 5,285,494 A | 2/1994 | Sprecher et al. |
| 5,288,147 A | 2/1994 | Schaefer et al. |

(56) References Cited

U.S. PATENT DOCUMENTS

| | | | |
|---|---|---|---|
| 5,291,550 A | 3/1994 | Levy et al. |
| 5,291,551 A | 3/1994 | Conn et al. |
| 5,291,552 A | 3/1994 | Kerrigan et al. |
| 5,299,259 A | 3/1994 | Otto |
| 5,299,260 A | 3/1994 | Shaio |
| 5,301,320 A | 4/1994 | McAtee et al. |
| 5,309,505 A | 5/1994 | Szlam et al. |
| 5,311,574 A | 5/1994 | Livanos |
| 5,311,583 A | 5/1994 | Friedes et al. |
| 5,315,709 A | 5/1994 | Alston, Jr. et al. |
| 5,327,486 A | 7/1994 | Wolff et al. |
| 5,329,583 A | 7/1994 | Jurgensen et al. |
| 5,333,266 A | 7/1994 | Boaz et al. |
| 5,335,268 A | 8/1994 | Kelly, Jr. et al. |
| 5,335,269 A | 8/1994 | Steinlicht |
| 5,343,477 A | 8/1994 | Yamada |
| 5,343,518 A | 8/1994 | Kneipp |
| 5,355,474 A | 10/1994 | Thuraisngham et al. |
| 5,359,649 A | 10/1994 | Rosu et al. |
| 5,363,507 A | 11/1994 | Nakayama et al. |
| 5,367,329 A | 11/1994 | Nakagaki et al. |
| 5,369,695 A | 11/1994 | Chakravarti et al. |
| 5,384,766 A | 1/1995 | Yamato et al. |
| 5,384,771 A | 1/1995 | Isidoro et al. |
| 5,384,829 A | 1/1995 | Heileman, Jr. et al. |
| 5,384,841 A | 1/1995 | Adams et al. |
| 5,392,277 A | 2/1995 | Bernstein |
| 5,392,328 A | 2/1995 | Schmidt et al. |
| 5,392,345 A | 2/1995 | Otto |
| 5,392,400 A | 2/1995 | Berkowitz et al. |
| 5,402,474 A | 3/1995 | Miller et al. |
| 5,414,762 A | 5/1995 | Flisik et al. |
| 5,422,813 A | 6/1995 | Schuchman et al. |
| 5,425,091 A | 6/1995 | Josephs |
| 5,425,093 A | 6/1995 | Trefzger |
| 5,426,594 A | 6/1995 | Wright et al. |
| 5,428,608 A | 6/1995 | Freeman et al. |
| 5,436,965 A | 7/1995 | Grossman et al. |
| 5,436,967 A | 7/1995 | Hanson |
| 5,440,719 A | 8/1995 | Hanes et al. |
| 5,444,767 A | 8/1995 | Goetcheus et al. |
| 5,444,774 A | 8/1995 | Friedes |
| 5,444,823 A | 8/1995 | Nguyen |
| 5,450,482 A | 9/1995 | Chen et al. |
| 5,450,483 A | 9/1995 | Williams |
| 5,452,350 A | 9/1995 | Reynolds et al. |
| 5,455,903 A | 10/1995 | Jolissaint et al. |
| 5,459,780 A | 10/1995 | Sand |
| 5,463,685 A | 10/1995 | Gaechter et al. |
| 5,465,286 A | 11/1995 | Clare et al. |
| 5,467,391 A | 11/1995 | Donaghue, Jr. et al. |
| 5,469,504 A | 11/1995 | Blaha |
| 5,473,680 A | 12/1995 | Porter |
| 5,475,813 A | 12/1995 | Cieslak et al. |
| 5,479,487 A | 12/1995 | Hammond |
| 5,481,616 A | 1/1996 | Freadman |
| 5,488,648 A | 1/1996 | Womble |
| 5,491,783 A | 2/1996 | Douglas et al. |
| 5,493,564 A | 2/1996 | Mullan |
| 5,495,522 A | 2/1996 | Allen et al. |
| 5,495,523 A | 2/1996 | Stent et al. |
| 5,496,392 A | 3/1996 | Sims et al. |
| 5,497,317 A | 3/1996 | Hawkins et al. |
| 5,497,371 A | 3/1996 | Ellis et al. |
| 5,497,373 A | 3/1996 | Hulen et al. |
| 5,500,891 A | 3/1996 | Harrington et al. |
| 5,506,898 A | 4/1996 | Costantini et al. |
| 5,509,062 A | 4/1996 | Carlsen |
| 5,510,829 A | 4/1996 | Sugiyama et al. |
| 5,511,117 A | 4/1996 | Zazzera |
| 5,517,620 A | 5/1996 | Hashimoto et al. |
| 5,519,773 A | 5/1996 | Dumas et al. |
| 5,524,047 A | 6/1996 | Brown et al. |
| 5,524,147 A | 6/1996 | Bean |
| 5,526,353 A | 6/1996 | Henley et al. |
| 5,528,678 A | 6/1996 | Kaplan |
| 5,530,740 A | 6/1996 | Irribarren et al. |
| 5,530,744 A | 6/1996 | Charalambous et al. |
| 5,533,103 A | 7/1996 | Peavey et al. |
| 5,533,107 A | 7/1996 | Irwin et al. |
| 5,533,108 A | 7/1996 | Harris et al. |
| 5,533,110 A | 7/1996 | Pinard et al. |
| 5,533,115 A | 7/1996 | Hollenbach et al. |
| 5,535,211 A | 7/1996 | Yano |
| 5,535,256 A | 7/1996 | Maloney et al. |
| 5,535,323 A | 7/1996 | Miller et al. |
| 5,537,470 A | 7/1996 | Lee |
| 5,537,630 A | 7/1996 | Berry et al. |
| 5,539,811 A | 7/1996 | Nakamura et al. |
| 5,544,220 A | 8/1996 | Trefzger |
| 5,546,452 A | 8/1996 | Andrews et al. |
| 5,550,816 A | 8/1996 | Hardwick et al. |
| 5,553,133 A | 9/1996 | Perkins |
| 5,555,299 A | 9/1996 | Maloney et al. |
| 5,555,426 A | 9/1996 | Johnson et al. |
| 5,557,667 A | 9/1996 | Bruno et al. |
| 5,559,868 A | 9/1996 | Blonder |
| 5,559,877 A | 9/1996 | Ash et al. |
| 5,559,878 A | 9/1996 | Keys et al. |
| 5,561,711 A | 10/1996 | Muller |
| 5,561,841 A | 10/1996 | Markus |
| 5,563,805 A | 10/1996 | Arbuckle et al. |
| 5,563,937 A | 10/1996 | Bruno et al. |
| 5,566,294 A | 10/1996 | Kojima et al. |
| 5,570,419 A | 10/1996 | Cave et al. |
| 5,570,420 A | 10/1996 | Bress et al. |
| 5,572,579 A | 11/1996 | Orriss et al. |
| 5,572,643 A | 11/1996 | Judson |
| 5,577,100 A | 11/1996 | McGregor et al. |
| 5,577,105 A | 11/1996 | Baum et al. |
| 5,583,862 A | 12/1996 | Callon |
| 5,583,922 A | 12/1996 | Davis et al. |
| 5,590,188 A | 12/1996 | Crockett |
| 5,592,542 A | 1/1997 | Honda et al. |
| 5,592,543 A | 1/1997 | Smith et al. |
| 5,594,791 A | 1/1997 | Szlam et al. |
| 5,598,532 A | 1/1997 | Liron |
| 5,604,737 A | 2/1997 | Iwami et al. |
| 5,606,602 A | 2/1997 | Johnson et al. |
| 5,608,778 A | 3/1997 | Partridge, III |
| 5,608,786 A | 3/1997 | Gordon |
| 5,610,910 A | 3/1997 | Focsaneanu et al. |
| 5,617,570 A | 4/1997 | Russell et al. |
| 5,619,183 A | 4/1997 | Ziegra et al. |
| 5,619,557 A | 4/1997 | Van Berkum |
| 5,619,648 A | 4/1997 | Canale et al. |
| 5,621,789 A | 4/1997 | McCalmont et al. |
| 5,621,790 A | 4/1997 | Grossman et al. |
| 5,623,600 A | 4/1997 | Ji et al. |
| 5,624,265 A | 4/1997 | Redford et al. |
| 5,625,404 A | 4/1997 | Grady et al. |
| 5,625,676 A | 4/1997 | Greco et al. |
| 5,625,682 A | 4/1997 | Gray et al. |
| 5,627,764 A | 5/1997 | Schutzman et al. |
| 5,627,884 A | 5/1997 | Williams et al. |
| 5,630,127 A | 5/1997 | Moore et al. |
| 5,632,011 A | 5/1997 | Landfield et al. |
| 5,633,920 A | 5/1997 | Kikinis et al. |
| 5,633,924 A | 5/1997 | Kaish et al. |
| 5,635,918 A | 6/1997 | Tett |
| 5,640,445 A | 6/1997 | David |
| 5,642,411 A | 6/1997 | Theis |
| 5,642,477 A | 6/1997 | de Carmo et al. |
| 5,642,511 A | 6/1997 | Chow et al. |
| 5,644,720 A | 7/1997 | Boll et al. |
| 5,646,981 A | 7/1997 | Klein |
| 5,649,105 A | 7/1997 | Aldred et al. |
| 5,652,785 A | 7/1997 | Richardson, Jr. et al. |
| 5,652,789 A | 7/1997 | Miner et al. |
| 5,652,791 A | 7/1997 | Sunderman et al. |
| 5,654,961 A | 8/1997 | Araujo et al. |
| 5,655,015 A | 8/1997 | Walsh et al. |
| 5,657,383 A | 8/1997 | Gerber et al. |
| 5,659,542 A | 8/1997 | Bell et al. |

(56) References Cited

U.S. PATENT DOCUMENTS

| | | |
|---|---|---|
| 5,659,604 A | 8/1997 | Beckmann |
| 5,659,746 A | 8/1997 | Bankert et al. |
| 5,673,304 A | 9/1997 | Connor et al. |
| 5,673,311 A | 9/1997 | Andruska et al. |
| 5,673,322 A | 9/1997 | Pepe et al. |
| 5,675,637 A | 10/1997 | Szlam et al. |
| 5,684,870 A | 11/1997 | Maloney et al. |
| 5,689,229 A | 11/1997 | Chaco et al. |
| 5,692,033 A | 11/1997 | Farris |
| 5,696,809 A | 12/1997 | Voit |
| 5,696,811 A | 12/1997 | Maloney et al. |
| 5,701,400 A | 12/1997 | Amado |
| 5,703,943 A | 12/1997 | Otto |
| 5,706,453 A | 1/1998 | Cheng et al. |
| 5,708,702 A | 1/1998 | De Paul et al. |
| 5,712,901 A | 1/1998 | Meermans |
| 5,715,306 A | 2/1998 | Sunderman et al. |
| 5,715,307 A | 2/1998 | Zazzera |
| 5,715,432 A | 2/1998 | Xu et al. |
| 5,717,747 A | 2/1998 | Boyle, III et al. |
| 5,721,770 A | 2/1998 | Kohler |
| 5,724,412 A | 3/1998 | Srinivasan |
| 5,724,418 A | 3/1998 | Brady |
| 5,726,984 A | 3/1998 | Kubler et al. |
| 5,727,159 A | 3/1998 | Kikinis |
| 5,729,594 A | 3/1998 | Klingman |
| 5,732,078 A | 3/1998 | Arango |
| 5,734,981 A | 3/1998 | Kennedy, III et al. |
| 5,737,495 A | 4/1998 | Adams et al. |
| 5,737,595 A | 4/1998 | Cohen et al. |
| 5,737,726 A | 4/1998 | Cameron et al. |
| 5,737,727 A | 4/1998 | Lehmann et al. |
| 5,740,238 A | 4/1998 | Flockhart et al. |
| 5,740,240 A | 4/1998 | Jolissaint |
| 5,742,668 A | 4/1998 | Pepe et al. |
| 5,742,670 A | 4/1998 | Bennett |
| 5,742,675 A | 4/1998 | Kilander et al. |
| 5,742,905 A | 4/1998 | Pepe et al. |
| 5,745,687 A | 4/1998 | Randell |
| 5,745,878 A | 4/1998 | Hashimoto et al. |
| 5,748,884 A | 5/1998 | Royce et al. |
| 5,748,907 A | 5/1998 | Crane |
| 5,751,706 A | 5/1998 | Land et al. |
| 5,751,707 A | 5/1998 | Voit et al. |
| 5,751,795 A | 5/1998 | Hassler et al. |
| 5,752,059 A | 5/1998 | Holleran et al. |
| 5,752,244 A | 5/1998 | Rose et al. |
| 5,752,246 A | 5/1998 | Rogers et al. |
| 5,754,111 A | 5/1998 | Garcia |
| 5,754,636 A | 5/1998 | Bayless et al. |
| 5,754,639 A | 5/1998 | Flockhart et al. |
| 5,754,655 A | 5/1998 | Hughes et al. |
| 5,757,904 A | 5/1998 | Anderson |
| 5,760,823 A | 6/1998 | Brunson et al. |
| 5,761,289 A | 6/1998 | Keshav |
| 5,764,736 A | 6/1998 | Shachar et al. |
| 5,764,898 A | 6/1998 | Tsuji et al. |
| 5,765,033 A | 6/1998 | Miloslavsky |
| 5,768,360 A | 6/1998 | Reynolds et al. |
| 5,768,527 A | 6/1998 | Zhu et al. |
| 5,774,583 A | 6/1998 | Sasaki et al. |
| 5,778,060 A | 7/1998 | Otto |
| 5,778,178 A | 7/1998 | Arunachalam |
| 5,778,377 A | 7/1998 | Marlin et al. |
| 5,784,438 A | 7/1998 | Martinez |
| 5,784,451 A | 7/1998 | Smith, Jr. |
| 5,784,452 A | 7/1998 | Carney |
| 5,787,160 A | 7/1998 | Chaney et al. |
| 5,787,163 A | 7/1998 | Taylor et al. |
| 5,790,635 A | 8/1998 | Dezonno |
| 5,790,650 A | 8/1998 | Dunn et al. |
| 5,790,789 A | 8/1998 | Suarez |
| 5,790,798 A | 8/1998 | Beckett, II et al. |
| 5,793,857 A | 8/1998 | Barnes et al. |
| 5,793,861 A | 8/1998 | Haigh |
| 5,794,039 A | 8/1998 | Guck |
| 5,796,398 A | 8/1998 | Zimmer |
| 5,796,729 A | 8/1998 | Greaney et al. |
| 5,796,791 A | 8/1998 | Polcyn |
| 5,796,813 A | 8/1998 | Sonnenberg |
| 5,799,067 A | 8/1998 | Kikinis et al. |
| 5,799,297 A | 8/1998 | Goodridge et al. |
| 5,802,163 A | 9/1998 | Miloslavsky |
| 5,802,253 A | 9/1998 | Gross et al. |
| 5,802,283 A | 9/1998 | Grady et al. |
| 5,802,314 A | 9/1998 | Tullis et al. |
| 5,802,316 A | 9/1998 | Ito et al. |
| 5,802,493 A | 9/1998 | Sheflott et al. |
| 5,802,526 A | 9/1998 | Fawcett et al. |
| 5,805,587 A | 9/1998 | Norris et al. |
| 5,806,061 A | 9/1998 | Chaudhuri et al. |
| 5,809,128 A | 9/1998 | McMullin |
| 5,809,282 A | 9/1998 | Cooper et al. |
| 5,809,512 A | 9/1998 | Kato |
| 5,812,795 A | 9/1998 | Horovitz et al. |
| 5,813,014 A | 9/1998 | Gustman |
| 5,815,566 A | 9/1998 | Ramot et al. |
| 5,818,935 A | 10/1998 | Maa |
| 5,822,306 A | 10/1998 | Catchpole |
| 5,822,400 A | 10/1998 | Smith |
| 5,822,404 A | 10/1998 | Cave |
| 5,822,526 A | 10/1998 | Waskiewicz |
| 5,825,775 A | 10/1998 | Chin et al. |
| 5,825,862 A | 10/1998 | Voit et al. |
| 5,825,869 A | 10/1998 | Brooks et al. |
| 5,825,870 A | 10/1998 | Miloslavsky |
| 5,826,040 A | 10/1998 | Fargher et al. |
| 5,826,269 A | 10/1998 | Hussey |
| 5,828,747 A | 10/1998 | Fisher et al. |
| 5,828,839 A | 10/1998 | Moncreiff |
| 5,831,611 A | 11/1998 | Kennedy et al. |
| 5,832,196 A | 11/1998 | Croslin et al. |
| 5,835,090 A | 11/1998 | Clark et al. |
| 5,835,583 A | 11/1998 | Hetz et al. |
| 5,838,682 A | 11/1998 | Dekelbaum et al. |
| 5,838,768 A | 11/1998 | Sumar et al. |
| 5,838,773 A | 11/1998 | Eisner et al. |
| 5,838,774 A | 11/1998 | Weisser, Jr. |
| 5,841,854 A | 11/1998 | Schumacher et al. |
| 5,842,131 A | 11/1998 | Yamane |
| 5,844,980 A | 12/1998 | Patel et al. |
| 5,844,982 A | 12/1998 | Knitl |
| 5,847,484 A | 12/1998 | Kuyama et al. |
| 5,848,131 A | 12/1998 | Shaffer et al. |
| 5,848,143 A | 12/1998 | Andrews et al. |
| 5,850,433 A | 12/1998 | Rondeau |
| 5,852,814 A | 12/1998 | Allen |
| 5,857,184 A | 1/1999 | Lynch |
| 5,862,134 A | 1/1999 | Deng |
| 5,862,211 A | 1/1999 | Roush |
| 5,862,223 A | 1/1999 | Walker et al. |
| 5,864,616 A | 1/1999 | Hartmeier |
| 5,864,848 A | 1/1999 | Horvitz et al. |
| 5,867,484 A | 2/1999 | Shaunfield |
| 5,867,494 A | 2/1999 | Krishnaswamy et al. |
| 5,867,495 A | 2/1999 | Elliott et al. |
| 5,867,559 A | 2/1999 | Jorgensen et al. |
| 5,867,562 A | 2/1999 | Scherer |
| 5,867,822 A | 2/1999 | Sankar |
| 5,870,464 A | 2/1999 | Brewster et al. |
| 5,870,549 A | 2/1999 | Bobo, II |
| 5,872,841 A | 2/1999 | King et al. |
| 5,872,926 A | 2/1999 | Levac et al. |
| 5,873,032 A | 2/1999 | Cox et al. |
| 5,873,040 A | 2/1999 | Dunn et al. |
| 5,873,076 A | 2/1999 | Barr et al. |
| 5,878,126 A | 3/1999 | Velamuri et al. |
| 5,878,130 A | 3/1999 | Andrews et al. |
| 5,878,230 A | 3/1999 | Weber et al. |
| 5,881,146 A | 3/1999 | Hamilton |
| 5,883,891 A | 3/1999 | Williams et al. |
| 5,884,032 A | 3/1999 | Bateman et al. |
| 5,884,262 A | 3/1999 | Wise et al. |
| 5,887,173 A | 3/1999 | Ogawa et al. |

(56) References Cited

U.S. PATENT DOCUMENTS

| | | |
|---|---|---|
| 5,889,474 A | 3/1999 | LaDue |
| 5,889,774 A | 3/1999 | Mirashrafi et al. |
| 5,889,799 A | 3/1999 | Grossman et al. |
| 5,889,863 A | 3/1999 | Weber |
| 5,892,764 A | 4/1999 | Riemann et al. |
| 5,892,822 A | 4/1999 | Gottlieb et al. |
| 5,893,912 A | 4/1999 | Freund et al. |
| 5,894,512 A | 4/1999 | Zenner |
| 5,896,444 A | 4/1999 | Perlman et al. |
| 5,897,635 A | 4/1999 | Torres et al. |
| 5,901,138 A | 5/1999 | Bader et al. |
| 5,901,203 A | 5/1999 | Morganstein et al. |
| 5,901,209 A | 5/1999 | Tannenbaum et al. |
| 5,903,631 A | 5/1999 | Smith et al. |
| 5,903,877 A | 5/1999 | Berkowitz et al. |
| 5,905,495 A | 5/1999 | Tanaka et al. |
| 5,905,792 A | 5/1999 | Miloslavsky |
| 5,905,793 A | 5/1999 | Flockhart et al. |
| 5,905,863 A | 5/1999 | Knowles et al. |
| 5,907,547 A | 5/1999 | Foladare et al. |
| 5,911,134 A | 6/1999 | Castonguay et al. |
| 5,911,776 A | 6/1999 | Guck |
| 5,914,941 A | 6/1999 | Janky |
| 5,915,001 A | 6/1999 | Uppaluru |
| 5,915,008 A | 6/1999 | Dulman |
| 5,915,011 A | 6/1999 | Miloslavsky |
| 5,915,012 A | 6/1999 | Miloslavsky |
| 5,916,302 A | 6/1999 | Dunn et al. |
| 5,917,817 A | 6/1999 | Dunn et al. |
| 5,917,898 A | 6/1999 | Bassa et al. |
| 5,918,213 A | 6/1999 | Bernard et al. |
| 5,920,621 A | 7/1999 | Gottlieb |
| 5,920,719 A | 7/1999 | Sutton et al. |
| 5,920,865 A | 7/1999 | Ariga |
| 5,923,745 A | 7/1999 | Hurd |
| 5,923,879 A | 7/1999 | Sasmazel et al. |
| 5,926,535 A | 7/1999 | Reynolds |
| 5,926,538 A | 7/1999 | Deryugin et al. |
| 5,926,539 A | 7/1999 | Shtivelman |
| 5,933,492 A | 8/1999 | Turovski |
| 5,937,051 A | 8/1999 | Hurd et al. |
| 5,937,057 A | 8/1999 | Bell et al. |
| 5,937,162 A | 8/1999 | Funk et al. |
| 5,937,388 A | 8/1999 | Davis et al. |
| 5,938,725 A | 8/1999 | Hara |
| 5,940,075 A | 8/1999 | Mutschler, III et al. |
| 5,940,478 A | 8/1999 | Vaudreuil et al. |
| 5,940,479 A | 8/1999 | Guy et al. |
| 5,940,488 A | 8/1999 | DeGrazia et al. |
| 5,940,495 A | 8/1999 | Bondarenko et al. |
| 5,940,496 A | 8/1999 | Gisby et al. |
| 5,940,497 A | 8/1999 | Miloslavsky |
| 5,940,598 A | 8/1999 | Strauss et al. |
| 5,940,823 A | 8/1999 | Schreiber et al. |
| 5,943,416 A | 8/1999 | Gisby |
| 5,946,375 A | 8/1999 | Pattison et al. |
| 5,946,386 A | 8/1999 | Rogers et al. |
| 5,946,387 A | 8/1999 | Miloslavsky |
| 5,948,054 A | 9/1999 | Nielsen |
| 5,949,988 A | 9/1999 | Feisullin et al. |
| 5,953,332 A | 9/1999 | Miloslavsky |
| 5,953,405 A | 9/1999 | Miloslavsky |
| 5,953,406 A | 9/1999 | LaRue et al. |
| 5,956,482 A | 9/1999 | Agraharam et al. |
| 5,956,729 A | 9/1999 | Goetz et al. |
| 5,958,014 A | 9/1999 | Cave |
| 5,958,016 A | 9/1999 | Chang et al. |
| 5,958,064 A | 9/1999 | Judd et al. |
| 5,959,982 A | 9/1999 | Federkins et al. |
| 5,960,073 A | 9/1999 | Kikinis et al. |
| 5,960,411 A | 9/1999 | Hartman et al. |
| 5,963,632 A | 10/1999 | Miloslavsky |
| 5,963,635 A | 10/1999 | Szlam et al. |
| 5,966,427 A | 10/1999 | Shaffer et al. |
| 5,966,695 A | 10/1999 | Melchione et al. |
| 5,970,065 A | 10/1999 | Miloslavsky |
| 5,970,134 A | 10/1999 | Highland et al. |
| 5,974,135 A | 10/1999 | Breneman et al. |
| 5,974,414 A | 10/1999 | Stanczak et al. |
| 5,974,444 A | 10/1999 | Konrad |
| 5,974,448 A | 10/1999 | Yamauchi et al. |
| RE36,416 E | 11/1999 | Szlam et al. |
| 5,978,465 A | 11/1999 | Corduroy et al. |
| 5,978,467 A | 11/1999 | Walker et al. |
| 5,978,672 A | 11/1999 | Hartmaier et al. |
| 5,978,836 A | 11/1999 | Ouchi |
| 5,982,774 A | 11/1999 | Foladare et al. |
| 5,982,870 A | 11/1999 | Pershan et al. |
| 5,982,873 A | 11/1999 | Flockhart et al. |
| 5,983,218 A | 11/1999 | Syeda-Mahmood |
| 5,987,102 A | 11/1999 | Elliott et al. |
| 5,987,117 A | 11/1999 | McNeil et al. |
| 5,987,118 A | 11/1999 | Dickerman et al. |
| 5,987,423 A | 11/1999 | Arnold et al. |
| 5,987,446 A | 11/1999 | Corey et al. |
| 5,991,365 A | 11/1999 | Pizano et al. |
| 5,991,390 A | 11/1999 | Booton |
| 5,991,391 A | 11/1999 | Miloslavsky |
| 5,991,392 A | 11/1999 | Miloslavsky |
| 5,991,393 A | 11/1999 | Kamen |
| 5,991,394 A | 11/1999 | Dezonno et al. |
| 5,991,395 A | 11/1999 | Miloslavsky |
| 5,995,606 A | 11/1999 | Civanlar et al. |
| 5,995,610 A | 11/1999 | Smidt et al. |
| 5,995,614 A | 11/1999 | Miloslavsky |
| 5,995,615 A | 11/1999 | Miloslavsky |
| 5,996,000 A | 11/1999 | Shuster |
| 5,999,525 A | 12/1999 | Krishnaswamy et al. |
| 5,999,609 A | 12/1999 | Nishimura |
| 5,999,965 A | 12/1999 | Kelly |
| 6,002,396 A | 12/1999 | Davies |
| 6,002,760 A | 12/1999 | Gisby |
| 6,003,034 A | 12/1999 | Tuli |
| 6,005,845 A | 12/1999 | Svennesson et al. |
| 6,005,920 A | 12/1999 | Fuller et al. |
| 6,005,931 A | 12/1999 | Neyman et al. |
| 6,009,163 A | 12/1999 | Nabkel et al. |
| 6,011,792 A | 1/2000 | Miloslavsky |
| 6,011,844 A | 1/2000 | Uppaluru et al. |
| 6,011,974 A | 1/2000 | Cedervall et al. |
| 6,012,152 A | 1/2000 | Douik et al. |
| 6,014,137 A | 1/2000 | Burns |
| 6,014,138 A | 1/2000 | Cain et al. |
| 6,014,379 A | 1/2000 | White et al. |
| 6,014,437 A | 1/2000 | Acker et al. |
| 6,014,647 A | 1/2000 | Nizzari et al. |
| 6,018,578 A | 1/2000 | Bondarenko et al. |
| 6,018,579 A | 1/2000 | Petrunka |
| 6,018,761 A | 1/2000 | Uomini |
| 6,021,262 A | 2/2000 | Cote et al. |
| 6,021,411 A | 2/2000 | Brophy et al. |
| 6,021,428 A | 2/2000 | Miloslavsky |
| 6,023,684 A | 2/2000 | Pearson |
| 6,023,723 A | 2/2000 | McCormick et al. |
| 6,026,087 A | 2/2000 | Mirashrafi et al. |
| 6,026,375 A | 2/2000 | Hall et al. |
| 6,028,917 A | 2/2000 | Creamer et al. |
| 6,029,195 A | 2/2000 | Herz |
| 6,038,293 A | 3/2000 | McNerney et al. |
| 6,038,537 A | 3/2000 | Matsuoka |
| 6,041,116 A | 3/2000 | Meyers |
| 6,044,142 A | 3/2000 | Hammarstrom et al. |
| 6,044,144 A | 3/2000 | Becker et al. |
| 6,044,146 A | 3/2000 | Gisby et al. |
| 6,044,368 A | 3/2000 | Powers |
| 6,046,762 A | 4/2000 | Sonesh et al. |
| 6,047,060 A | 4/2000 | Fedorov et al. |
| 6,049,272 A | 4/2000 | Lee et al. |
| 6,049,547 A | 4/2000 | Fisher et al. |
| 6,049,779 A | 4/2000 | Berkson |
| 6,052,514 A | 4/2000 | Gill et al. |
| 6,055,307 A | 4/2000 | Behnke et al. |
| 6,055,308 A | 4/2000 | Miloslavsky et al. |
| 6,055,513 A | 4/2000 | Katz et al. |

(56) References Cited

U.S. PATENT DOCUMENTS

| | | | |
|---|---|---|---|
| 6,058,163 A | 5/2000 | Pattison et al. |
| 6,058,389 A | 5/2000 | Chandra et al. |
| 6,058,435 A | 5/2000 | Sassin et al. |
| 6,061,054 A | 5/2000 | Jolly |
| 6,064,667 A | 5/2000 | Gisby et al. |
| 6,064,722 A | 5/2000 | Clise et al. |
| 6,064,723 A | 5/2000 | Cohn et al. |
| 6,064,730 A | 5/2000 | Ginsberg |
| 6,064,973 A | 5/2000 | Smith et al. |
| 6,067,357 A | 5/2000 | Kishinsky et al. |
| 6,069,890 A | 5/2000 | White et al. |
| 6,070,142 A | 5/2000 | McDonough et al. |
| 6,070,144 A | 5/2000 | Ginsberg et al. |
| 6,072,864 A | 6/2000 | Shtivelman et al. |
| 6,073,013 A | 6/2000 | Agre et al. |
| 6,073,105 A | 6/2000 | Sutcliffe et al. |
| 6,073,109 A | 6/2000 | Flores et al. |
| 6,073,124 A | 6/2000 | Krishnan et al. |
| 6,075,783 A | 6/2000 | Voit |
| 6,075,843 A | 6/2000 | Cave |
| 6,076,101 A | 6/2000 | Kamakura et al. |
| 6,076,105 A | 6/2000 | Wolff et al. |
| 6,076,109 A | 6/2000 | Kikinis |
| 6,078,581 A | 6/2000 | Shtivelman et al. |
| 6,078,583 A | 6/2000 | Takahara et al. |
| 6,081,591 A | 6/2000 | Skoog |
| 6,081,592 A | 6/2000 | Battle |
| 6,085,097 A | 7/2000 | Savery et al. |
| 6,085,201 A | 7/2000 | Tso |
| 6,088,340 A | 7/2000 | Buchholz et al. |
| 6,088,696 A | 7/2000 | Moon et al. |
| 6,088,717 A | 7/2000 | Reed et al. |
| 6,094,479 A | 7/2000 | Lindeberg et al. |
| 6,094,673 A | 7/2000 | Dilip et al. |
| 6,097,792 A | 8/2000 | Thornton |
| 6,097,804 A | 8/2000 | Gilbert et al. |
| 6,097,938 A | 8/2000 | Paxson |
| 6,098,065 A | 8/2000 | Skillen et al. |
| 6,104,711 A | 8/2000 | Voit |
| 6,104,800 A | 8/2000 | Benson |
| 6,104,801 A | 8/2000 | Miloslavsky |
| 6,104,802 A | 8/2000 | Perlmutter |
| 6,108,688 A | 8/2000 | Nielsen |
| 6,108,704 A | 8/2000 | Hutton et al. |
| 6,108,711 A | 8/2000 | Beck et al. |
| 6,112,085 A | 8/2000 | Garner et al. |
| 6,115,596 A | 9/2000 | Raith et al. |
| 6,115,742 A | 9/2000 | Franklin et al. |
| 6,118,865 A | 9/2000 | Gisby |
| 6,119,155 A | 9/2000 | Rossmann et al. |
| 6,119,167 A | 9/2000 | Boyle et al. |
| 6,122,360 A | 9/2000 | Neyman et al. |
| 6,122,364 A | 9/2000 | Petrunka et al. |
| 6,122,365 A | 9/2000 | Yegoshin |
| 6,122,632 A | 9/2000 | Botts et al. |
| 6,125,113 A | 9/2000 | Farris et al. |
| 6,125,126 A | 9/2000 | Hallenst.ang.l |
| 6,128,379 A | 10/2000 | Smyk |
| 6,128,482 A | 10/2000 | Nixon et al. |
| 6,128,603 A | 10/2000 | Dent et al. |
| 6,128,646 A | 10/2000 | Miloslavsky |
| 6,130,933 A | 10/2000 | Miloslavsky |
| 6,134,217 A | 10/2000 | Stiliadis et al. |
| 6,134,235 A | 10/2000 | Goldman et al. |
| 6,134,315 A | 10/2000 | Galvin |
| 6,134,318 A | 10/2000 | O'Neil |
| 6,134,530 A * | 10/2000 | Bunting et al. ............... 705/7.25 |
| 6,137,870 A | 10/2000 | Scherer |
| 6,138,139 A | 10/2000 | Beck et al. |
| 6,141,345 A | 10/2000 | Goeddel et al. |
| 6,148,074 A | 11/2000 | Miloslavsky et al. |
| 6,157,653 A | 12/2000 | Kline et al. |
| 6,157,655 A | 12/2000 | Shtivelman |
| 6,157,924 A | 12/2000 | Austin |
| 6,166,735 A | 12/2000 | Dom et al. |
| 6,167,255 A | 12/2000 | Kennedy, III et al. |
| 6,167,395 A | 12/2000 | Beck et al. |
| 6,167,404 A | 12/2000 | Morcos et al. |
| 6,170,011 B1 | 1/2001 | Macleod Beck et al. |
| 6,173,052 B1 | 1/2001 | Brady |
| 6,173,316 B1 | 1/2001 | De Boor et al. |
| 6,175,562 B1 | 1/2001 | Cave |
| 6,175,563 B1 | 1/2001 | Miloslavsky |
| 6,175,564 B1 | 1/2001 | Miloslavsky et al. |
| 6,175,620 B1 | 1/2001 | Rouge et al. |
| 6,175,842 B1 | 1/2001 | Kirk et al. |
| 6,178,239 B1 | 1/2001 | Kishinsky et al. |
| 6,181,336 B1 | 1/2001 | Chiu et al. |
| 6,181,736 B1 | 1/2001 | McLaughlin et al. |
| 6,181,788 B1 | 1/2001 | Miloslavsky |
| 6,182,059 B1 | 1/2001 | Angotti et al. |
| 6,182,249 B1 | 1/2001 | Wookey et al. |
| 6,185,287 B1 | 2/2001 | Miloslavsky |
| 6,185,291 B1 | 2/2001 | Miloslavsky |
| 6,185,292 B1 | 2/2001 | Miloslavsky |
| 6,185,427 B1 | 2/2001 | Krasner et al. |
| 6,185,535 B1 | 2/2001 | Hedin et al. |
| 6,188,688 B1 | 2/2001 | Buskirk, Jr. |
| 6,192,250 B1 | 2/2001 | Buskens et al. |
| 6,195,357 B1 | 2/2001 | Polcyn |
| 6,198,738 B1 | 3/2001 | Chang et al. |
| 6,198,739 B1 | 3/2001 | Neyman et al. |
| 6,201,804 B1 | 3/2001 | Kikinis |
| 6,201,863 B1 | 3/2001 | Miloslavsky |
| 6,205,135 B1 | 3/2001 | Chinni et al. |
| 6,205,412 B1 | 3/2001 | Barskiy et al. |
| 6,212,178 B1 | 4/2001 | Beck et al. |
| 6,215,783 B1 | 4/2001 | Neyman |
| 6,219,045 B1 | 4/2001 | Leahy et al. |
| 6,219,413 B1 | 4/2001 | Burg |
| 6,222,919 B1 | 4/2001 | Hollatz et al. |
| 6,226,285 B1 | 5/2001 | Kozdon et al. |
| 6,229,524 B1 | 5/2001 | Chernock et al. |
| 6,229,888 B1 | 5/2001 | Miloslavsky |
| 6,230,197 B1 | 5/2001 | Beck et al. |
| 6,233,234 B1 | 5/2001 | Curry et al. |
| 6,233,616 B1 | 5/2001 | Reid |
| 6,236,857 B1 | 5/2001 | Calabrese et al. |
| 6,240,285 B1 | 5/2001 | Blum et al. |
| 6,243,092 B1 * | 6/2001 | Okita et al. ............... 715/866 |
| 6,243,373 B1 | 6/2001 | Turock |
| 6,243,375 B1 | 6/2001 | Speicher |
| 6,243,379 B1 | 6/2001 | Veerina et al. |
| 6,243,713 B1 | 6/2001 | Nelson et al. |
| 6,249,807 B1 | 6/2001 | Shaw et al. |
| 6,253,129 B1 | 6/2001 | Jenkins et al. |
| 6,256,489 B1 | 7/2001 | Lichter et al. |
| 6,256,503 B1 | 7/2001 | Stephens |
| 6,259,692 B1 | 7/2001 | Shtivelman et al. |
| 6,259,774 B1 | 7/2001 | Miloslavsky |
| 6,259,786 B1 | 7/2001 | Gisby |
| 6,263,049 B1 | 7/2001 | Kuhn |
| 6,263,065 B1 | 7/2001 | Durinovic-Johri et al. |
| 6,263,066 B1 | 7/2001 | Shtivelman et al. |
| 6,263,359 B1 | 7/2001 | Fong et al. |
| 6,275,693 B1 | 8/2001 | Lin et al. |
| 6,278,976 B1 | 8/2001 | Kochian |
| 6,278,996 B1 | 8/2001 | Richardson et al. |
| 6,282,429 B1 | 8/2001 | Baiyor et al. |
| 6,282,565 B1 | 8/2001 | Shaw et al. |
| 6,285,316 B1 | 9/2001 | Nir et al. |
| 6,285,364 B1 | 9/2001 | Giordano, III et al. |
| 6,286,033 B1 | 9/2001 | Kishinsky et al. |
| 6,286,084 B1 | 9/2001 | Wexler et al. |
| 6,286,129 B1 * | 9/2001 | Agarwal et al. ............... 717/105 |
| 6,289,094 B1 | 9/2001 | Miloslavsky |
| 6,292,181 B1 | 9/2001 | Banerjee et al. |
| 6,292,553 B1 | 9/2001 | Fellingham et al. |
| 6,295,353 B1 | 9/2001 | Flockhart et al. |
| 6,295,530 B1 | 9/2001 | Ritchie et al. |
| 6,298,041 B1 | 10/2001 | Packer |
| 6,301,480 B1 | 10/2001 | Kennedy, III et al. |
| 6,304,898 B1 | 10/2001 | Shiigi |
| 6,314,089 B1 | 11/2001 | Szlam et al. |

(56) References Cited

U.S. PATENT DOCUMENTS

| | | |
|---|---|---|
| 6,314,430 B1 | 11/2001 | Chang |
| 6,320,857 B1 | 11/2001 | Tonnby et al. |
| 6,320,951 B1 | 11/2001 | Shtivelman et al. |
| 6,324,276 B1 | 11/2001 | Uppaluru et al. |
| 6,330,323 B1 | 12/2001 | Gottlieb et al. |
| 6,330,426 B2 | 12/2001 | Brown et al. |
| 6,332,022 B1 | 12/2001 | Martinez |
| 6,332,154 B2 | 12/2001 | Beck et al. |
| 6,332,163 B1 | 12/2001 | Bowman-Amuah |
| 6,333,980 B1 | 12/2001 | Hollatz et al. |
| 6,335,927 B1 | 1/2002 | Elliott et al. |
| 6,337,904 B1 | 1/2002 | Gisby |
| 6,339,593 B1 | 1/2002 | Kikinis |
| 6,343,281 B1 | 1/2002 | Kato |
| 6,345,290 B2 | 2/2002 | Okada et al. |
| 6,345,300 B1 | 2/2002 | Bakshi et al. |
| 6,345,305 B1 | 2/2002 | Beck et al. |
| 6,346,952 B1 | 2/2002 | Shtivelman |
| 6,347,085 B2 | 2/2002 | Kelly |
| 6,353,608 B1 | 3/2002 | Cullers et al. |
| 6,353,667 B1 | 3/2002 | Foster et al. |
| 6,359,981 B1 | 3/2002 | Neyman et al. |
| 6,362,838 B1 | 3/2002 | Szlam et al. |
| 6,363,411 B1 | 3/2002 | Dugan et al. |
| 6,366,575 B1 | 4/2002 | Barkan et al. |
| 6,366,586 B1 | 4/2002 | Christie |
| 6,366,651 B1 | 4/2002 | Griffith et al. |
| 6,366,658 B1 | 4/2002 | Bjornberg et al. |
| 6,366,663 B1 | 4/2002 | Bauer et al. |
| 6,366,925 B1 | 4/2002 | Meltzer et al. |
| 6,370,238 B1 | 4/2002 | Sansone et al. |
| 6,370,508 B2 | 4/2002 | Beck et al. |
| 6,370,567 B1 | 4/2002 | Ouchi |
| 6,373,836 B1 | 4/2002 | Deryugin et al. |
| 6,373,937 B1 | 4/2002 | Yegoshin |
| 6,377,568 B1 | 4/2002 | Kelly |
| 6,377,583 B1 | 4/2002 | Lyles et al. |
| 6,377,944 B1 | 4/2002 | Busey et al. |
| 6,377,975 B1 | 4/2002 | Florman |
| 6,381,640 B1 | 4/2002 | Beck et al. |
| 6,385,191 B1 | 5/2002 | Coffman et al. |
| 6,385,202 B1 | 5/2002 | Katseff et al. |
| 6,385,646 B1 | 5/2002 | Brown et al. |
| 6,389,007 B1 | 5/2002 | Shenkman et al. |
| 6,389,133 B1 | 5/2002 | Kamen |
| 6,393,018 B2 | 5/2002 | Miloslavsky |
| 6,393,122 B1 | 5/2002 | Belzile |
| 6,393,278 B1 | 5/2002 | Buchanan et al. |
| 6,393,481 B1 | 5/2002 | Deo et al. |
| 6,396,834 B1 | 5/2002 | Bonomi et al. |
| 6,396,919 B1 | 5/2002 | Shimada et al. |
| 6,400,725 B1 | 6/2002 | Ross |
| 6,401,066 B1 | 6/2002 | McIntosh |
| 6,401,094 B1 | 6/2002 | Stemp et al. |
| 6,405,033 B1 | 6/2002 | Kennedy, III et al. |
| 6,407,996 B1 | 6/2002 | Witchalls |
| 6,407,999 B1 | 6/2002 | Olkkonen et al. |
| 6,408,064 B1 | 6/2002 | Fedorov et al. |
| 6,411,806 B1 | 6/2002 | Garner et al. |
| 6,418,146 B1 | 7/2002 | Miloslavsky |
| 6,418,199 B1 | 7/2002 | Perrone |
| 6,424,709 B1 | 7/2002 | Doyle et al. |
| 6,427,002 B2 | 7/2002 | Campbell et al. |
| 6,430,174 B1 | 8/2002 | Jennings et al. |
| 6,430,282 B1 | 8/2002 | Bannister et al. |
| 6,434,231 B2 | 8/2002 | Neyman et al. |
| 6,434,530 B1 | 8/2002 | Sloane et al. |
| 6,434,549 B1 | 8/2002 | Linetsky et al. |
| 6,442,242 B1 | 8/2002 | McAllister et al. |
| 6,442,247 B1 | 8/2002 | Garcia |
| 6,445,788 B1 | 9/2002 | Torba |
| 6,449,260 B1 | 9/2002 | Sassin et al. |
| 6,449,270 B1 | 9/2002 | Miloslavsky |
| 6,449,358 B1 | 9/2002 | Anisimov et al. |
| 6,449,646 B1 | 9/2002 | Sikora et al. |
| 6,452,609 B1 | 9/2002 | Katinsky et al. |
| 6,453,038 B1 | 9/2002 | McFarlane et al. |
| 6,453,341 B1 | 9/2002 | Miloslavsky |
| 6,456,615 B1 | 9/2002 | Kikinis |
| 6,456,619 B1 | 9/2002 | Sassin et al. |
| 6,459,697 B1 | 10/2002 | Neyman |
| 6,463,148 B1 | 10/2002 | Brady |
| 6,470,010 B1 | 10/2002 | Szviatovszki et al. |
| 6,470,080 B2 | 10/2002 | Perlmutter |
| 6,473,787 B2 | 10/2002 | Miloslavsky |
| 6,480,600 B1 | 11/2002 | Neyman et al. |
| 6,487,663 B1 | 11/2002 | Jaisimha et al. |
| 6,489,954 B1 | 12/2002 | Powlette |
| 6,490,350 B2 | 12/2002 | McDuff et al. |
| 6,493,353 B2 | 12/2002 | Kelly et al. |
| 6,493,433 B2 | 12/2002 | Clabaugh et al. |
| 6,493,447 B1 | 12/2002 | Goss et al. |
| 6,496,567 B1 | 12/2002 | Bjornberg et al. |
| 6,496,702 B1 | 12/2002 | Lockhart |
| 6,496,981 B1 | 12/2002 | Wistendahl et al. |
| 6,498,897 B1 | 12/2002 | Nelson et al. |
| 6,499,088 B1 | 12/2002 | Wexler et al. |
| 6,512,825 B1 | 1/2003 | Lindholm et al. |
| 6,515,996 B1 | 2/2003 | Tonnby et al. |
| 6,519,246 B1 | 2/2003 | Strahs |
| 6,519,617 B1 | 2/2003 | Wanderski et al. |
| 6,532,493 B1 | 3/2003 | Aviani, Jr. et al. |
| 6,535,492 B2 | 3/2003 | Shtivelman |
| 6,536,043 B1 | 3/2003 | Guedalia |
| 6,539,419 B2 | 3/2003 | Beck et al. |
| 6,546,405 B2 | 4/2003 | Gupta et al. |
| 6,549,539 B1 | 4/2003 | Neyman |
| 6,553,114 B1 | 4/2003 | Fisher et al. |
| 6,554,183 B1 | 4/2003 | Sticha et al. |
| 6,560,328 B1 | 5/2003 | Bondarenko et al. |
| 6,560,329 B1 | 5/2003 | Draginich et al. |
| 6,560,607 B1 | 5/2003 | Lassesen |
| 6,563,788 B1 | 5/2003 | Torba et al. |
| 6,567,854 B1 | 5/2003 | Olshansky et al. |
| 6,581,105 B2 | 6/2003 | Miloslavsky et al. |
| 6,594,269 B1 | 7/2003 | Polcyn |
| 6,597,685 B2 | 7/2003 | Miloslavsky et al. |
| 6,600,733 B2 | 7/2003 | Deng |
| 6,600,822 B2 | 7/2003 | Kamen |
| 6,603,762 B1 | 8/2003 | Kikinis |
| 6,603,854 B1 | 8/2003 | Judkins et al. |
| 6,611,498 B1 | 8/2003 | Baker et al. |
| 6,611,590 B1 | 8/2003 | Lu et al. |
| 6,614,780 B2 | 9/2003 | Hakim et al. |
| 6,614,781 B1 | 9/2003 | Elliott et al. |
| 6,625,139 B2 | 9/2003 | Miloslavsky et al. |
| 6,628,666 B1 | 9/2003 | Pickering et al. |
| 6,631,399 B1 | 10/2003 | Stanczak et al. |
| 6,633,910 B1 | 10/2003 | Rajan et al. |
| 6,650,747 B1 | 11/2003 | Bala et al. |
| 6,651,085 B1 | 11/2003 | Woods |
| 6,661,882 B1 | 12/2003 | Muir et al. |
| 6,668,286 B2 | 12/2003 | Bateman et al. |
| 6,678,718 B1 | 1/2004 | Khouri et al. |
| 6,681,010 B1 | 1/2004 | Anderson et al. |
| 6,687,241 B1 | 2/2004 | Goss |
| 6,690,788 B1 | 2/2004 | Bauer et al. |
| 6,693,893 B1 | 2/2004 | Ehlinger |
| 6,704,409 B1 | 3/2004 | Dilip et al. |
| 6,704,410 B1 | 3/2004 | McFarlane et al. |
| 6,704,411 B1 | 3/2004 | Nishidate |
| 6,707,903 B2 | 3/2004 | Burok et al. |
| 6,711,249 B2 | 3/2004 | Weissman et al. |
| 6,711,611 B2 | 3/2004 | Hanhan |
| 6,714,643 B1 | 3/2004 | Gargeya et al. |
| 6,718,032 B1 | 4/2004 | Vrenjak et al. |
| 6,718,366 B1 | 4/2004 | Beck et al. |
| 6,721,306 B1 | 4/2004 | Farris et al. |
| 6,731,626 B1 | 5/2004 | Neyman |
| 6,735,298 B2 | 5/2004 | Neyman et al. |
| 6,744,877 B1 | 6/2004 | Edwards |
| 6,744,878 B1 | 6/2004 | Komissarchik et al. |
| 6,748,211 B1 | 6/2004 | Isaac et al. |
| 6,751,210 B1 | 6/2004 | Shaffer et al. |

(56) References Cited

U.S. PATENT DOCUMENTS

| | | |
|---|---|---|
| 6,753,784 B1 | 6/2004 | Sznaider et al. |
| 6,754,181 B1 | 6/2004 | Elliott et al. |
| 6,760,322 B1 | 7/2004 | Fukuda et al. |
| 6,760,324 B1 | 7/2004 | Scott et al. |
| 6,760,428 B2 | 7/2004 | Foster |
| 6,760,727 B1 | 7/2004 | Schroeder et al. |
| 6,763,104 B1 | 7/2004 | Judkins et al. |
| 6,763,369 B1 | 7/2004 | Ytuarte et al. |
| 6,771,765 B1 | 8/2004 | Crowther et al. |
| 6,778,527 B1 | 8/2004 | Amin |
| 6,785,375 B1 | 8/2004 | Beddus et al. |
| 6,785,710 B2 | 8/2004 | Kikinis |
| 6,785,740 B1 | 8/2004 | Yoneda et al. |
| 6,788,779 B2 | 9/2004 | Ostapchuck |
| 6,798,771 B1 | 9/2004 | Low et al. |
| 6,801,520 B2 | 10/2004 | Philonenko |
| 6,801,928 B2 | 10/2004 | Nuestro |
| 6,804,346 B1 | 10/2004 | Mewhinney |
| 6,816,871 B2 | 11/2004 | Lee |
| 6,816,878 B1 | 11/2004 | Zimmers et al. |
| 6,845,154 B1 | 1/2005 | Cave et al. |
| 6,847,715 B1 | 1/2005 | Swartz |
| 6,847,825 B1 | 1/2005 | Duvall et al. |
| 6,850,602 B1 | 2/2005 | Chou |
| 6,850,614 B1 | 2/2005 | Collins |
| 6,859,529 B2 | 2/2005 | Duncan et al. |
| 6,865,267 B2 | 3/2005 | Dezonno |
| 6,868,391 B1 | 3/2005 | Hultgren |
| 6,874,119 B2 | 3/2005 | Macleod Beck et al. |
| 6,876,632 B1 | 4/2005 | Takeda |
| 6,879,586 B2 | 4/2005 | Miloslavsky et al. |
| 6,882,996 B2 | 4/2005 | Preisig et al. |
| 6,898,190 B2 | 5/2005 | Shtivelman et al. |
| 6,903,685 B1 | 6/2005 | Arndt et al. |
| 6,907,455 B1 | 6/2005 | Wolfe et al. |
| 6,910,072 B2 | 6/2005 | Macleod Beck et al. |
| 6,912,272 B2 | 6/2005 | Kirk et al. |
| 6,922,411 B1 | 7/2005 | Taylor |
| 6,922,689 B2 | 7/2005 | Shtivelman |
| 6,934,379 B2 | 8/2005 | Falcon et al. |
| 6,934,381 B1 | 8/2005 | Klein et al. |
| 6,944,272 B1 | 9/2005 | Thomas |
| 6,958,994 B2 | 10/2005 | Zhakov et al. |
| 6,965,914 B2 | 11/2005 | Dowling |
| 6,970,844 B1 * | 11/2005 | Bierenbaum .................. 705/39 |
| 6,977,740 B1 | 12/2005 | Mandalia |
| 6,981,020 B2 | 12/2005 | Miloslavsky et al. |
| 6,985,478 B2 | 1/2006 | Pogossiants et al. |
| 6,985,943 B2 | 1/2006 | Deryugin et al. |
| 6,987,977 B2 | 1/2006 | Lockhart |
| 6,996,603 B1 | 2/2006 | Srinivasan |
| 7,006,614 B2 | 2/2006 | Feinberg et al. |
| 7,020,264 B1 | 3/2006 | Neyman et al. |
| 7,031,442 B1 | 4/2006 | Neyman et al. |
| 7,036,128 B1 | 4/2006 | Julia et al. |
| 7,039,176 B2 | 5/2006 | Borodow et al. |
| 7,039,857 B2 | 5/2006 | Beck et al. |
| 7,076,048 B2 | 7/2006 | Lee et al. |
| 7,079,641 B2 | 7/2006 | Ostapchuck |
| 7,080,092 B2 | 7/2006 | Upton |
| 7,088,814 B1 | 8/2006 | Shaffer et al. |
| 7,092,509 B1 | 8/2006 | Mears et al. |
| 7,106,850 B2 | 9/2006 | Campbell et al. |
| 7,110,523 B2 | 9/2006 | Gagle et al. |
| 7,110,525 B1 | 9/2006 | Heller et al. |
| 7,117,244 B2 | 10/2006 | Florman et al. |
| 7,120,700 B2 | 10/2006 | Macleod Beck et al. |
| 7,127,400 B2 | 10/2006 | Koch |
| 7,133,830 B1 * | 11/2006 | Hoban et al. ............. 704/270.1 |
| 7,136,475 B1 | 11/2006 | Rogers et al. |
| 7,155,496 B2 | 12/2006 | Froyd et al. |
| 7,155,512 B2 | 12/2006 | Lean et al. |
| 7,159,224 B2 | 1/2007 | Sharma et al. |
| 7,167,924 B1 | 1/2007 | Symonds et al. |
| 7,184,747 B2 | 2/2007 | Bogat |
| 7,216,350 B2 | 5/2007 | Martin et al. |
| 7,221,377 B1 | 5/2007 | Okita et al. |
| 7,222,301 B2 | 5/2007 | Makagon et al. |
| 7,231,032 B2 | 6/2007 | Nevman et al. |
| 7,236,486 B2 | 6/2007 | Baker et al. |
| 7,236,584 B2 | 6/2007 | Torba |
| 7,242,760 B2 | 7/2007 | Shires |
| 7,245,641 B2 * | 7/2007 | Kim .................. H04L 49/30 370/367 |
| 7,245,711 B2 | 7/2007 | Margolis |
| 7,246,009 B2 | 7/2007 | Hamblen et al. |
| 7,254,219 B1 | 8/2007 | Hansen et al. |
| 7,254,641 B2 | 8/2007 | Broughton et al. |
| 7,263,372 B2 | 8/2007 | Lockhart |
| 7,263,671 B2 | 8/2007 | Hull et al. |
| 7,269,263 B2 | 9/2007 | Dedieu et al. |
| 7,272,627 B2 | 9/2007 | Petrovykh |
| 7,277,424 B1 | 10/2007 | Dowling |
| 7,277,536 B2 | 10/2007 | Ostapchuk |
| 7,277,916 B2 | 10/2007 | Nuestro |
| 7,283,519 B2 | 10/2007 | Girard |
| 7,336,649 B1 | 2/2008 | Huang |
| 7,363,228 B2 | 4/2008 | Wyss et al. |
| 7,372,956 B1 | 5/2008 | Kikinis et al. |
| 7,373,405 B2 | 5/2008 | Deryugin et al. |
| 7,373,410 B2 | 5/2008 | Monza et al. |
| 7,376,227 B2 | 5/2008 | Anisimov et al. |
| 7,376,431 B2 | 5/2008 | Niedermeyer |
| 7,401,112 B1 | 7/2008 | Matz et al. |
| 7,415,009 B2 | 8/2008 | Neyman |
| 7,418,094 B2 | 8/2008 | Golitsin et al. |
| 7,428,303 B2 | 9/2008 | Campbell et al. |
| 7,434,204 B1 | 10/2008 | Everingham et al. |
| 7,460,496 B2 | 12/2008 | Miloslavsky et al. |
| 7,496,640 B2 | 2/2009 | Hanhan |
| 7,535,479 B2 | 5/2009 | Okita et al. |
| 7,558,383 B2 | 7/2009 | Shtivelman et al. |
| 7,561,887 B2 | 7/2009 | Lockhart |
| 7,564,840 B2 | 7/2009 | Elliott et al. |
| 7,565,428 B2 | 7/2009 | Deryugin et al. |
| 7,609,829 B2 * | 10/2009 | Wang et al. ............. 379/201.01 |
| 7,610,347 B2 | 10/2009 | Petrovykh |
| 7,619,996 B2 | 11/2009 | Miloslavsky et al. |
| 7,669,182 B2 | 2/2010 | Garcia |
| 7,672,998 B1 | 3/2010 | Haskins et al. |
| 7,706,520 B1 | 4/2010 | Waterson et al. |
| 7,715,332 B2 | 5/2010 | Miloslavsky et al. |
| 7,716,292 B2 | 5/2010 | Kikinis |
| 7,739,325 B1 | 6/2010 | Okita et al. |
| 7,764,231 B1 | 7/2010 | Karr et al. |
| 7,769,161 B1 * | 8/2010 | Hession et al. .......... 379/266.01 |
| 7,779,067 B2 | 8/2010 | Beck et al. |
| 7,792,773 B2 | 9/2010 | McCord et al. |
| 7,808,977 B2 | 10/2010 | Kikinis |
| 7,823,167 B2 | 10/2010 | Makagon et al. |
| 7,853,717 B2 | 12/2010 | Petrovykh |
| 7,856,095 B2 | 12/2010 | Brown |
| 7,903,807 B2 | 3/2011 | Neyman et al. |
| 7,907,598 B2 | 3/2011 | Anisimov et al. |
| 7,929,978 B2 | 4/2011 | Lockhart |
| 7,957,401 B2 | 6/2011 | Zalenski et al. |
| 8,009,821 B1 | 8/2011 | Apparao et al. |
| 8,018,921 B2 | 9/2011 | Pogossiants et al. |
| 8,024,401 B1 | 9/2011 | Gurbani et al. |
| 8,031,698 B2 | 10/2011 | Neyman |
| 8,036,214 B2 | 10/2011 | Elliott et al. |
| 8,059,812 B2 | 11/2011 | Bundy |
| 8,068,598 B1 | 11/2011 | Russi et al. |
| 8,085,761 B2 | 12/2011 | Elliott et al. |
| 8,089,958 B2 | 1/2012 | Elliott et al. |
| 8,126,133 B1 | 2/2012 | Everingham et al. |
| 8,130,749 B2 | 3/2012 | Kikinis |
| 8,180,662 B2 | 5/2012 | Minert et al. |
| 8,180,666 B2 | 5/2012 | Minert et al. |
| 8,199,891 B2 | 6/2012 | Brown et al. |
| 8,209,207 B2 | 6/2012 | Minert et al. |
| 8,209,209 B2 | 6/2012 | Minert et al. |
| 8,223,948 B2 | 7/2012 | Minert et al. |
| 8,226,477 B1 | 7/2012 | Machado et al. |

(56) References Cited

U.S. PATENT DOCUMENTS

| | | |
|---|---|---|
| 8,254,404 B2 | 8/2012 | Rabenko et al. |
| 8,254,558 B2 | 8/2012 | Minert et al. |
| 8,270,421 B2 | 9/2012 | Elliott et al. |
| 8,275,111 B2 | 9/2012 | Golitsin et al. |
| 8,345,856 B1 | 1/2013 | Anisimov et al. |
| 8,351,595 B2 | 1/2013 | Peterson et al. |
| 8,358,769 B2 | 1/2013 | Neyman et al. |
| 8,395,994 B2 | 3/2013 | Stevenson et al. |
| 8,396,205 B1 | 3/2013 | Lowry et al. |
| 8,411,844 B1 | 4/2013 | Anisimov et al. |
| 8,693,347 B2 | 4/2014 | Elliott et al. |
| 9,002,920 B2 | 4/2015 | Deryugin et al. |
| RE45,583 E | 6/2015 | Lockhart |
| 9,118,781 B1 | 8/2015 | Kavulak et al. |
| 2001/0000458 A1 | 4/2001 | Shtivelman et al. |
| 2001/0001150 A1 | 5/2001 | Miloslavsky |
| 2001/0005382 A1 | 6/2001 | Cave et al. |
| 2001/0011366 A1 | 8/2001 | Beck et al. |
| 2001/0013041 A1 | 8/2001 | Macleod Beck et al. |
| 2001/0014604 A1 | 8/2001 | Kingdon et al. |
| 2001/0023430 A1 | 9/2001 | Srinivasan |
| 2001/0023448 A1 | 9/2001 | Hanhan |
| 2001/0024497 A1 | 9/2001 | Campbell et al. |
| 2001/0025309 A1 | 9/2001 | Macleod Beck et al. |
| 2001/0028649 A1 | 10/2001 | Pogossiants et al. |
| 2001/0029519 A1 | 10/2001 | Hallinan et al. |
| 2001/0037316 A1 | 11/2001 | Shiloh |
| 2001/0038624 A1 | 11/2001 | Greenberg et al. |
| 2001/0040887 A1 | 11/2001 | Shtivelman et al. |
| 2001/0042095 A1 | 11/2001 | Kim et al. |
| 2001/0043586 A1 | 11/2001 | Miloslavsky |
| 2001/0043589 A1 | 11/2001 | Kikinis |
| 2001/0044676 A1 | 11/2001 | Macleod Beck et al. |
| 2001/0044828 A1 | 11/2001 | Kikinis |
| 2001/0054064 A1 | 12/2001 | Kannan |
| 2002/0001300 A1 | 1/2002 | Miloslavsky et al. |
| 2002/0012428 A1 | 1/2002 | Neyman et al. |
| 2002/0013150 A1 | 1/2002 | McKenna et al. |
| 2002/0019844 A1 | 2/2002 | Kurowski et al. |
| 2002/0019846 A1 | 2/2002 | Miloslavsky et al. |
| 2002/0025819 A1 | 2/2002 | Cetusic et al. |
| 2002/0035647 A1 | 3/2002 | Brown et al. |
| 2002/0037076 A1 | 3/2002 | Perlmutter |
| 2002/0041674 A1 | 4/2002 | Kamen |
| 2002/0054579 A1 | 5/2002 | Miloslavsky |
| 2002/0055853 A1 | 5/2002 | Macleod Beck et al. |
| 2002/0056000 A1 | 5/2002 | Coussement |
| 2002/0057671 A1 | 5/2002 | Kikinis |
| 2002/0059164 A1 | 5/2002 | Shtivelman |
| 2002/0059374 A1 | 5/2002 | Nuestro |
| 2002/0060988 A1 | 5/2002 | Shtivelman |
| 2002/0062385 A1 | 5/2002 | Dowling |
| 2002/0064149 A1 | 5/2002 | Elliott et al. |
| 2002/0071529 A1 | 6/2002 | Nelkenbaum |
| 2002/0076031 A1 | 6/2002 | Falcon et al. |
| 2002/0078150 A1 | 6/2002 | Thompson et al. |
| 2002/0087648 A1 | 7/2002 | Petrovykh |
| 2002/0091726 A1 | 7/2002 | Macleod Beck et al. |
| 2002/0095462 A1 | 7/2002 | Beck et al. |
| 2002/0097708 A1 | 7/2002 | Deng |
| 2002/0099738 A1 | 7/2002 | Grant |
| 2002/0101866 A1 | 8/2002 | Miloslavsky et al. |
| 2002/0101880 A1 | 8/2002 | Kim |
| 2002/0103998 A1 | 8/2002 | DeBruine |
| 2002/0105957 A1 | 8/2002 | Bondarenko et al. |
| 2002/0114278 A1 | 8/2002 | Coussement |
| 2002/0114441 A1 | 8/2002 | Coussement |
| 2002/0120719 A1 | 8/2002 | Lee et al. |
| 2002/0123899 A1 | 9/2002 | Hall et al. |
| 2002/0126678 A1 | 9/2002 | Kelly et al. |
| 2002/0126828 A1 | 9/2002 | Kamen |
| 2002/0131399 A1 | 9/2002 | Philonenko |
| 2002/0136167 A1 | 9/2002 | Steele et al. |
| 2002/0150311 A1 | 10/2002 | Lynn |
| 2002/0169834 A1 | 11/2002 | Miloslavsky et al. |
| 2002/0176404 A1 | 11/2002 | Girard |
| 2003/0002479 A1 | 1/2003 | Vortman et al. |
| 2003/0002652 A1 | 1/2003 | Neyman et al. |
| 2003/0002654 A1 | 1/2003 | Torba |
| 2003/0007621 A1 | 1/2003 | Graves et al. |
| 2003/0009530 A1 | 1/2003 | Philonenko et al. |
| 2003/0018702 A1* | 1/2003 | Broughton ............ H04M 3/523 709/202 |
| 2003/0018729 A1 | 1/2003 | Miloslavsky |
| 2003/0021259 A1 | 1/2003 | Miloslavsky et al. |
| 2003/0021406 A1 | 1/2003 | Ostapchuck |
| 2003/0026414 A1 | 2/2003 | Baker et al. |
| 2003/0037113 A1 | 2/2003 | Petrovykh |
| 2003/0043832 A1 | 3/2003 | Anisimov et al. |
| 2003/0051037 A1 | 3/2003 | Sundaram et al. |
| 2003/0055884 A1 | 3/2003 | Yuen et al. |
| 2003/0058884 A1 | 3/2003 | Kallner et al. |
| 2003/0084128 A1 | 5/2003 | Anderson et al. |
| 2003/0084349 A1 | 5/2003 | Friedrichs et al. |
| 2003/0088421 A1 | 5/2003 | Maes et al. |
| 2003/0097457 A1 | 5/2003 | Saran et al. |
| 2003/0099343 A1 | 5/2003 | Dezonno |
| 2003/0115353 A1 | 6/2003 | Deryugin et al. |
| 2003/0125048 A1 | 7/2003 | Lockhart |
| 2003/0135592 A1 | 7/2003 | Vetter et al. |
| 2003/0161296 A1 | 8/2003 | Butler et al. |
| 2003/0161448 A1 | 8/2003 | Parolkar et al. |
| 2003/0179729 A1 | 9/2003 | MacLeod Beck et al. |
| 2003/0212558 A1 | 11/2003 | Matula |
| 2003/0216923 A1 | 11/2003 | Gilmore et al. |
| 2003/0219029 A1 | 11/2003 | Pickett |
| 2003/0220875 A1 | 11/2003 | Lam et al. |
| 2003/0229529 A1 | 12/2003 | Mui et al. |
| 2004/0006739 A1* | 1/2004 | Mulligan ................. G06F 9/466 715/234 |
| 2004/0017797 A1 | 1/2004 | Chen et al. |
| 2004/0019638 A1 | 1/2004 | Makagon et al. |
| 2004/0030557 A1 | 2/2004 | Culy et al. |
| 2004/0047302 A1 | 3/2004 | Dezonno et al. |
| 2004/0054743 A1* | 3/2004 | McPartlan .......... H04M 3/5235 709/206 |
| 2004/0064348 A1 | 4/2004 | Humenansky et al. |
| 2004/0081183 A1 | 4/2004 | Monza et al. |
| 2004/0083195 A1 | 4/2004 | McCord et al. |
| 2004/0083281 A1 | 4/2004 | Makagon et al. |
| 2004/0083479 A1 | 4/2004 | Bondarenko et al. |
| 2004/0083482 A1 | 4/2004 | Makagon et al. |
| 2004/0102977 A1 | 5/2004 | Metzler et al. |
| 2004/0107025 A1 | 6/2004 | Ransom et al. |
| 2004/0111269 A1 | 6/2004 | Koch |
| 2004/0120502 A1* | 6/2004 | Strathmeyer et al. ... 379/265.01 |
| 2004/0169675 A1 | 9/2004 | Beck et al. |
| 2004/0179516 A1 | 9/2004 | Neyman |
| 2004/0181574 A1 | 9/2004 | Hanhan |
| 2004/0199580 A1 | 10/2004 | Zhakov et al. |
| 2004/0208134 A1 | 10/2004 | Neyman et al. |
| 2004/0208309 A1 | 10/2004 | Miloslavsky |
| 2004/0213400 A1 | 10/2004 | Golitsin et al. |
| 2004/0223490 A1 | 11/2004 | Donovan et al. |
| 2004/0264678 A1 | 12/2004 | Ostapchuck |
| 2004/0267892 A1 | 12/2004 | Kikinis |
| 2005/0013417 A1 | 1/2005 | Zimmers et al. |
| 2005/0033851 A1 | 2/2005 | Kikinis |
| 2005/0041678 A1 | 2/2005 | Nuestro |
| 2005/0128961 A1 | 6/2005 | Miloslavsky et al. |
| 2005/0147090 A1 | 7/2005 | MacLeod Beck et al. |
| 2005/0154792 A1 | 7/2005 | Deryugin et al. |
| 2005/0207559 A1 | 9/2005 | Shtivelman et al. |
| 2006/0029206 A1 | 2/2006 | Anisimov et al. |
| 2006/0034262 A1 | 2/2006 | Pogossiants et al. |
| 2006/0079250 A1 | 4/2006 | Lockhart |
| 2006/0080107 A1 | 4/2006 | Hill et al. |
| 2006/0095568 A1 | 5/2006 | Makagon et al. |
| 2006/0109976 A1 | 5/2006 | Sundaram et al. |
| 2006/0133594 A1 | 6/2006 | Neyman et al. |
| 2006/0153173 A1 | 7/2006 | Beck et al. |
| 2006/0209797 A1 | 9/2006 | Anisimov et al. |
| 2006/0210047 A1 | 9/2006 | Neyman et al. |
| 2006/0245421 A1 | 11/2006 | Ostapchuk |

(56) References Cited

U.S. PATENT DOCUMENTS

| | | |
|---|---|---|
| 2007/0002744 A1 | 1/2007 | Mewhinney et al. |
| 2007/0041525 A1* | 2/2007 | Tingley et al. ............ 379/88.17 |
| 2007/0041567 A1 | 2/2007 | Anisimov et al. |
| 2007/0071224 A1 | 3/2007 | Shtivelman et al. |
| 2007/0110043 A1 | 5/2007 | Girard |
| 2007/0127707 A1 | 6/2007 | Koser et al. |
| 2007/0143301 A1* | 6/2007 | Tran ............................... 707/10 |
| 2007/0195940 A1 | 8/2007 | Miloslavsky et al. |
| 2007/0213073 A1 | 9/2007 | Lockhart |
| 2007/0274495 A1 | 11/2007 | Youd et al. |
| 2008/0002822 A1 | 1/2008 | Petrovykh |
| 2008/0013531 A1 | 1/2008 | Elliott et al. |
| 2008/0025295 A1 | 1/2008 | Elliott et al. |
| 2008/0034354 A1* | 2/2008 | Brughton ............. H04M 3/523 717/139 |
| 2008/0043728 A1 | 2/2008 | Miloslavsky et al. |
| 2008/0043955 A1 | 2/2008 | Shtivelman et al. |
| 2008/0043975 A1 | 2/2008 | Miloslavsky et al. |
| 2008/0043977 A1 | 2/2008 | Neyman et al. |
| 2008/0046504 A1 | 2/2008 | Deryugin et al. |
| 2008/0046531 A1 | 2/2008 | Shtivelman et al. |
| 2008/0049731 A1 | 2/2008 | Kikinis |
| 2008/0049737 A1 | 2/2008 | Neyman |
| 2008/0049928 A1 | 2/2008 | Miloslavsky et al. |
| 2008/0049929 A1 | 2/2008 | Miloslavsky et al. |
| 2008/0062971 A1 | 3/2008 | Kikinis |
| 2008/0130844 A1 | 6/2008 | Hubbard et al. |
| 2008/0205378 A1 | 8/2008 | Wyss et al. |
| 2008/0222240 A1 | 9/2008 | Deryugin et al. |
| 2008/0285739 A1 | 11/2008 | Golitsin et al. |
| 2009/0089136 A1 | 4/2009 | Minert et al. |
| 2009/0089451 A1 | 4/2009 | Petrovykh |
| 2009/0227267 A1 | 9/2009 | Lockhart |
| 2009/0240346 A1 | 9/2009 | Cadigan, Jr. et al. |
| 2010/0106710 A1 | 4/2010 | Nishizawa et al. |
| 2010/0157979 A1 | 6/2010 | Anisimov et al. |
| 2010/0198930 A1 | 8/2010 | Kikinis |
| 2011/0099602 A1 | 4/2011 | Apparao et al. |
| 2011/0110363 A1 | 5/2011 | Anandani |
| 2011/0178946 A1 | 7/2011 | Minert et al. |
| 2011/0179304 A1 | 7/2011 | Peterson |
| 2011/0179398 A1 | 7/2011 | Peterson |
| 2011/0182418 A1 | 7/2011 | Anisimov et al. |
| 2012/0047266 A1 | 2/2012 | Minert |
| 2012/0066016 A1 | 3/2012 | Minert et al. |
| 2012/0177195 A1 | 7/2012 | Elliott et al. |
| 2012/0195415 A1 | 8/2012 | Wyss et al. |
| 2012/0250849 A1 | 10/2012 | Liu et al. |
| 2013/0016115 A1 | 1/2013 | Minert et al. |
| 2013/0070757 A1 | 3/2013 | Elliott et al. |
| 2013/0129067 A1 | 5/2013 | Neyman et al. |
| 2013/0230160 A1 | 9/2013 | Neyman et al. |
| 2014/0376708 A1 | 12/2014 | Deryugin et al. |
| 2014/0379936 A1 | 12/2014 | Anisimov et al. |
| 2015/0201021 A1 | 7/2015 | Beck et al. |
| 2015/0244870 A1 | 8/2015 | Neyman et al. |

FOREIGN PATENT DOCUMENTS

| | | |
|---|---|---|
| AT | 316736 | 2/2006 |
| AT | 317621 | 2/2006 |
| AT | 318048 | 3/2006 |
| AT | 337678 | 9/2006 |
| AT | 379921 | 12/2007 |
| AT | 380434 | 12/2007 |
| AT | 384398 | 2/2008 |
| AT | 388578 | 3/2008 |
| AT | 401736 | 8/2008 |
| AT | 413059 | 11/2008 |
| AT | 424090 | 3/2009 |
| AT | 465451 | 5/2010 |
| AT | 474415 | 7/2010 |
| AU | 2604797 | 10/1997 |
| AU | 718233 B2 | 3/1998 |
| AU | 5274398 | 3/1998 |
| AU | 6023598 | 8/1998 |
| AU | 6034698 | 8/1998 |
| AU | 6167398 | 8/1998 |
| AU | 6319498 | 8/1998 |
| AU | 6655298 | 9/1998 |
| AU | 6655398 | 9/1998 |
| AU | 7099298 | 10/1998 |
| AU | 735134 B2 | 3/1999 |
| AU | 736449 B2 | 4/1999 |
| AU | 737483 B2 | 4/1999 |
| AU | 743217 B2 | 4/1999 |
| AU | 745404 B2 | 4/1999 |
| AU | 748636 B2 | 4/1999 |
| AU | 9225198 | 4/1999 |
| AU | 9228098 | 4/1999 |
| AU | 9381998 | 4/1999 |
| AU | 9479298 | 4/1999 |
| AU | 743880 B2 | 5/1999 |
| AU | 1118899 | 5/1999 |
| AU | 740090 B2 | 6/1999 |
| AU | 743737 B2 | 6/1999 |
| AU | 744340 B2 | 6/1999 |
| AU | 1120099 | 6/1999 |
| AU | 1276799 | 6/1999 |
| AU | 1286299 | 6/1999 |
| AU | 741437 B2 | 8/1999 |
| AU | 758713 B2 | 8/1999 |
| AU | 2595499 | 8/1999 |
| AU | 2595599 | 8/1999 |
| AU | 2667299 | 8/1999 |
| AU | 2674899 | 8/1999 |
| AU | 739979 B2 | 9/1999 |
| AU | 2674799 | 9/1999 |
| AU | 749023 B2 | 12/1999 |
| AU | 4427299 | 12/1999 |
| AU | 4819499 | 12/1999 |
| AU | 746085 B2 | 1/2000 |
| AU | 4426799 | 1/2000 |
| AU | 750215 B2 | 4/2000 |
| AU | 754238 B2 | 4/2000 |
| AU | 755234 B2 | 4/2000 |
| AU | 5807099 | 4/2000 |
| AU | 5810599 | 4/2000 |
| AU | 5813699 | 4/2000 |
| AU | 748456 B2 | 5/2000 |
| AU | 751143 B2 | 5/2000 |
| AU | 751232 B2 | 5/2000 |
| AU | 751269 B2 | 5/2000 |
| AU | 751301 B2 | 5/2000 |
| AU | 755138 B2 | 5/2000 |
| AU | 1233800 | 5/2000 |
| AU | 1327200 | 5/2000 |
| AU | 1328200 | 5/2000 |
| AU | 1328300 | 5/2000 |
| AU | 1454700 | 5/2000 |
| AU | 1717700 | 5/2000 |
| AU | 1718600 | 5/2000 |
| AU | 2045900 | 6/2000 |
| AU | 748447 B2 | 7/2000 |
| AU | 3113800 | 7/2000 |
| AU | 2964900 | 9/2000 |
| AU | 3470800 | 9/2000 |
| AU | 4507700 | 2/2001 |
| AU | 6798300 | 4/2001 |
| AU | 1077201 | 6/2001 |
| AU | 1077301 | 6/2001 |
| AU | 8006800 | 6/2001 |
| AU | 4732501 | 10/2001 |
| AU | 5384201 | 10/2001 |
| AU | 5724801 | 11/2001 |
| AU | 756656 B2 | 1/2003 |
| AU | 2003300117 | 8/2004 |
| BR | 9913621 A | 5/2001 |
| BR | 9913622 A | 5/2001 |
| CA | 2178705 A1 | 3/1997 |
| CA | 2391428 A1 | 3/1997 |
| CA | 2259912 C | 1/1998 |
| CA | 2280002 A1 | 8/1998 |

(56) References Cited

FOREIGN PATENT DOCUMENTS

| | | | |
|---|---|---|---|
| CA | 2289193 | A1 | 12/1998 |
| CA | 2289198 | A1 | 12/1998 |
| CA | 2302397 | A1 | 3/1999 |
| CA | 2302488 | A1 | 3/1999 |
| CA | 2302674 | A1 | 3/1999 |
| CA | 2302680 | A1 | 3/1999 |
| CA | 2302704 | A1 | 3/1999 |
| CA | 2302678 | A1 | 4/1999 |
| CA | 2308590 | A1 | 5/1999 |
| CA | 2309185 | A1 | 5/1999 |
| CA | 2309186 | A1 | 5/1999 |
| CA | 2309183 | A1 | 6/1999 |
| CA | 2320978 | A1 | 8/1999 |
| CA | 2320979 | A1 | 8/1999 |
| CA | 2320989 | A1 | 8/1999 |
| CA | 2330608 | A1 | 12/1999 |
| CA | 2334513 | A1 | 12/1999 |
| CA | 2343286 | A1 | 3/2000 |
| CA | 2343288 | A1 | 3/2000 |
| CA | 2343756 | A1 | 3/2000 |
| CA | 2346994 | A1 | 5/2000 |
| CA | 2347721 | A1 | 5/2000 |
| CA | 2348567 | A1 | 5/2000 |
| CA | 2348574 | A1 | 5/2000 |
| CA | 2348575 | C | 5/2000 |
| CA | 2348999 | A1 | 5/2000 |
| CA | 2350515 | A1 | 5/2000 |
| CA | 2352973 | A1 | 6/2000 |
| CA | 2362172 | A1 | 8/2000 |
| CA | 2313596 | A1 | 2/2001 |
| CN | 1282484 | A | 1/2001 |
| CN | 1282485 | A | 1/2001 |
| CN | 1285990 | A | 2/2001 |
| CN | 1285991 | A | 2/2001 |
| CN | 1293798 | A | 5/2001 |
| CN | 1293858 | A | 5/2001 |
| CN | 1298590 | A | 6/2001 |
| CN | 1309861 | A | 8/2001 |
| CN | 1310822 | A | 8/2001 |
| CN | 1323418 | A | 11/2001 |
| CN | 1323421 | A | 11/2001 |
| CN | 1354942 | A | 6/2002 |
| CN | 1130061 | C | 12/2003 |
| CN | 1132399 | C | 12/2003 |
| CN | 1145314 | C | 4/2004 |
| CN | 1149521 | C | 5/2004 |
| CN | 1152549 | C | 6/2004 |
| CN | 1512724 | A | 7/2004 |
| CN | 1520197 | A | 8/2004 |
| CN | 1197336 | C | 4/2005 |
| CN | 1200548 | C | 5/2005 |
| CN | 1662025 | A | 8/2005 |
| CN | 1232077 | C | 12/2005 |
| CN | 1756280 | A | 4/2006 |
| CN | 100477702 | C | 4/2009 |
| CN | 100547568 | C | 10/2009 |
| CN | 102257789 | A | 11/2011 |
| CN | 101635775 | B | 12/2011 |
| DE | 60011863 | T2 | 12/2004 |
| DE | 69730498 | T2 | 9/2005 |
| DE | 60015236 | T2 | 2/2006 |
| DE | 69832275 | T2 | 8/2006 |
| DE | 69833285 | T2 | 9/2006 |
| DE | 69833394 | T2 | 10/2006 |
| DE | 69833462 | T2 | 10/2006 |
| DE | 69833935 | T2 | 11/2006 |
| DE | 60214191 | T2 | 12/2006 |
| DE | 69834184 | T2 | 3/2007 |
| DE | 69838795 | T2 | 10/2008 |
| DE | 69838814 | T2 | 11/2008 |
| DE | 69839022 | T2 | 1/2009 |
| DE | 69839222 | T2 | 3/2009 |
| EP | 0193961 | A2 | 9/1986 |
| EP | 0236013 | A2 | 9/1987 |
| EP | 0376517 | A2 | 7/1990 |
| EP | 0420779 | A2 | 4/1991 |
| EP | 0424015 | A2 | 4/1991 |
| EP | 0425161 | A2 | 5/1991 |
| EP | 0425163 | A2 | 5/1991 |
| EP | 0515068 | A2 | 11/1992 |
| EP | 0528732 | A1 | 2/1993 |
| EP | 0532972 | A1 | 3/1993 |
| EP | 0539105 | A2 | 4/1993 |
| EP | 0559979 | A2 | 9/1993 |
| EP | 0568770 | A2 | 11/1993 |
| EP | 0610625 | A2 | 8/1994 |
| EP | 0647050 | A2 | 4/1995 |
| EP | 0647051 | A1 | 4/1995 |
| EP | 0660573 | A2 | 6/1995 |
| EP | 0701358 | A1 | 3/1996 |
| EP | 0705017 | A2 | 4/1996 |
| EP | 0721268 | A2 | 7/1996 |
| EP | 0725526 | A2 | 8/1996 |
| EP | 0734187 | A2 | 9/1996 |
| EP | 0740450 | A2 | 10/1996 |
| EP | 0748102 | A2 | 12/1996 |
| EP | 0753956 | A2 | 1/1997 |
| EP | 0755146 | A2 | 1/1997 |
| EP | 0758175 | A1 | 2/1997 |
| EP | 0771095 | A2 | 5/1997 |
| EP | 0792076 | A2 | 8/1997 |
| EP | 0806858 | A2 | 11/1997 |
| EP | 0817455 | A2 | 1/1998 |
| EP | 0856980 | A2 | 8/1998 |
| EP | 0863651 | A2 | 9/1998 |
| EP | 0866407 | A1 | 9/1998 |
| EP | 0869639 | A2 | 10/1998 |
| EP | 0883306 | A2 | 12/1998 |
| EP | 0908047 | A1 | 4/1999 |
| EP | 0958560 | A1 | 11/1999 |
| EP | 0962087 | A1 | 12/1999 |
| EP | 1006706 | A2 | 6/2000 |
| EP | 1013062 | A1 | 6/2000 |
| EP | 1013066 | A1 | 6/2000 |
| EP | 1016280 | A1 | 7/2000 |
| EP | 1044553 | A1 | 10/2000 |
| EP | 1064630 | A1 | 1/2001 |
| EP | 1066712 | A1 | 1/2001 |
| EP | 1075153 | A2 | 2/2001 |
| EP | 1087597 | A2 | 3/2001 |
| EP | 1088277 | A1 | 4/2001 |
| EP | 1092313 | A1 | 4/2001 |
| EP | 1107555 | A2 | 6/2001 |
| EP | 1114543 | A1 | 7/2001 |
| EP | 1125214 | A1 | 8/2001 |
| EP | 1133677 | A2 | 9/2001 |
| EP | 1133736 | A1 | 9/2001 |
| EP | 1133742 | A1 | 9/2001 |
| EP | 1145153 | A1 | 10/2001 |
| EP | 1145154 | A1 | 10/2001 |
| EP | 1163564 | A2 | 12/2001 |
| EP | 1193961 | A2 | 4/2002 |
| EP | 1227635 | A2 | 7/2002 |
| EP | 1248447 | A2 | 10/2002 |
| EP | 1290861 | A1 | 3/2003 |
| EP | 1292901 | A1 | 3/2003 |
| EP | 1292939 | A1 | 3/2003 |
| EP | 1328121 | A1 | 7/2003 |
| EP | 0873642 | B1 | 4/2004 |
| EP | 1413954 | A2 | 4/2004 |
| EP | 1107615 | B1 | 6/2004 |
| EP | 1033024 | A4 | 9/2004 |
| EP | 1129545 | A1 | 9/2004 |
| EP | 1061723 | B1 | 10/2004 |
| EP | 1465397 | A1 | 10/2004 |
| EP | 1469663 | A1 | 10/2004 |
| EP | 1484903 | A2 | 12/2004 |
| EP | 1566949 | A1 | 8/2005 |
| EP | 0985308 | B1 | 11/2005 |
| EP | 1359735 | B1 | 1/2006 |
| EP | 1357729 | B1 | 2/2006 |
| EP | 1377001 | B1 | 2/2006 |
| EP | 0954922 | B1 | 3/2006 |
| EP | 0986875 | B1 | 4/2006 |

(56) References Cited

FOREIGN PATENT DOCUMENTS

| | | |
|---|---|---|
| EP | 1410614 B1 | 8/2006 |
| EP | 1774760 A2 | 4/2007 |
| EP | 1021905 B1 | 11/2007 |
| EP | 1031232 B1 | 12/2007 |
| EP | 1865697 A3 | 12/2007 |
| EP | 1040638 B1 | 1/2008 |
| EP | 1048162 B1 | 3/2008 |
| EP | 1157509 B1 | 7/2008 |
| EP | 1337079 B1 | 9/2008 |
| EP | 1326415 B1 | 10/2008 |
| EP | 1013054 B1 | 2/2009 |
| EP | 1333653 B1 | 4/2009 |
| EP | 0983676 B1 | 6/2009 |
| EP | 1125208 B1 | 4/2010 |
| EP | 1142284 B1 | 7/2010 |
| EP | 2380323 A1 | 10/2011 |
| EP | 1408678 B1 | 11/2011 |
| EP | 1057301 B1 | 8/2013 |
| EP | 1131728 B1 | 1/2014 |
| EP | 1625460 B1 | 5/2014 |
| ES | 2231120 T3 | 5/2005 |
| ES | 2255657 T3 | 7/2006 |
| ES | 2256666 T3 | 7/2006 |
| ES | 2257639 T3 | 8/2006 |
| FR | 2671252 A1 | 7/1992 |
| GB | 2273225 A | 6/1994 |
| GB | 2306853 A | 5/1997 |
| GB | 2315190 A | 1/1998 |
| GB | 2324627 A | 10/1998 |
| GB | 2369263 A | 5/2002 |
| JP | 61-51247 | 3/1986 |
| JP | 62-200956 | 9/1987 |
| JP | 63-149955 | 6/1988 |
| JP | 64-7460 | 1/1989 |
| JP | 64-77265 | 3/1989 |
| JP | 02-170756 | 7/1990 |
| JP | 02-298154 | 12/1990 |
| JP | 03-052443 | 3/1991 |
| JP | 03-160865 | 7/1991 |
| JP | 03-177144 | 8/1991 |
| JP | 04-40723 | 2/1992 |
| JP | 4-66858 | 6/1992 |
| JP | 04-265049 | 9/1992 |
| JP | 4-336742 | 11/1992 |
| JP | 04-371056 | 12/1992 |
| JP | 06-044157 | 2/1994 |
| JP | 06-046150 | 2/1994 |
| JP | 06-066830 | 3/1994 |
| JP | 06-069988 | 3/1994 |
| JP | 06-83771 | 3/1994 |
| JP | 06-90292 | 3/1994 |
| JP | 06-103058 | 4/1994 |
| JP | 06-121051 | 4/1994 |
| JP | 06-284203 | 7/1994 |
| JP | 06-261129 | 9/1994 |
| JP | 06-291877 | 10/1994 |
| JP | 06-334748 | 12/1994 |
| JP | 07-046321 | 2/1995 |
| JP | 07-058851 | 3/1995 |
| JP | 07-115471 | 5/1995 |
| JP | 07-170288 | 7/1995 |
| JP | 07-170546 | 7/1995 |
| JP | 07-212471 | 8/1995 |
| JP | 07-262104 | 10/1995 |
| JP | 07-319538 | 12/1995 |
| JP | 07-336447 | 12/1995 |
| JP | 08-46699 | 2/1996 |
| JP | 08-056377 | 2/1996 |
| JP | 08-163252 | 6/1996 |
| JP | 08-181793 | 7/1996 |
| JP | 08-504305 | 7/1996 |
| JP | 08-214076 | 8/1996 |
| JP | 08-214346 | 8/1996 |
| JP | 08-510071 | 10/1996 |
| JP | 8-321885 | 12/1996 |
| JP | 8-329118 | 12/1996 |
| JP | 8-331618 | 12/1996 |
| JP | 09-036963 | 2/1997 |
| JP | 09-501812 | 2/1997 |
| JP | 09-504394 | 4/1997 |
| JP | 09-149137 | 6/1997 |
| JP | 09-163031 | 6/1997 |
| JP | 09-224093 | 8/1997 |
| JP | 09-508508 | 8/1997 |
| JP | 09-233118 | 9/1997 |
| JP | 09-265408 | 10/1997 |
| JP | 10-11374 | 1/1998 |
| JP | 10-13811 | 1/1998 |
| JP | 10-51549 | 2/1998 |
| JP | 10-093713 | 4/1998 |
| JP | 10-093716 | 4/1998 |
| JP | 10-504425 | 4/1998 |
| JP | 10-116249 | 5/1998 |
| JP | 10-143451 | 5/1998 |
| JP | 10-506766 | 6/1998 |
| JP | 10-214113 | 8/1998 |
| JP | 10-224477 | 8/1998 |
| JP | 10-509847 | 9/1998 |
| JP | 10-304073 | 11/1998 |
| JP | 10-304074 | 11/1998 |
| JP | 10-327258 | 12/1998 |
| JP | 10-513632 | 12/1998 |
| JP | 11-055741 | 2/1999 |
| JP | 11-506292 | 6/1999 |
| JP | 11-183189 | 7/1999 |
| JP | 11-508430 | 7/1999 |
| JP | 11-508715 | 7/1999 |
| JP | 11-317817 | 11/1999 |
| JP | 11-512906 | 11/1999 |
| JP | 11-346266 | 12/1999 |
| JP | 2000-011005 | 1/2000 |
| JP | 2000-49847 | 2/2000 |
| JP | 2000-151819 | 5/2000 |
| JP | 2000-514985 | 11/2000 |
| JP | 2000-514986 | 11/2000 |
| JP | 2000-516432 | 12/2000 |
| JP | 2000-516795 | 12/2000 |
| JP | 2000-517142 | 12/2000 |
| JP | 2001-500677 | 1/2001 |
| JP | 2001-103533 | 4/2001 |
| JP | 2001-292236 | 10/2001 |
| JP | 2001-516993 | 10/2001 |
| JP | 2001-517027 | 10/2001 |
| JP | 2001-517029 | 10/2001 |
| JP | 2001-517038 | 10/2001 |
| JP | 2001-518754 | 10/2001 |
| JP | 2001-522201 | 11/2001 |
| JP | 2001-523930 | 11/2001 |
| JP | 3226929 B2 | 11/2001 |
| JP | 2001-524782 | 12/2001 |
| JP | 2001-526871 | 12/2001 |
| JP | 2002-503903 | 2/2002 |
| JP | 2002-503921 | 2/2002 |
| JP | 2002-504783 | 2/2002 |
| JP | 2002-518890 | 6/2002 |
| JP | 2002-519762 | 7/2002 |
| JP | 2002-525895 | 8/2002 |
| JP | 2002-528824 | 9/2002 |
| JP | 2002-529836 | 9/2002 |
| JP | 2002-529943 | 9/2002 |
| JP | 2002-529944 | 9/2002 |
| JP | 2002-529945 | 9/2002 |
| JP | 2002-529994 | 9/2002 |
| JP | 2002-530010 | 9/2002 |
| JP | 2002-534003 | 10/2002 |
| JP | 2002-537594 | 11/2002 |
| JP | 2003-502720 | 1/2003 |
| JP | 2003-507908 | 2/2003 |
| JP | 2003-510929 | 3/2003 |
| JP | 3384792 B2 | 3/2003 |
| JP | 3393119 B2 | 4/2003 |
| JP | 2003-516672 | 5/2003 |
| JP | 3453561 B2 | 10/2003 |
| JP | 3461488 B2 | 10/2003 |

(56) References Cited

FOREIGN PATENT DOCUMENTS

| | | |
|---|---|---|
| JP | 3516656 B2 | 4/2004 |
| JP | 3516659 B2 | 4/2004 |
| JP | 3547142 B2 | 7/2004 |
| JP | 3547397 B2 | 7/2004 |
| JP | 2004-312730 | 11/2004 |
| JP | 2005-504452 | 2/2005 |
| JP | 3615708 B2 | 2/2005 |
| JP | 3628962 B2 | 3/2005 |
| JP | 2005-094780 | 4/2005 |
| JP | 2005-102234 | 4/2005 |
| JP | 2005-124184 | 5/2005 |
| JP | 3681403 B2 | 8/2005 |
| JP | 3681406 B2 | 8/2005 |
| JP | 3686087 B2 | 8/2005 |
| JP | 3686337 B2 | 8/2005 |
| JP | 3735124 B2 | 1/2006 |
| JP | 3820151 | 9/2006 |
| JP | 2006-295947 | 10/2006 |
| JP | 3877523 B2 | 2/2007 |
| JP | 4057785 B2 | 3/2008 |
| JP | 4205310 B2 | 1/2009 |
| JP | 4234926 B2 | 3/2009 |
| JP | 4295186 B2 | 7/2009 |
| JP | 4450515 B2 | 4/2010 |
| JP | 2012-513725 | 6/2012 |
| KR | 10-2011-0098841 A | 9/2011 |
| WO | 9208194 A1 | 5/1992 |
| WO | 9401959 A1 | 1/1994 |
| WO | 9429995 A1 | 12/1994 |
| WO | 9508236 A2 | 3/1995 |
| WO | 9520860 A1 | 8/1995 |
| WO | 9533325 A2 | 12/1995 |
| WO | 9614704 A1 | 5/1996 |
| WO | 9620553 A2 | 7/1996 |
| WO | 9623265 A1 | 8/1996 |
| WO | 9627254 A1 | 9/1996 |
| WO | 9701917 A1 | 1/1997 |
| WO | 9712472 A1 | 4/1997 |
| WO | 9713352 A1 | 4/1997 |
| WO | 9716014 A2 | 5/1997 |
| WO | 9718662 A1 | 5/1997 |
| WO | 9720424 A1 | 6/1997 |
| WO | 9722201 A2 | 6/1997 |
| WO | 9723078 A1 | 6/1997 |
| WO | 9726749 A1 | 7/1997 |
| WO | 9728635 A1 | 8/1997 |
| WO | 9729584 A1 | 8/1997 |
| WO | 9734401 A1 | 9/1997 |
| WO | 9736414 A1 | 10/1997 |
| WO | 9737500 A1 | 10/1997 |
| WO | 9738389 A2 | 10/1997 |
| WO | 9738519 A1 | 10/1997 |
| WO | 9750235 A1 | 12/1997 |
| WO | 9801987 A1 | 1/1998 |
| WO | 9810573 A2 | 3/1998 |
| WO | 9813765 A1 | 4/1998 |
| WO | 9813974 A1 | 4/1998 |
| WO | 9817048 A1 | 4/1998 |
| WO | 9827479 A2 | 6/1998 |
| WO | 9831130 A1 | 7/1998 |
| WO | 9834390 A1 | 8/1998 |
| WO | 9835326 A1 | 8/1998 |
| WO | 9835509 A2 | 8/1998 |
| WO | 9836551 A1 | 8/1998 |
| WO | 9837481 A1 | 8/1998 |
| WO | 9837677 A2 | 8/1998 |
| WO | 9837686 A1 | 8/1998 |
| WO | 9837687 A1 | 8/1998 |
| WO | 9844699 A1 | 10/1998 |
| WO | 9844714 A1 | 10/1998 |
| WO | 9848577 A2 | 10/1998 |
| WO | 9854877 A2 | 12/1998 |
| WO | 9856133 A2 | 12/1998 |
| WO | 9856141 A1 | 12/1998 |
| WO | 9857501 A2 | 12/1998 |
| WO | 9900960 A1 | 1/1999 |
| WO | 9900966 A1 | 1/1999 |
| WO | 9903247 A2 | 1/1999 |
| WO | 9912367 A1 | 3/1999 |
| WO | 9913635 A1 | 3/1999 |
| WO | 9914919 A1 | 3/1999 |
| WO | 9914920 A1 | 3/1999 |
| WO | 9914924 A1 | 3/1999 |
| WO | 9914951 A1 | 3/1999 |
| WO | 9917518 A1 | 4/1999 |
| WO | 9923806 A1 | 5/1999 |
| WO | 9923807 A1 | 5/1999 |
| WO | 9926395 A1 | 5/1999 |
| WO | 9926424 A2 | 5/1999 |
| WO | 9927698 A1 | 6/1999 |
| WO | 9941720 A1 | 8/1999 |
| WO | 9941890 A2 | 8/1999 |
| WO | 9941891 A1 | 8/1999 |
| WO | 9941895 A1 | 8/1999 |
| WO | 9943137 A1 | 8/1999 |
| WO | 9925117 | 10/1999 |
| WO | 9956227 A1 | 11/1999 |
| WO | 9956229 A1 | 11/1999 |
| WO | 9965214 A1 | 12/1999 |
| WO | 9965252 A2 | 12/1999 |
| WO | 9967718 A1 | 12/1999 |
| WO | 0007332 A2 | 2/2000 |
| WO | 0016203 A1 | 3/2000 |
| WO | 0016207 A1 | 3/2000 |
| WO | 0016523 A1 | 3/2000 |
| WO | 0018094 A1 | 3/2000 |
| WO | 0025238 A1 | 5/2000 |
| WO | 0026804 A1 | 5/2000 |
| WO | 0026816 A1 | 5/2000 |
| WO | 0026817 A1 | 5/2000 |
| WO | 0027063 A2 | 5/2000 |
| WO | 0028425 A1 | 5/2000 |
| WO | 0028702 A1 | 5/2000 |
| WO | 0035173 A1 | 6/2000 |
| WO | 0038398 A1 | 6/2000 |
| WO | 0044159 A1 | 7/2000 |
| WO | 0049482 A2 | 8/2000 |
| WO | 0049778 A1 | 8/2000 |
| WO | 0113606 A1 | 2/2001 |
| WO | 0124025 A1 | 4/2001 |
| WO | 0140997 A1 | 6/2001 |
| WO | 0141372 A1 | 6/2001 |
| WO | 0143410 A1 | 6/2001 |
| WO | 0152513 A1 | 7/2001 |
| WO | 0180214 A1 | 10/2001 |
| WO | 0180540 A1 | 10/2001 |
| WO | 0184360 A1 | 11/2001 |
| WO | 02065741 A2 | 8/2002 |
| WO | 03010948 A1 | 2/2003 |
| WO | 2004063854 A2 | 7/2004 |
| WO | 2005036907 A1 | 4/2005 |
| WO | 2006055059 A2 | 5/2006 |
| WO | 2010075151 A1 | 7/2010 |

OTHER PUBLICATIONS

"Guide for the Use of Micro-Researcher II/SGR (Scroll Graph Section)," NEC Corporation, Third Edition, Chapters 1 & 5, Jul. 1995, 2 pages.

"Kana: Customer Messaging System," Kana Communications Sales Brochure, Palo Alto, CA, 1996, 12 pages.

"Latest Trend in CTI," Nikkei Communications, No. 248, Jun. 16, 1997, 14 pages.

"Method for Automatic Contextual Transposition Upon Receipt of Item of Specified Criteria," IBM Technical Disclosure Bulletin, vol. 37, No. 28, Feb. 1994, 1 page.

"New Telephone Service Changing Computer Telephone Business," Nikkei Communications, Nov. 11, 1996, 7 pages.

"Single Line Suffices for Internet Telephone," Nikkei Communications, May 19, 1997, 9 pages.

"Solution Drivers/CTI, CTI Solution Strategy of Seven Computer Vendors, Toward Market Development of Mainly Bank, Insurance

(56) References Cited

OTHER PUBLICATIONS and Communications Markets," Computopia, Computer Age Co., Ltd., Japan, vol. 33, No. 379, 5 pages, Apr. 1998.
Bachmann, David W. et al., "NetMod: A Design Tool for Large-Scale Heterogeneous Campus Networks," Center for Information Technology Integration (CITI), The University of Michigan, Ann Arbor, MI, Jun. 15, 1990, 34 pages.
Bangun, H. et al., A Network Architecture for Multiuser Networked Games on Demand, International Conference on Information Communications and Signal Processing, ICICS '97, Sep. 9-12, 1997, 5 pages.
Beck, C. et al., Interactive process of operating system for multimedia communication center, Genesys Telecom Lab, Inc. 2014, 3 pages.
Bernett, Howard et al., "Assessing Web-Enabled Call Center Technologies," IT Pro, May/Jun. 2001, 7 pages.
Bertsekas, Dimitri et al., "Data Networks," Prentice-Hall, New Jersey, 1987, 5 pages.
Bickley, M. et al., Using Servers to Enhance Control System Capability, 1999 Particle Accelerator Conference, New York, NY, Mar. 29-Apr. 2, 1999, 3 page.
Bradley, Kirk A. et al., "Detecting Disruptive Routers: A Distributed Network Monitoring Approach," Department of Computer Science, University of California, Davis, Sep. 1, 1998, 10 pages.
Canadian Office Action for Application No. 2,259,912, dated Nov. 19, 2001, 2 pages.
Canadian Office Action for Application No. 2,289,198, dated Jun. 28, 2002, 2 pages.
Canadian Office Action for Application No. 2,302,397, dated Apr. 23, 2002, 2 pages.
Canadian Office Action for Application No. 2,302,678, dated Apr. 23, 2002, 2 pages.
Canadian Office Action for Application No. 2308590, dated Jun. 28, 2002, 2 pages.
Canadian Office Action for Application No. 2309183, dated Jul. 23, 2002, 2 pages.
Canadian Office Action for Application No. 2320978, dated Jun. 2, 2003, 2 pages.
Canadian Office Action for Application No. 2320978, dated Sep. 26, 2002, 2 pages.
Canadian Office Action for Application No. 2334513, dated May 30, 2003, 2 pages.
Canadian Office Action for Application No. 2347721, dated Aug. 12, 2004, 3 pages.
Canadian Office Action for Application No. 2352973, dated Apr. 17, 2003, 3 pages.
Chan, Kevin F. et al., "Interactive Network Planning and Analysis on a Personal Computer," Computer Applications in Power, IEEE, vol. 3, No. 1, Jan. 1990, 5 pages.
Chau, Sam et al., "Intelligent Network Routing Using CCS7 and ISDN," Global Telecommunications Conference, vol. 3, 6 pages, 1990.
Chaudhuri, Surajit et al., "Optimizing Queries over Multimedia Repositories," Hewlett-Packard Laboratories, Stanford, Mar. 1996, 12 pages.
Chaum, David, "Untraceable Electronic Mail, Return Addresses, and Digital Pseudonyms," Communications of the ACM, vol. 24, No. 2, Feb. 1981, 8 pages.
Chew, T.-S. et al., "NETPLAN—a Telecommunications Network Planning Support System," TENCON '92, IEEE Region 10 International Conference, vol. 2, 7 pages, 1992.
Chinese Office Action for Application No. 200980151937.6, dated Jul. 1, 2013, 14 pages.
Chinese Office Action for Application No. 98812258.8 dated Jul. 26, 2002, 5 pages.
Chinese of Action for Application No. 98812259.6, dated Jan. 10, 2003, 9 pages.
Chinese Office Action for Application No. 98812261.8, dated Jun. 20, 2003, 10 pages.
Chinese Office Action for Application No. 99808531.6, dated Mar. 14, 2003, 14 pages.
Chinese Office Action for Application No. 99811995.4, dated Apr. 8, 2005, 6 pages.
Chinese Office Action for Application No. 99811995.4, dated Jul. 6, 2007, 11 pages.
Chinese Office Action for Application No. 99811996.2, dated May 9, 2003, 10 pages.
Chinese Office action for Patent Application No. 200980151937.6, dated Feb. 15, 2015, 6 pages.
Chinese Office action with English Translation for Application No. 200980151937.6 dated May 23, 2014, 7 pages.
Chiu, H. et al., "Conferencing Metaphor," IBM Technical Disclosure Bulletin, vol. 36, No. 2, Feb. 1993, 4 pages.
Chou, Sheng-Lin., et al., "Computer Telephony Integration and Its Applications," IEEE Communications Surveys & Tutorials, vol. 3, No. 1, 2000, 10 pages.
Cordom, Christopher et al., "Conversant VIS Listens and Talks to Your Customers," AT&T Technology, vol. 9, No. 2, 4 pages, 1994.
Curbera, Francisco et al., "Unraveling the Web Services Web: An Introduction to SOAP, WSDL, and UDDI," IEEE Internet Computing, 8 pages, Mar./Apr. 2002.
D'Hooge, Herman, "The Communicating PC," IEEE Communications Magazine, 6 pages, Apr. 1996.
Durinovic-Johri, Sanja et al., "Advanced Routing Solutions for Toll-Free Customers: Algorithm Design and Performance," Proceedings of the International Teletraffic Congress, ITC-15, 1997, 12 pages.
Eren, P. Erhan, et al., "Interactive Object-Based Analysis and Manipulation of Digital Video," IEEE Workshop on Multimedia Signal Processing, 1998, 6 pages.
Esesve, D.R., "Wireless Application Protocol (WAP)," Vitam College of Engineering, No Date Available, 16 pages.
European Office action Application No. 04011886.1, dated Mar. 9, 2007, 6 pages.
European Office action for Application No. 00115441.8, dated Feb. 11, 2004, 7 pages.
European Office action for Application No. 00115441.8, dated Mar. 15, 2005, 4 pages.
European Office Action for Application No. 00115441.8, dated May 18, 2006, 11 pages.
European Office Action for Application No. 00119160.0, dated Jan. 16, 2004, 6 pages.
European Office action for Application No. 00123329.5, dated Jun. 17, 2002, 6 pages.
European Office Action for Application No. 00123331.1, dated Apr. 18, 2006, 5 pages.
European Office Action for Application No. 00305049.9, dated Dec. 29, 2003, 5 pages.
European Office Action for Application No. 00908266.0, dated Aug. 10, 2005, 6 pages.
European Office action for Application No. 02400027.5, dated Jan. 21, 2008, 5 pages.
European Office action for Application No. 02756535.7, dated Aug. 5, 2005, 6 pages.
European Office Action for Application No. 03022831.6, dated Nov. 30, 2006, 7 pages.
European Office Action for Application No. 03800376.0, dated Jul. 8, 2008, 6 pages.
European Office Action for Application No. 04009176.1, dated Oct. 12, 2011, 8 pages.
European Office Action for Application No. 97904087.0, dated Jun. 25, 2002, 5 pages.
European Office Action for Application No. 97933327.5, dated Aug. 26, 2002, 4 pages.
European Office Action for Application No. 97933327.5, dated Feb. 7, 2002, 5 pages.
European Office Action for Application No. 98903471.5, dated May 29, 2006, 4 pages.
European Office Action for Application No. 98903471.5, dated Oct. 11, 2004, 6 pages.
European Office Action for Application No. 98908545.1, dated Mar. 15, 2005, 4 pages.

(56) References Cited

OTHER PUBLICATIONS

European Office Action for Application No. 98908545.1, dated Nov. 14, 2003, 10 pages.
European Office Action for Application No. 98924821.6, dated Aug. 26, 2003, 4 pages.
European Office Action for Application No. 98926248.0, dated Aug. 5, 2004, 4 pages.
European Office Action for Application No. 98926248.0, dated Dec. 11, 2003, 4 pages.
European Office Action for Application No. 98926248.0, dated Oct. 21, 2002, 6 pages.
European Office Action for Application No. 98944799.0, dated Aug. 18, 2005, 7 pages.
European Office Action for Application No. 98944799.0, dated Mar. 26, 2008, 5 pages.
European Office Action for Application No. 98944830.3, dated Jan. 30, 2006, 9 pages.
European Office Action for Application No. 98946907,7, dated Jun. 1, 2006, 6 pages.
European Office Action for Application No. 98946926.7, dated Dec. 8, 2005, 4 pages.
European Office Action for Application No. 98953947.3, dated Aug. 22, 2006, 6 pages.
European Office Action for Application No. 98953962.2, dated Oct. 28, 2005, 5 pages.
European Office Action for Application No. 98956309.3, dated Jun. 8, 2005, 5 pages.
European Office Action for Application No. 99905907.4, dated Oct. 31, 2005, 4 pages.
European Office Action for Application No. 99906856.2, dated Sep. 24, 2007, 5 pages.
European Office Action for Application No. 99906958,6, dated Feb. 22, 2006, 7 pages.
European Office Action for Application No. 99927333.7, dated Aug. 21, 2006, 9 pages.
European Office Action for Application No. 99927340.2, dated Aug. 9, 2011, 6 pages.
European Office Action for Application No. 99927340.2, dated Nov. 25, 2013, 5 pages.
European Office Action for Application No. 99945479.6, dated Aug. 9, 2006, 6 pages.
European Office Action for Application No. 99945519.9, dated Aug. 20, 2007, 6 pages.
European Office action for Application No. 99956732.4, dated Aug. 17, 2006, 7 pages.
European Office action for Application No. 99956745.6, dated Mar. 14, 2006, 5 pages.
European Office Action for Application No. 99960267.5, dated May 10, 2007, 6 pages.
European Office Action for Application No. 99960279.0, dated Aug. 16, 2005, 6 pages.
European Office Action for Application No. 99965163.1, dated Jul. 13, 2009, 5 pages.
European Search Report and Written Opinion for Application No. 05783002.8, dated Mar. 16, 2009, 8 pages.
European Search Report for 0115441.8 (now EP1075153), dated Nov. 6, 2002, 3 pages.
European Search Report for Application No. 00123329.5, dated Jan. 30, 2002, 2 pages.
European Search Report for Application No. 00123331.1, dated Dec. 5, 2003, 6 pages.
European Search Report for Application No. 00305049.9, dated May 7, 2003, 3 pages.
European Search Report for Application No. 00908266.0, dated May 24, 2005, 3 pages.
European Search Report for Application No. 00913226.7, dated Feb. 14, 2005, 3 pages.
European Search Report for Application No. 0119160.0, dated Apr. 17, 2003, 3 pages.
European Search Report for Application No. 01920248.0, dated May 3, 2004, 3 pages.
European Search Report for Application No. 01927387.9, dated Jun. 2, 2006, 3 pages.
European Search Report for Application No. 02400027.5, dated Feb. 20, 2004, 3 pages.
European Search Report for Application No. 02756535.7, dated May 25, 2005, 4 pages.
European Search Report for Application No. 03002575.3, dated Jun. 4, 2003, 3 pages.
European Search Report for Application No. 03008532.8, dated Dec. 27, 2004, 3 pages.
European Search Report for Application No. 03008534.4, dated Jul. 23, 2003, 3 pages.
European Search Report for Application No. 03022831.6, dated Mar. 22, 2006, 3 pages.
European Search Report for Application No. 03023463.7, dated Jun. 14, 2004, 3 pages.
European Search Report for Application No. 03076826.1, dated Sep. 10, 2003, 3 pages.
European Search Report for Application No. 03077174.5, dated Sep. 4, 2003, 4 pages.
European Search Report for Application No. 03077712.2, dated Mar. 29, 2004, 3 pages.
European Search Report for Application No. 03800376, dated May 7, 2007, 3 pages.
European Search Report for Application No. 04007911.3, dated Aug. 17, 2004, 5 pages.
European Search Report for Application No. 04007913.9, dated Aug. 5, 2004, 4 pages.
European Search Report for Application No. 04011886.1, dated Jun. 22, 2006, 5 pages.
European Search Report for Application No. 07018035.1, dated Apr. 23, 2009, 4 pages.
European Search Report for Application No. 97904087.0, dated Nov. 5, 2001, 3 pages.
European Search Report for Application No. 97933327.5, dated Oct. 11, 2001, 3 pages.
European Search Report for Application No. 98903471.5, dated Jul. 26, 2002, 4 pages.
European Search Report for Application No. 98903623.1, dated Apr. 17, 2002, 3 pages.
European Search Report for Application No. 98907371.3, dated Mar. 28, 2002, 3 pages.
European Search Report for Application No. 98924821.6, dated Jun. 13, 2002, 2 pages.
European Search Report for Application No. 98926248, dated Jul. 18, 2002, 3 pages.
European Search Report for Application No. 98944799.0, dated Aug. 5, 2004, 3 pages.
European Search Report for Application No. 98944830.3, dated Aug. 11, 2004, 3 pages.
European Search Report for Application No. 98946907.7, dated Aug. 11, 2004, 3 pages.
European Search Report for Application No. 98946926.7, dated Aug. 11, 2004, 3 pages.
European Search Report for Application No. 98948163.5, dated Aug. 8, 2000, 3 pages.
European Search Report for Application No. 98948164.3, dated Jun. 15, 2004, 3 pages.
European Search Report for Application No. 98953947.3, dated Aug. 20, 2004, 3 pages.
European Search Report for Application No. 98953962.2, dated Sep. 2, 2004, 3 pages.
European Search Report for Application No. 98956187.3, dated Sep. 16, 2005, 3 pages.
European Search Report for Application No. 98956309.3, dated Sep. 10, 2004, 3 pages.
European Search Report for Application No. 99905907.4, dated Jun. 1, 2005, 3 pages.
European Search Report for Application No. 99906856.2, dated Oct. 4, 2006, 3 pages.

(56) References Cited

OTHER PUBLICATIONS

European Search Report for Application No. 99906958.6, dated Aug. 19, 2005, 3 pages.
European Search Report for Application No. 99927333.7, dated Mar. 30, 2005, 5 pages.
European Search Report for Application No. 99927340.2, dated Oct. 18, 2004, 3 pages.
European Search Report for Application No. 99945479.6, dated Mar. 24, 2006, 3 pages.
European Search Report for Application No. 99945519.9, dated Oct. 18, 2005, 3 pages.
European Search Report for Application No. 99945556.1, dated Nov. 16, 2004, 3 pages.
European Search Report for Application No. 99956732,4, dated Apr. 19, 2006, 4 pages.
European Search Report for Application No. 99956745.6, dated Jun. 30, 2005, 3 pages.
European Search Report for Application No. 99960267.5, dated Jul. 14, 2005, 3 pages.
European Search Report for Application No. 99960279.0, dated Apr. 26, 2005, 3 pages.
European Search Report for Application No. 99965163.1, dated Nov. 19, 2004, 4 pages.
European Search Report for Application No. 99971602.0, dated Feb. 6, 2007, 3 pages.
Festa, Paul, "Vignette Updates StoryServer Platform," CNET News.com, Sep. 16, 1997, 4 pages.
Foster, Robin Harris, "Advanced DEFINITY Call Centers: Working for You and Your Customers," AT&T Technology, vol. 9, No. 2, 1994, 6 pages.
Francis, Paul et al., "Flexible Routing and Addressing for a Next Generation IP," SIGCOMM, 10 pages, 1994.
Gawrys, G.W., et al., "ISDN: Integrated Network/Premises Solutions for Customer Needs," ICC, 6 pages, 1986.
Gechter, J. et al., "ISDN Service Opportunities in the Intelligent Network," Proceedings of the National Communications Forum, Chicago, IL, vol. 43, No. 1, Oct. 1989, 4 pages.
Harvey, Dean E. et al., "Call Center Solutions," AT&T Technical Journal, vol. 70, No. 5, 10 pages, Sep./Oct. 1991.
Held, Gilbert, "Voice Over Data Networks," McGraw Hill, Texas, 1998, 16 pages.
Henderson, Shane G. et al., "Rostering by Interating Integer Programming and Simulation," Proceedings of the 1998 Winter Simulation Conference, Washington D.C., Dec. 13, 1998, 7 pages.
Hofmann, Peter, et al., "@INGate: Integrating Telephony and Internet," IEEE Conference on Protocols for Multimedia Systems, 4 pages, Nov. 1997.
House, Eric, "How to Munge Outgoing From: Field When Using Mail?," Google Discussion Group, Apr. 2, 1997, 1 page.
Hu, Michael Junke et al., "An Object-Relational Database System for the Interactive Multimedia," IEEE International Conference on Intelligent Processing Systems, pp. 1571-1575, Oct. 1997.
International Preliminary Examination Report for PCT/US01/13313, dated Apr. 22, 2002, 4 pages.
International Preliminary Examination Report for PCT/US01/40267, dated Dec. 9, 2002, 4 pages.
International Preliminary Examination Report for PCT/US96/16919, dated Feb. 18, 1998, 18 pages.
International Preliminary Examination Report for PCT/US97/01469, dated Oct. 14, 1998, 8 pages.
International Preliminary Examination Report for PCT/US97/11881, dated Mar. 27, 1998, 3 pages.
International Preliminary Examination Report for PCT/US98/00631, dated Sep. 10, 1999, 7 pages.
International Preliminary Examination Report for PCT/US98/02847, dated Jul. 9, 1999, 5 pages.
International Preliminary Examination Report for PCT/US98/13644, dated Jan. 12, 2000, 6 pages.
international Preliminary Examination Report for PCT/US98/18646, dated Oct. 30, 2000, 5 pages.
International Preliminary Examination Report for PCT/US98/18789, dated Dec. 30, 1999, 6 pages.
International Preliminary Examination Report for PCT/US98/22527, dated Jun. 30, 2000, 5 pages.
International Preliminary Examination Report for PCT/US99/12841, dated Jan. 22, 2001, 5 pages.
International Preliminary Examination Report for PCT/US99/25308, dated Sep. 10, 2000, 3 pages.
International Preliminary Examination Report for PCT/U599/25309, dated May 8, 2001, 4 pages.
International Preliminary Report on Patentability for PCT/US2005/027544, dated May 22, 2007, 7 pages.
International Search Report and Written Opinion for PCT/US2009/068402, dated Mar. 31, 2010, 10 pages.
International Search Report for PCT/US00/00781, dated Apr. 12, 2000, 2 pages.
International Search Report for PCT/US00/00785, dated Oct. 2, 2000, 2 pages.
International Search Report for PCT/US00/023066, dated Oct. 30, 2000, 1 page.
International Search Report for PCT/US00/27982, dated Jan. 31, 2001, 3 pages.
International Search Report for PCT/US00/27983, dated Mar. 19, 2001, 2 pages.
International Search Report for PCT/US00/27984, dated Mar. 22, 2001, 1 page.
International Search Report for PCT/US01/07457, dated Aug. 30, 2001, 1 page.
International Search Report for PCT/US01/13313, dated Jul. 6, 2001, 1 page.
International Search Report for PCT/US01/40267, dated Jul. 17, 2001, 1 page.
International Search Report for PCT/US02/23080, dated Oct. 1, 2002, 1 page.
International Search Report for PCT/US03/41677, dated Apr. 10, 2006, 1 page.
International Search Report for PCT/US05/27544, dated Jun. 14, 2006, 1 page.
International Search Report for PCT/US96/16919, dated Jun. 2, 1997, 3 pages.
International Search Report for PCT/US97/01469, dated Apr. 14, 1997, 1 page.
International Search Report for PCT/US97/05457, dated Jun. 24, 1997, 2 pages.
International Search Report for PCT/US97/11881, dated Oct. 24, 1997, 1 page.
International Search Report for PCT/US98/00631, dated Jun. 18, 1998, 1 page.
International Search Report for PCT/US98/01158, dated Jul. 17, 1998, 1 page.
International Search Report for PCT/US98/02152, dated Jun. 25, 1998, 1 page.
International Search Report for PCT/US98/02847, dated Aug. 6, 1998, 1 page.
International Search Report for PCT/US98/02848, dated Aug. 11, 1998, 1 page.
International Search Report for PCT/US98/02923, dated Aug. 19, 1998, 1 page.
International Search Report for PCT/US98/06334, dated Sep. 1, 1998, 2 pages.
International Search Report for PCT/US98/10357, dated Jan. 14, 1999, 1 page.
International Search Report for PCT/US98/11442, dated Oct. 21, 1998, 2 pages.
International Search Report for PCT/US98/13644, dated Apr. 21, 1999, 2 pages.
International Search Report for PCT/US98/18646, dated Jan. 29, 1999, 2 pages.
International Search Report for PCT/US98/18789, dated Jan. 29, 1999, 3 pages.
International Search Report for PCT/US98/18833, dated Nov. 19, 1998, 1 page.

(56) References Cited

OTHER PUBLICATIONS

International Search Report for PCT/US98/18874, dated Jan. 29, 1999, 1 page.
International Search Report for PCT/US98/18989, dated Jan. 25, 1999, 1 page.
International Search Report for PCT/US98/22527, dated Apr. 2, 1999, 2 pages.
International Search Report for PCT/US98/22555, mailed Mar. 3, 1999, 1 page.
International Search Report for PCT/US98/22600, mailed Jun. 4, 1999, 1 page.
International Search Report for PCT/US98/22935, mailed Apr. 14, 1999, 1 page.
International Search Report for PCT/US99/02812, mailed May 11, 1999, 1 page.
International Search Report for PCT/US99/02814, mailed Jun. 17, 1999, 1 page.
International Search Report for PCT/US99/02822, mailed Aug. 18, 1999, 1 page.
International Search Report for PCT/US99/03038, mailed Apr. 23, 1999, 1 page.
International Search Report for PCT/US99/03039, mailed May 11, 1999, 1 page.
International Search Report for PCT/US99/12700, mailed Nov. 30, 1999, 1 page.
International Search Report for PCT/US99/12781, mailed Sep. 9, 1999, 2 pages.
International Search Report for PCT/US99/12841, mailed Sep. 10, 1999, 2 pages.
International Search Report for PCT/US99/20259, dated Feb. 15, 2000, 1 page.
International Search Report for PCT/US99/20387, dated Dec. 7, 1999, 2 pages.
International Search Report for PCT/US99/20461, dated Dec. 23, 1999, 2 pages.
International Search Report for PCT/US99/25117, dated Nov. 1, 2000, 2 pages.
International Search Report for PCT/US99/25265, dated Feb. 18, 2000, 1 page.
International Search Report for PCT/US99/25308, dated Feb. 3, 2000, 1 page.
International Search Report for PCT/US99/25309, dated Feb. 10, 2000, 1 page.
International Search Report for PCT/US99/25310, dated Feb. 10, 2000, 1 page.
International Search Report for PCT/US99/26619, dated Mar. 17, 2000, 1 page.
International Search Report for PCT/US99/26659, dated Feb. 4, 2000, 1 page.
International Search Report for PCT/US99/29043, dated Mar. 20, 2000, 1 page.
International Search Report for PCT/US99/29044, dated May 11, 2000, 1 page.
International Written Opinion for PCT/US98/22527, mailed Dec. 27, 1999, 5 pages.
Japanese Interrogation and Re-Examination Report for Application No. 1999-502827, mailed Oct. 26, 2004, 7 pages.
Japanese Office Action for Application No. 1997-527811, mailed Oct. 10, 2000, 6 pages.
Japanese Office Action for Application No. 1998-505335, mailed Mar. 5, 2002, 7 pages.
Japanese Office Action for Application No. 1998-531244, mailed Jan. 6, 2004, 4 pages.
Japanese Office Action for Application No. 1998-531244, mailed Sep. 10, 2002, 5 pages.
Japanese Office Action for Application No. 1998-536740, mailed Feb. 24, 2004, 5 pages.
Japanese Office Action for Application No. 1998-536740, mailed Sep. 3, 2002, 14 pages.
Japanese Office Action for Application No. 1999-500765, mailed Feb. 10, 2004, 6 pages.
Japanese Office Action for Application No. 1999-500765, mailed Sep. 3, 2002, 11 pages.
Japanese Office Action for Application No. 1999-502827, mailed Dec. 3, 2002, 4 pages.
Japanese Office Action for Application No. 1999-502827, mailed May 28, 2002, 3 pages.
Japanese Office Action for Application No. 1999-502827, mailed Nov. 1, 2005, 8 pages.
Japanese Office action for Application No. 2000-220082, mailed on Apr. 1, 2003, 3 pages.
Japanese Office Action for Application No. 2000-511299, mailed Feb. 3, 2004, 4 pages.
Japanese Office Action for Application No. 2000-511299, mailed May 16, 2006, 7 pages.
Japanese Office Action for Application No. 2000-512333, mailed Sep. 3, 2002, 6 pages.
Japanese Office Action for Application No. 2000-512334, mailed Sep. 10, 2002, 9 pages.
Japanese Office Action for Application No. 2000-512336, mailed Jul. 23, 2002, 8 pages.
Japanese Office Action for Application No. 2000-512336, mailed Jun. 24, 2003, 4 pages.
Japanese Office Action for Application No. 2000-514448, mailed Sep. 3, 2002, 10 pages.
Japanese Office Action for Application No. 2000-519541, dated May 16, 2005, 4 pages.
Japanese Office Action for Application No. 2000-519541, mailed Aug. 20, 2002, 10 pages.
Japanese Office Action for Application No. 2000-519541, mailed Dec. 2, 2003, 7 pages.
Japanese Office Action for Application No. 2000-519541, mailed Mar. 14, 2006, 6 pages.
Japanese Office Action for Application No. 2000-522718, mailed Sep. 10, 2002, 9 pages.
Japanese Office Action for Application No. 2000-531822, mailed Sep. 24, 2002, 6 pages.
Japanese Office Action for Application No. 2000-531940, mailed Dec. 3, 2002, 4 pages.
Japanese Office Action for Application No. 2000-532958, mailed Aug. 20, 2002, 7 pages.
Japanese Office Action for Application No. 2000-554115, dated Apr. 27, 2005, 5 pages.
Japanese Office Action for Application No. 2000-554115, mailed Jan. 6, 2004, 4 pages.
Japanese Office Action for Application No. 2000-554115, mailed Oct. 1, 2002, 5 pages.
Japanese Office Action for Application No. 2000-556311, mailed Oct. 21, 2003, 6 pages.
Japanese Office Action for Application No. 2000-570673, dated Oct. 4, 2005, 4 pages.
Japanese Office Action for Application No. 2000-570673, mailed Mar. 8, 2005, 6 pages.
Japanese Office Action for Application No. 2000-570673, mailed Oct. 14, 2003, 6 pages.
Japanese Office Action for Application No. 2000-570677, mailed May 11, 2004, 8 pages.
Japanese Office Action for Application No. 2000-570677, mailed Nov. 30, 2004, 10 pages.
Japanese Office Action for Application No. 2000-570941, mailed Oct. 7, 2003, 6 pages.
Japanese Office Action for Application No. 2000-578753, mailed May 11, 2004, 11 pages.
Japanese Office Action for Application No. 2000-580124, mailed Apr. 12, 2005, 6 pages.
Japanese Office Action for Application No. 2000-580124, mailed Oct. 7, 2003, 5 pages.
Japanese Office Action for Application No. 2000-580329, mailed Feb. 15, 2005, 8 pages.
Japanese Office Action for Application No. 2000-580329, mailed May 13, 2008, 8 pages.

(56) References Cited

OTHER PUBLICATIONS

Japanese Office Action for Application No. 2000-580329, mailed Oct. 4, 2005, 5 pages.
Japanese Office Action for Application No. 2000-581781, mailed Feb. 3, 2004, 4 pages.
Japanese Office Action for Application No. 2000-581781, mailed Oct. 8, 2002, 4 pages.
Japanese Office Action for Application No. 2000-590363, mailed Apr. 1, 2003, 6 pages.
Japanese Office Action for Application No. 2001-526724, mailed Aug. 1, 2006, 5 pages.
Japanese Office Action for Application No. 2001-526724, mailed Dec. 13, 2005, 5 pages.
Japanese Office Action for Application No. 2001-526724, mailed May 17, 2005, 4 pages.
Japanese Office Action for Application No. 2006-127262, mailed Jun. 1, 2010 (5 pages).
Japanese Office Action for Application No. 2006-127262, mailed Nov. 18, 2008 (7 pages).
Japanese Office Action for Application No. 2011-543586, mailed Jan. 24, 2013, 5 pages.
Japanese Office Action for Application No. 532950, dated Dec. 17, 2002, 6 pages.
Katz, Michael, "When CTI Meets the Internet" Telecommunications, vol. 31, No. 7, Jul. 1997, 6 pages.
Kaufman, Harvey, "Call Centers in Cyberspace," Communications News, vol. 34, Issue 7, Jul. 1997, 4 pages.
Kaukonen, S., et al., "Agent-Based Conferencing Using Mobile IP-Telephony," Proceedings of Multimedia Signal Processing, 1999, 6 pages.
Korean Office Action for Application No. 10-2011-7016735, dated Jun. 13, 2013, 3 pages.
Korean Office Action for Application No. 10-2011-7017067, dated Aug. 21, 2012, 9 pages.
Kramer, Brian, "How to Send a File to the Sender of a Message?," Google Discussion Group, May 27, 1994, 5 pages.
Lee, Chien-I, et al., "A New Storage and Retrieval Method to Support Editing Operations in a Multi-Disk-based Video Server," Fourth International Conference on Parallel and Distributed Information Systems, IEEE, Miami Beach, FL, Dec. 1996, 10 pages.
Lin, Yi-Bing et al., "A Flexible Graphical User Interface for Performance Modeling," Software—Practice and Experience, vol. 25(2), Feb. 1995, 24 pages.
Low, Colin, "The Internet Telephony Red Herring," Global Telecommunications Conference, May 1996, 9 pages.
Mackay, Wendy E., et al., "Virtual Video Editing in Interactive Multimedia Applications," Communications of the ACM, vol. 32, No. 7, Jul. 1989, 9 pages.
Malabocchia, Fabio, et al., "Mining Telecommunications Data Bases: An Approach to Support the Business Management," Network Operations and Management Symposium, IEEE, vol. 1, Feb. 1998, 9 pages.
Masashi, Tsuboi et al., "Computer Telephony Integration System," CTSTAGE, Oki Electric Research and Development, 174, vol. 64, No. 2, Apr. 1, 1997, 10 pages.
Matsumoto, Akihiko, "Bank CTI/Call Center Using Up Customer Information, Analysis of Six Major Manufacturers' Solutions," Network Computing, Ric Telecom Corporation, Japan, vol. 10, No. 10, Oct. 1, 1998, 13 pages.
Matsuo, Yasunori, "Microsoft Project for Windows 95," Nikkei Personal Computing, Nikkei Business Publications, Inc., No. 255, Dec. 18, 1995, 2 pages.
Mattison, Rob, "Data Warehousing and Data Mining for Telecommunications," Artech House, Boston, 1997, 7 pages.
Metz, Christopher, "IP Routers: New Tool for Gigabit Networking," On the Wire, IEEE Internet, Nov./Dec. 1998, 5 pages.
Microsoft Dictionary Pages, Microsoft Press, Redmond, WA, 1991, 2 pages.
Monson-Haefel, Richard, "Enterprise JavaBeans," O'Reilly & Assoc., 2nd Ed., 1999, 7 pages.
Murayama, Hideki, "Integrated Customer Supporting System View Workshop/CS, OA Business Personal Computer," NEC Business System, Denpa Press Co., Ltd., vol. 15, No. 12, Dec. 1997, 6 pages.
Nariani, Sushil, "Internet Telephony," Whatis.com, Oct. 25, 1999, 2 pages.
Newton's Telecom Dictionary, The Official Dictionary of Telcommunications & the Internet, 16th Edition, Telecom Books, Feb. 2000, 3 pages.
Newton, Harry, "Newton's Telecom Dictionary," Flatiron Publishing, New York, 1994, 7 pages.
Orozco-Barbosa, Luis et al., "Design and Performance Evaluation of Intelligent Multimedia Services," Computer Communications, vol. 20, 1997, 14 pages.
Padmanabhan, M., et al. Speech Recognition Performance on a Voicemail Transcription Task, IBM T.J. Watson Research Center, Yorktown Height, NY, 4 pages.
Rangan, P. Venkat, et al., "A Window-Based Editor for Digital Video and Audio," Proceedings of the 25th Hawaii International Conference on System Sciences, IEEE, vol. 2, Jan. 1992, 9 pages.
Recker, Mimi M. et al., "Predicting Document Access in Large, Multimedia Repositories," ACM Transactions on Computer-Human Interaction, vol. 3, 1994, 23 pages.
Rodriguez-Martinez, Manuel et al., "MOCHA: A Self-Extensible Database Middleware System for Distributed Data Sources," International Conference on Management Data—SIGMOD, 2000, 12 pages.
Rosenberg, Arthur M., "Call Center Computer Telephony: Technology Overview," Gartner, Inc., Jan. 1998 (24 pages).
Schmandt, Chris, "Phoneshell: The Telephone as Computer Terminal," Proceedings of ACM Multimedia Conference, 1993, 10 pages.
Sekine, Shoji et al., "Front Office Oriented Solution for Customer Satisfaction and Profit Expansion," Hitachi Hyoron Co, Ltd., Japan, vol. 80, No. 9, Sep. 1998, 11 pages.
Semilof, Margie, "Call Centers Go On-Line," Communications Week, No Date Available, 2 pages.
Sevcik, Peter et al., "The Call Center Revolution," Northeast Consulting Technical Paper, Jan. 1, 1997, 12 pages.
Smith, J.D., An Overview to Computer-Telecommunications Integration (CTI), Telecommunications, Conference Publication No. 404, IEEE, Mar. 26-29, 1995, 5 pages.
Sulkin, Allan, Building the ACD-LAN Connection, Business Communications Review, Jun. 1996, 4 pages.
Supplemental European Search Report for Application No. 98908545.1, dated Sep. 5, 2002, 4 pages.
Szlam, Aleksander et al., "Predictive Dialing Fundamentals," Flatiron Publishing, New York, 1996, 28 pages.
Tadamura, Katsumi et al., "Synchronizing Computer Graphics Animation and Audio," IEEE, 1998, 11 pages.
Taisei, Mori et al., "Call Center: Promotion of Information Use with a Direct Link to Core Business with Eye on the Internet Customer," Ric Telecom Corporation, Japan, vol. 10, No. 8, Aug. 1, 1998, 9 pages.
Tang, Jingrong et al., "Advanced Service Architecture for H.323 Internet Protocol Telephony," Computer Communications, vol. 23, 2000, 14 pages.
Thio, Fu Wang et al., "Distributed Multimedia Database: A Design and Application Study," The Fourth International Conference on High Performance Computing in the Asia-Pacific Region, IEEE, Beijing, China, vol. 2, May 2000, 6 pages.
Toji, Ryutaro et al., "A Study of Customer Contact Operation System and Functions," Proceedings of the IECE General Conference, Comm. 2, Mar. 6, 1997, 3 pages.
Toji, Ryutaro et al., "OCN Multimedia Customer Contact System," NTT Technical Journal, The Telecommunication Association, Japan, vol. 10, No. 1, Jan. 1, 1998, 6 pages.
Tsunemasa, Mizuo., "CTI World 2: World of CTI," Business Communication, vol. 34, No. 2, Feb. 1, 1997, 13 pages.
Van Zijl, Lynette, et al., "A Tool for Graphical Network Modeling and Analysis," IEEE Software, Jan. 1992, 8 pages.
Vazquez, E., et al., Graphical Interface for Communication Network Analysis and Simulation, Department of Telematic Engineering, Technical University of Madrid, IEE, 1991, Spain, 4 pages.

(56) References Cited

OTHER PUBLICATIONS

Wagner, Susanne., "Intralingual Speech-to-Text Conversion in Real-Time: Challenges and Opportunities," Challenges of Multidimensional Translation Conference Proceedings, 2005, 10 pages.
Wang, Yong et al, "Real-time scheduling for multi-agent call center automation", Information service agents lab, school of computing science Simon Fraser University, Burnaby,BC Canada, 1999, 13 pages.
Wolter, Roger., "XML Web Services Basics," Microsoft Corporation, Dec. 2001, 4 pages.
Zenel, Bruce et al., Intelligent Communication Filtering for Limited Bandwidth Environments, Computer Science Department, Columnia University, IEEE, 1995, 7 pages.

* cited by examiner

METHOD FOR IMPLEMENTING AND EXECUTING COMMUNICATION CENTER ROUTING STRATEGIES REPRESENTED IN EXTENSIBLE MARKUP LANGUAGE

CROSS-REFERENCE TO RELATED APPLICATIONS

The present application is a continuation of U.S. patent application entitled "Method for Implementing and Executing Communication Center Routing Strategies Represented in Extensible Markup Language" bearing Ser. No. 11/317,105, filed on Dec. 22, 2005, now U.S. Pat. No. 7,907,598. Application Ser. No. 11/317,105 is a continuation-in-part (CIP) to a U.S. patent application entitled "Using XML Expressed Primitives for Platform and System- Independent Call Modeling" bearing Ser. No. 09/827,608, filed on Apr. 6, 2001, now U.S. Pat. No. 6,985,478, which claims priority to a U.S. provisional patent application Ser. No. 60/267,294 of the same title filed on Feb. 7, 2001. Application Ser. No. 09/827,608 is also a CIP of U.S. patent application Ser. No. 09/024,923 entitled "Telephone Network Interface Bridge Between Data Telephony Networks and Dedicated Connection Telephony Networks" filed on Feb. 17, 1998, now U.S. Pat. 8,130,749. Complete disclosure of the priority documents is included herein in entirety at least by reference.

BACKGROUND OF THE INVENTION

1. Field of the Invention

The present invention is in the area of computer-telephony-integrated (CTI) telephone systems including Internet Protocol Network Telephony (IPNT) systems, and pertains more particularly to methods for expressing and implementing intelligent interaction routing across disparate telephony networks and systems using a simple XML-based markup language.

2. Discussion of the State of the Art

In the field of telephony communication, there have been many technological advances in technology over the years that have contributed to more efficient use of telephone communication within hosted call-center environments. Most of these improvements involve integrating the telephones and switching systems in such call centers with computer hardware and software adapted for, among other things, better routing of telephone calls, faster delivery of telephone calls and associated information, and improved service with regards to client satisfaction. Such computer-enhanced telephony is known in the art as computer-telephony integration (CTI).

In a computer-telephony-integrated (CTI) enhanced call center, telephones at agent stations are connected to a central telephony switching apparatus, such as an automatic call distributor (ACD) switch or a private branch exchange (PBX). The agent stations may also be equipped with computer terminals such as personal computer/video display units (PC/VDUs) so that agents manning such stations may have access to stored data as well as being linked to incoming callers by telephone equipment. Such stations may be interconnected through the PC/VDUs by a local area network (LAN). One or more data or transaction servers may also be connected to the LAN that interconnects agent stations. The LAN is, in turn, connected to the CTI processor, which is connected to the call switching apparatus of the call center.

A typical data network telephony (DNT) system uses shared bandwidth instead of a dedicated connection. Recent improvements to available technologies associated with the transmission and reception of data packets during real-time DNT communication have made it possible to successfully add DNT principally Internet Protocol Network Telephony (IPNT) capabilities to existing CTI call centers.

Companies have, for some time, experimented with various forms of integration between the older connection oriented switched telephony (COST) systems and newer Internet Protocol Network Telephony (IPNT) systems. For example, by enhancing data servers, interactive voice response units (IVR), agent-connecting networks, and so on, with the capability of understanding Internet protocol, data arriving from either network may be integrated requiring less equipment and lines to facilitate processing, storage, and transfer of data.

In a network system known to the inventors and described with reference to Ser. No. 09/024,923, listed in the Cross-Reference section, a computerized telephony bridge unit maintained in the network has a Data Network Telephony (DNT) Port and a Connection Oriented/Switched Telephony (COST) trunk port. Each port is associated with circuitry for receiving and placing calls in the data format required by the connected networks. The bridge unit further comprises conversion circuitry for converting data dynamically between network protocols compatible with each connected network.

In this system, control routines are provided and are executable on the computerized bridge unit. The control routines are adapted to receive a first call from one of the COST or DNT networks, to place a call associated with the received call on the network other than the network on which the call is received, and to dynamically convert data between a call connected at one port and a call connected at the other port. The data network can be the Internet, and the COST network can be any publicly or privately switched dedicated-connection-oriented telephone network.

One with skill in the art will recognize that there are several Internet protocols, CTI protocols, and Device protocols, which have been proposed and adopted as standard or semi-standard protocols for streamlining integrated telephony between disparate networks. For example, an Internet protocol known in the art as H.323 is a standard approved by the International Telecommunication Union (ITU) that defines how audiovisual conferencing data is transmitted across networks. In theory, H.323 should enable users to participate in a same telephony conference even though they are using different videoconferencing applications. Although most videoconferencing vendors maintain that their products conform to H.323, such adherence may not actually produce seamless inter-operability.

Telcordia™ developed another known protocol termed Media Gateway Control Protocol (MGCP) in cooperation with Level 3 Communications™. This protocol is an internal protocol, which was developed to work with existing signaling protocols such as H.323, SIP or SS7. One reason new standards are being developed is because of the growing popularity of what is termed Voice over IP (VoIP).

The inventors know a protocol representing a basic telephony call model as Computer-Supported Telephony Applications (CSTA). ECMA is the international standards organization that defined the CSTA resource model and protocol. To connect a telephone system to Computer Telephony (CT) Connect, a telephone system vendor must provide a CSTA-compliant, ASN.1 encoded message flow. This can be provided across a number of different transports, but TCP/IP is becoming the most popular.

Although the developed protocols do much to facilitate seamless communication between networks adding some third party call control, it becomes apparent that third party control over telephony practiced in VoIP applications is severely limited. Arguably, a significant challenge is providing consistent call model representation both at the call control entity (CCE) and the switching entity (SWE). Any discrepancy between an actual call model implemented by a switch vendor and its reverse-engineered replica in CTI control software causes loss of coherency between the actual switching state and its image in the control software.

The inventor is aware of a system, referenced above as U.S. patent application Ser. No. 09/827,608, for providing third-party call control in a telecommunications environment. The system comprises a call-control mechanism for providing service logic and routing intelligence, a control application for providing service-logic description and command instruction for implementing third-party controlled call connections, a call-switching mechanism for providing an abstract state of switching matrix and for commutation of external and internal call legs, and a commutation application for making and breaking call connections according to commands sent from the control application. The call-control mechanism, using the control application, sends primitive text commands, which may be in the form of an Extensible Markup Language (XML) to the call-switching mechanism, which utilizing the commutation application, receives, reads and implements the text commands containing all of the service logic and instructions required to successfully construct call external and internal connection legs and wherein the call-switching mechanism by virtue of the commutation application sends notification of success or failure regarding implementation of received commands back to the control application.

While the above system provides a solution to the so-far-mentioned problems of representing accurate call models for integrated telephony platforms, it only addresses using XML-based language to achieve system communication of the more simple CTI call-control functions and call states as are currently handled using call control XML (CCXML) and VoiceXML (VXML), both of which are recommended by the World Wide Web Consortium.

In actual practice, communication center (CC) telephony applications are much more complex in scope and represent much more than simple call control commands and Interactive Voice Response (IVR) system scripting. A typical CC application today may include interactive voice response (IVR) scripts, intelligent routing strategies, various call control scenarios, agent scripting, statistical reporting, interaction workflow processing, agent level routing, customer profile-related routing, outbound call support, and multimedia interactions.

In current art, the above-mentioned components may be distributed over different servers and may be built with the aid of different tools and in different languages. Therefore, a CC application designer must work with many different tools to create one CC application. Such a multi-tool effort requires a very high level of expertise and effort.

In current art, achieving uniformity, platform independence, vendor neutrality, and simplification in creation of business applications is facilitated through implementation of Extensible Markup Language (XML) and related technologies. XML is increasingly used as a basis for building applications in different vertical businesses. Good examples of using XML in voice processing are the World Wide Web Consortium-recommended VXML and CCXML. However, VXML and CCXML allow only limited call control in CC applications, capturing only IVR scripting and simple call control routines. VXML and CCXML do not address other important aspects of CC applications such interaction workflow, interaction routing, agent involvement such as agent scripting and agent selection, reporting, customer profiling, outbound calling, and multimedia interaction.

The most complicated part of the design process may be writing a routing strategy. A writing strategy defines a target of an interaction based on business data related to interaction, time and data, application-specific data, agent skills, and so on. Moreover, a routing strategy may perform workflow functionality such as sending an interaction to an IVR system for collecting additional data.

What is clearly needed in the art is a method and system for an enhanced and expanded VXML and CCXML that can express routing strategies in terms of XML-based notation thereby simplifying and streamlining the job of application design and enabling creation of reusable modules.

SUMMARY OF THE INVENTION

According to one aspect of the present invention, a method is provided for supplementing existing interaction routines in a multimedia-capable contact center with added capability including acts for (a) creating at least one rule having at least one rule attribute; (b) creating one or more processes, the processes integral to the rule; (c) defining the at least one rule and integral processes as a strategy; and (d) linking the strategy to the interaction routine, the link serving to cause execution of the strategy during an interaction between an entity and the routine, execution thereof promoting further interaction defined in the strategy.

In one aspect in act (a), the rule is an interaction routing rule including the attributes of condition, timeout, and forced routing. In one aspect, the rule may further include one or more sub rules, each having at least one attribute. In a preferred aspect in act (b), the one or more processes are defined by XML tag and may be executed by machine interaction with the associated tag. Also in a preferred aspect in act (c), the strategy is a complete executable routine specifying the one or more rules, attributes and processes.

In one aspect in act (d), the method of linking is by a machine-readable strategy start tag embedded in the enhanced routing routine. In one aspect in act (b), the processes may include variable, variable assign, priority set, data attach, treatment, target set, or target. In one preferred aspect, in act (d), the interaction routine is one of a call control extensible markup language routine or a voice extensible markup language routine.

According to another aspect of the present invention, a software module is provided for generating an interaction strategy from constructs according to rule including at least one script enabling the strategy, the at least one script transformed by the module into at least one script of an alternate language readable by one or more machines cooperating to serve an interaction leveraging the strategy. The software module includes a first interface to a first server containing constructs of a first language used to build the strategy, a generator to script the strategy from the constructs, a transformation module to transform the generated script into the alternate language, a second interface to a second server containing constructs used in the alternate language, and a second generator to script the strategy in a form representing the alternate language.

In one embodiment, the first language is strategy extensible markup language and the alternate language is one of interaction routing language, interaction routing designer extensible markup language, call control extensible markup language, or voice extensible markup language. In a preferred embodiment, the language transformation module is an extensible style sheet language transformation module.

In one embodiment, the act of creating the strategy and transforming the strategy is executed according to a request received from a transaction server, the transformed routine made available to the requesting system via notification in a response to the requesting transaction server. In another embodiment, the act of creating and transforming the strategy is executed according to a request received from a transaction server, the transformed routine or a link thereto embedded into a transaction server response, the response serving as the instruction for the requesting machine to execute the strategy or to invoke the link to execute the strategy.

In one embodiment, the requesting machine is one of a computer integrated telephony private branch exchange switch, a soft private branch exchange switch, or an Internet protocol router. Also in one embodiment, the alternate language is one of web services description language or web flow description language. In another embodiment, the alternate language is Business Process Execution Language for Web Services.

BRIEF DESCRIPTION OF THE DRAWING FIGURES

Figure 7:
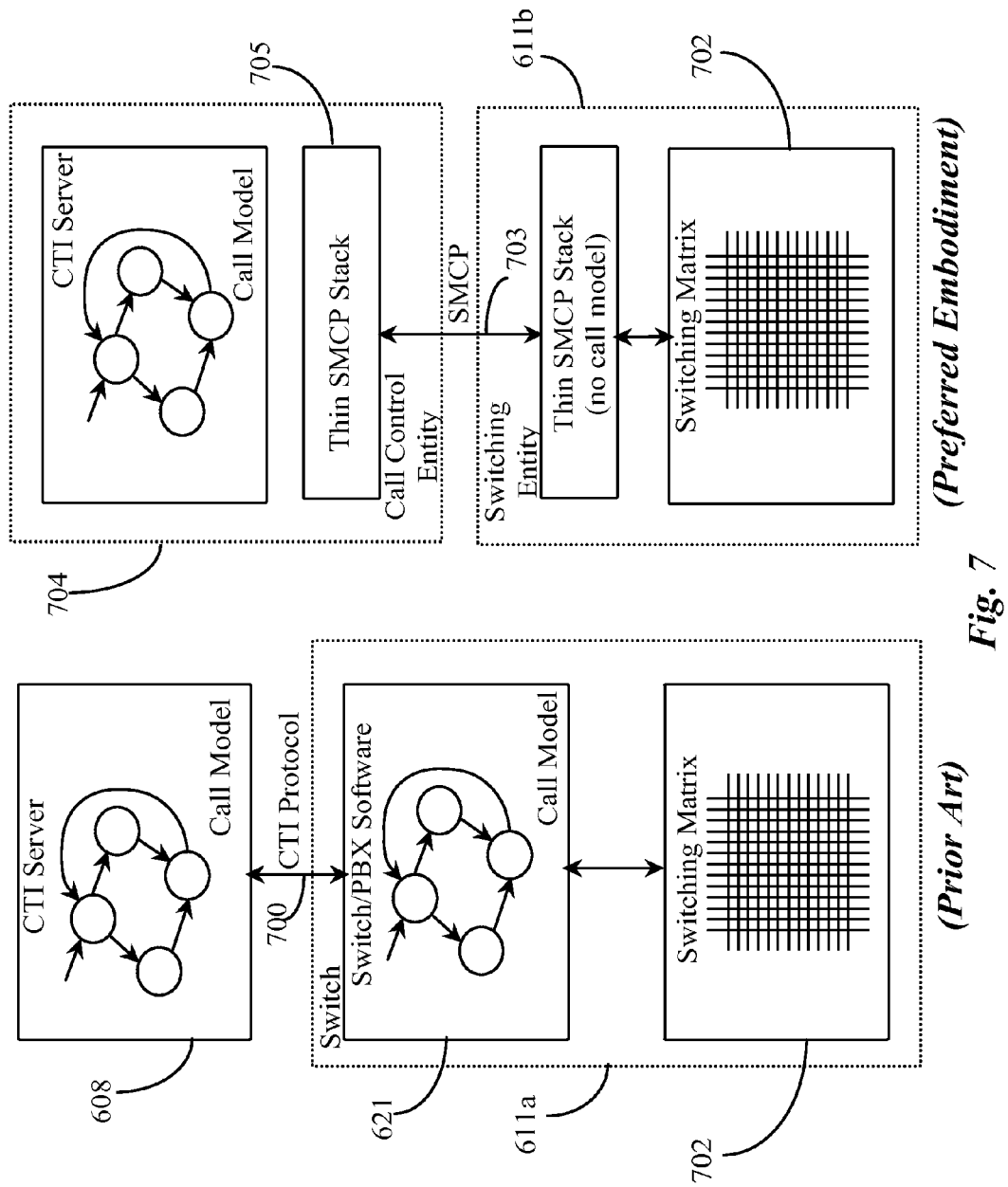
Figure 8:
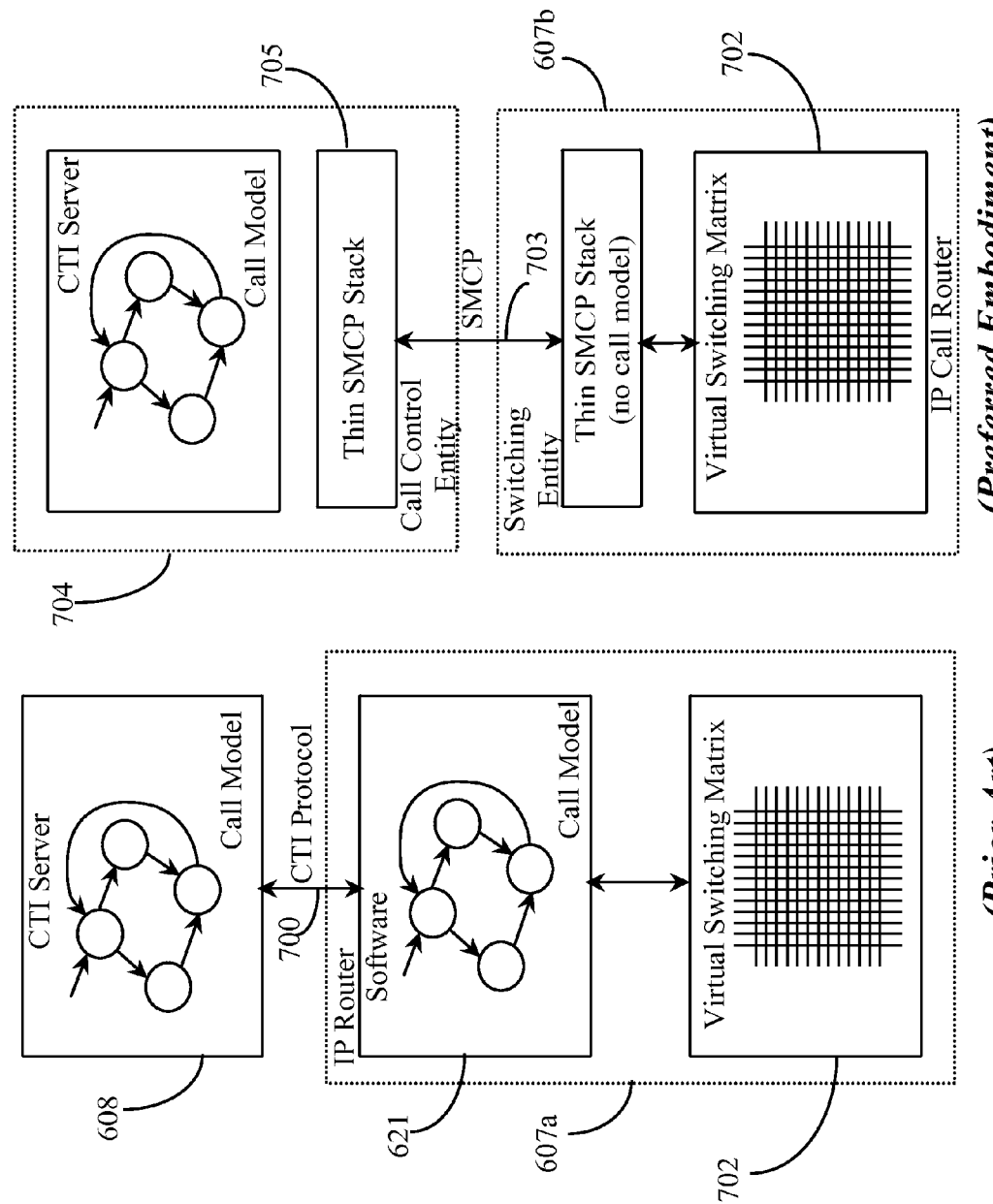
Figure 9:
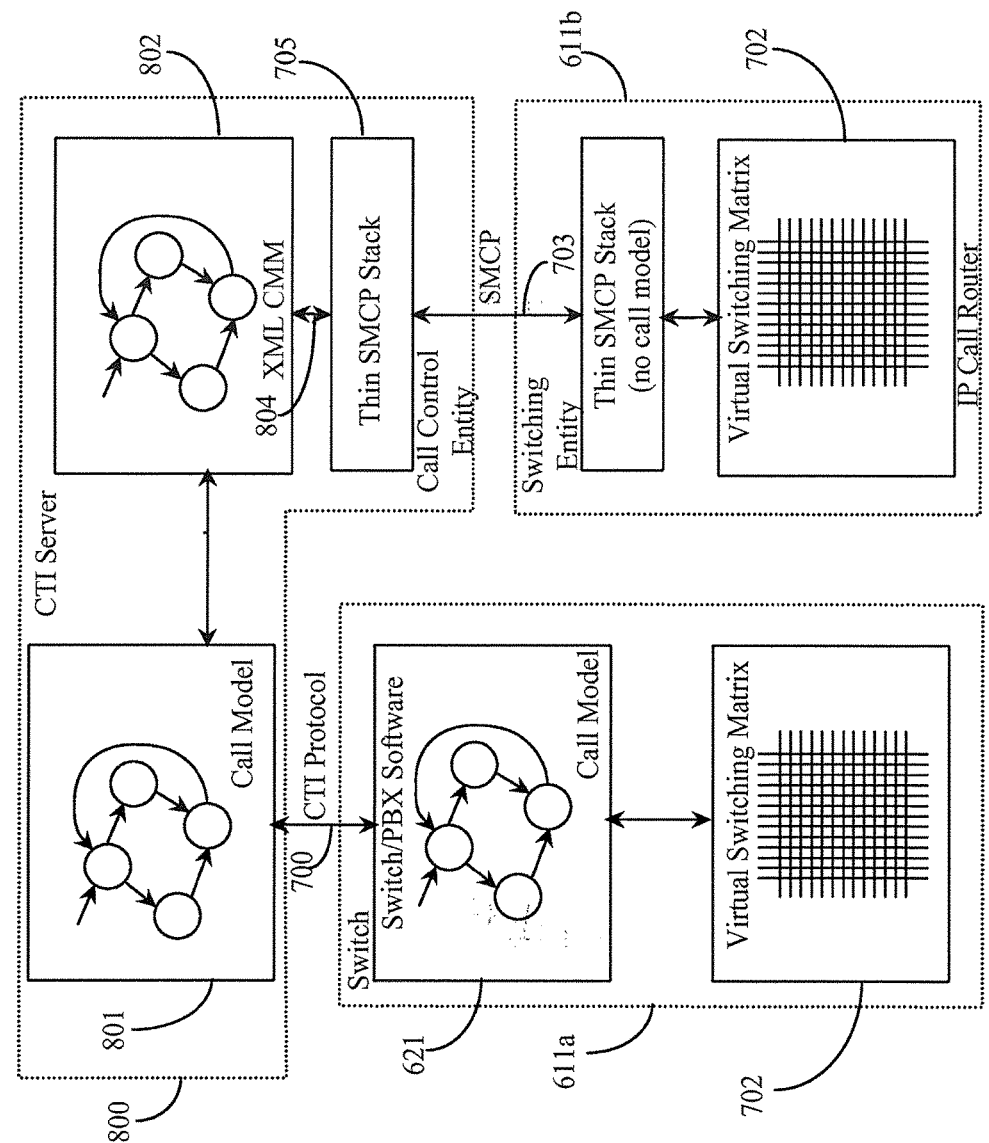

FIG. 7 is a block diagram illustrating CTI-PSTN call-model management approach according to an embodiment of the present invention FIG. 8 is a block diagram illustrating a CTI-IP call-model management approach according to another embodiment of the present invention FIG. 9 is a block diagram illustrating an XML based call-model management approach according to yet another embodiment of the present invention.

Figure 10:
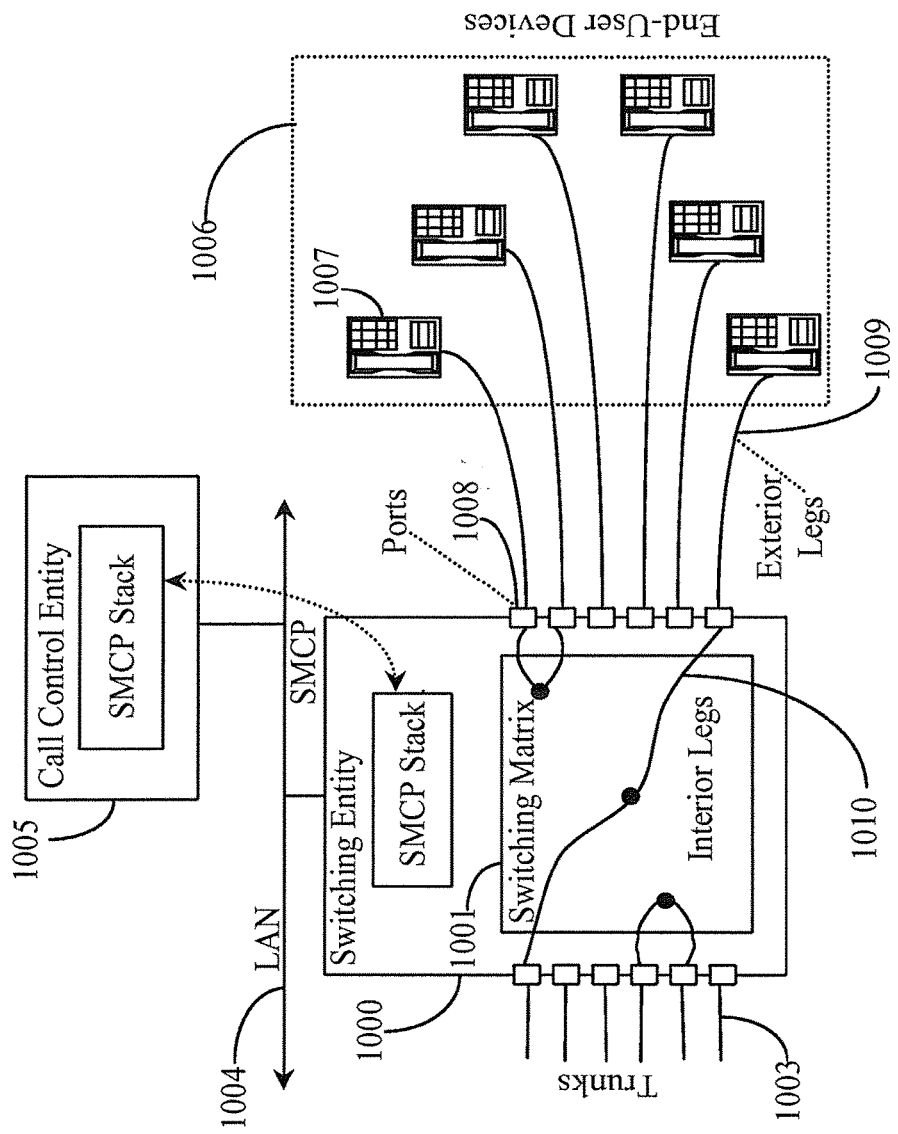

FIG. 10 is a block diagram illustrating SMCP control over interior and exterior call leg construction in a CTI scenario according to an embodiment of the present invention.

Figure 11:
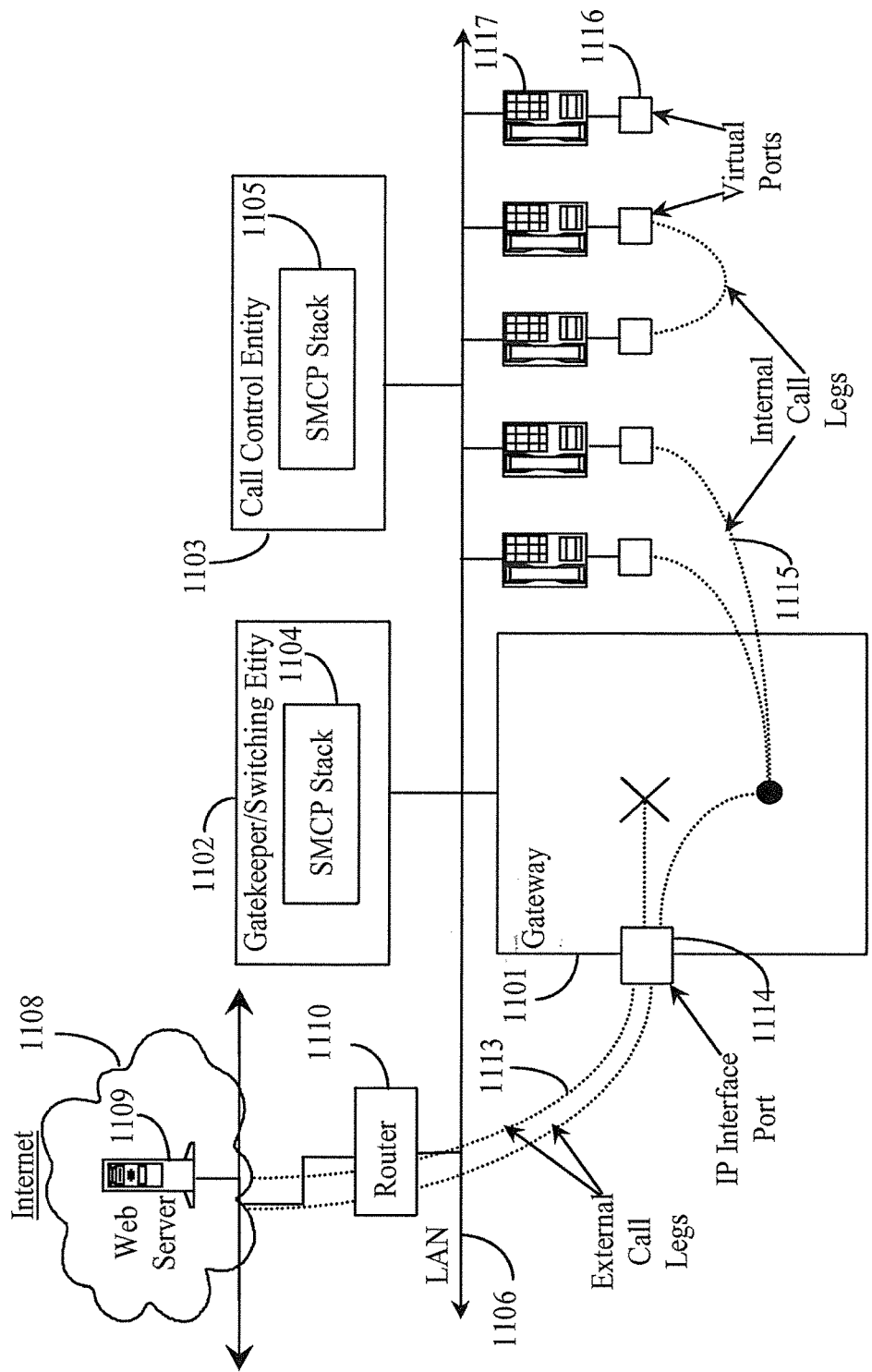

FIG. 11 is a block diagram illustrating SMCP control over interior and exterior call leg construction in a VoIP scenario according to an embodiment of the present invention.

Figure 12:
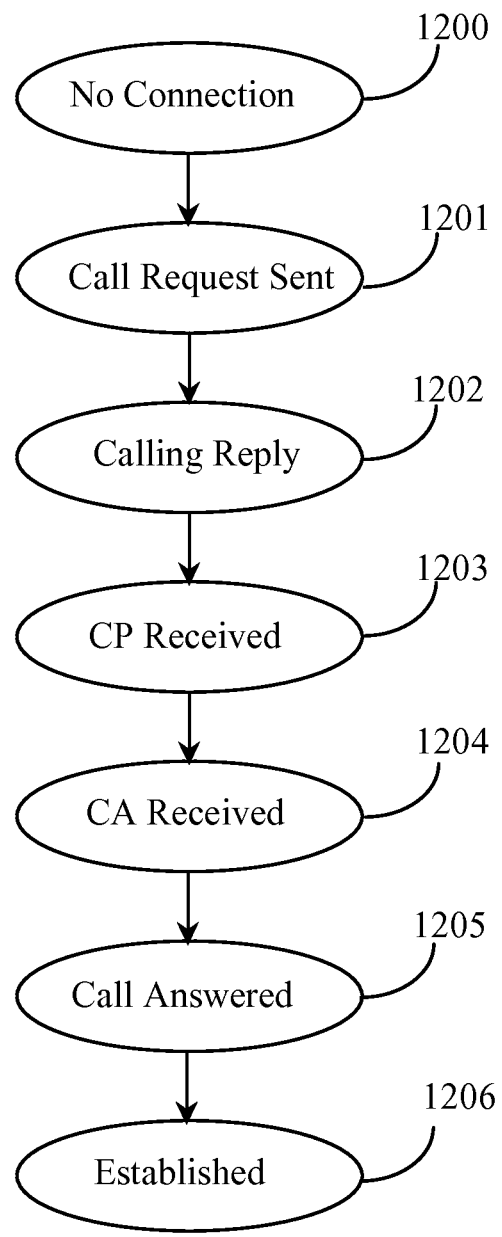

FIG. 12 is flow diagram illustrating basic steps for establishing an outbound call connection using XML-based SCMP.

Figure 13:
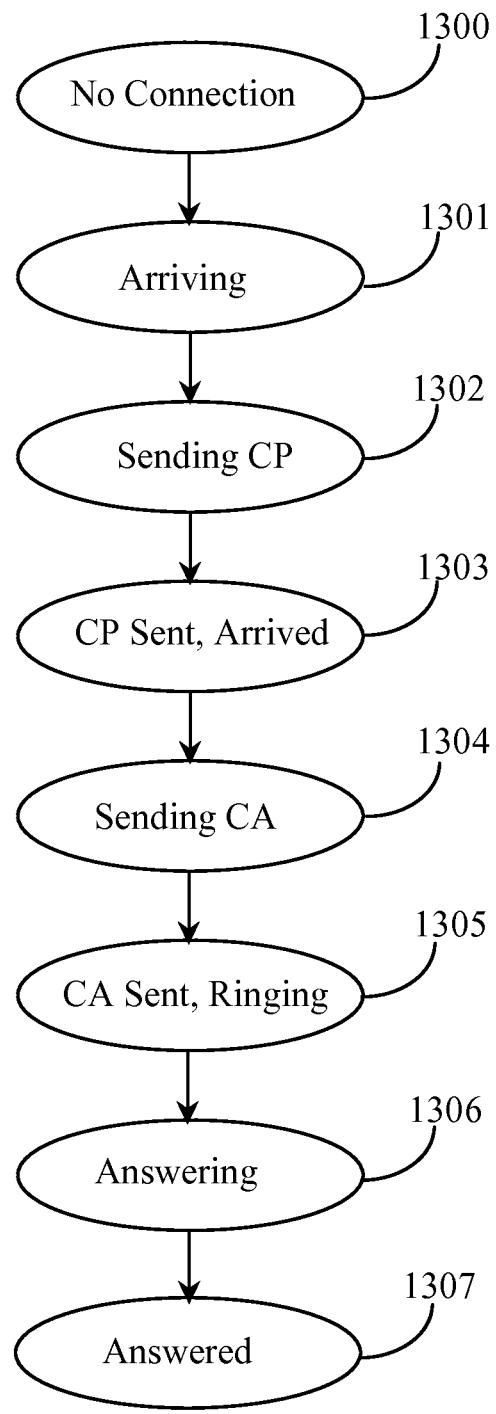

FIG. 13 is a flow diagram illustrating basic steps for establishing an incoming call connection using XML-based SCMP.

Figure 14:
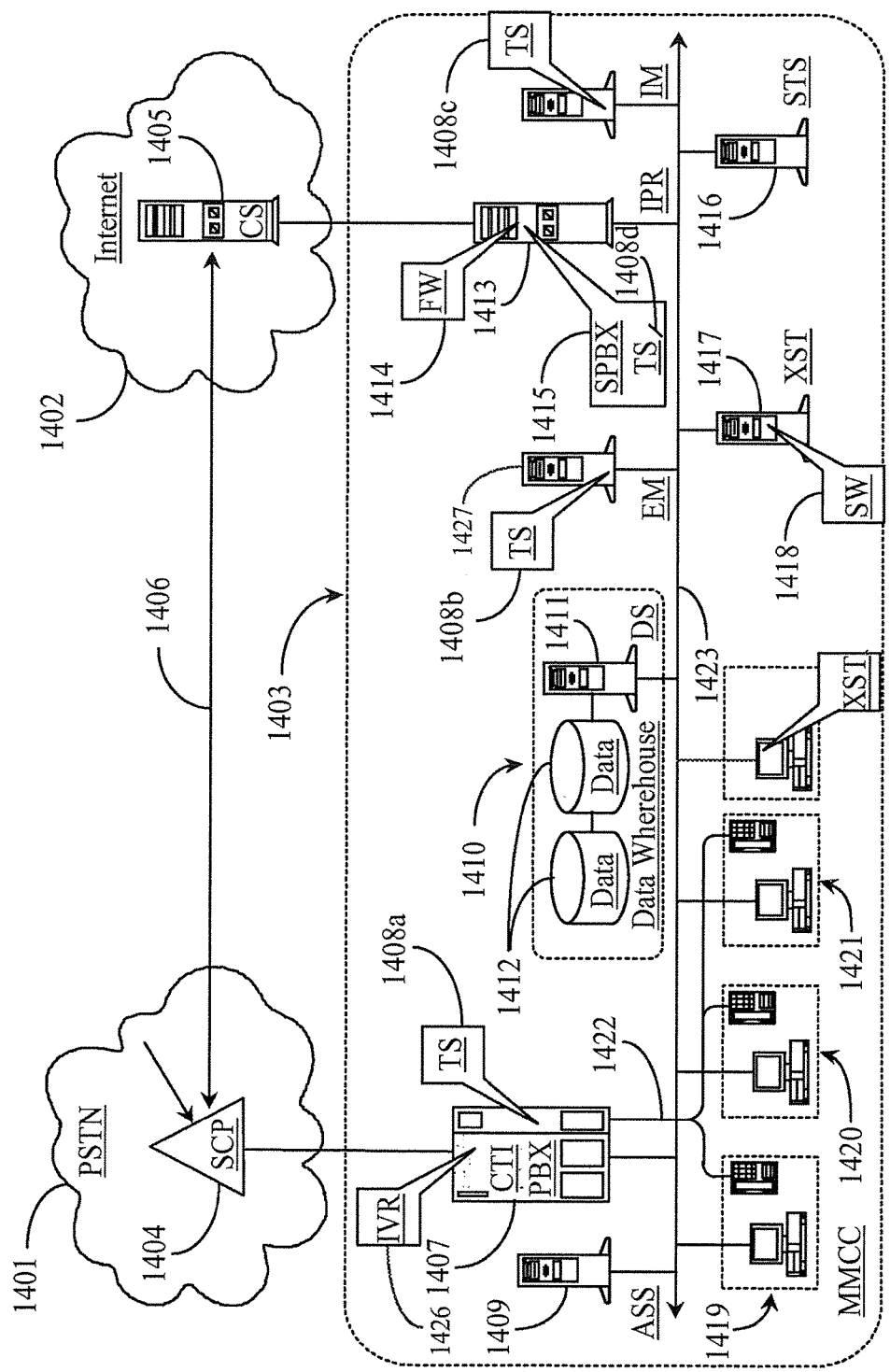

FIG. 14 is an architectural overview of a multimedia communication center enhanced for intelligent routing and workflow management according to an embodiment of the present invention.

Figure 15:
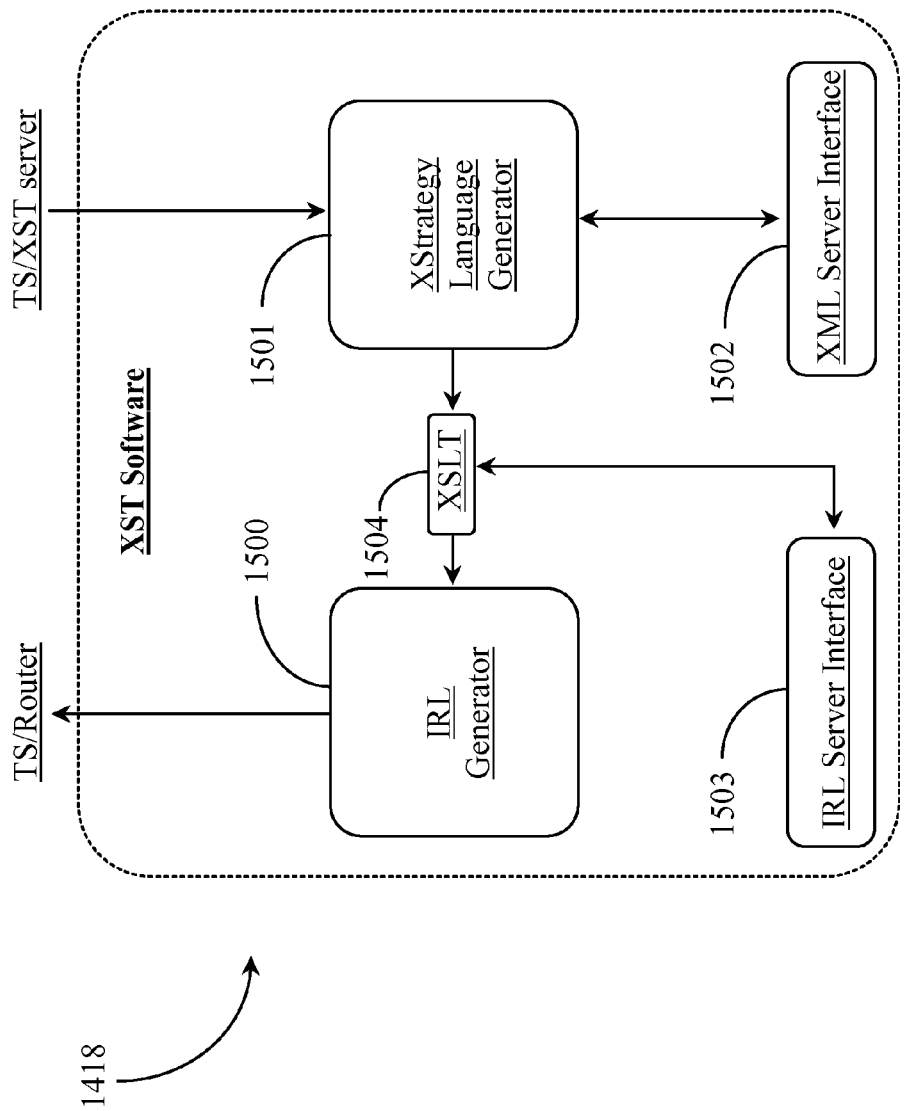

FIG. 15 is a block diagram illustrating components of SW of FIG. 14 according to an embodiment of the present invention.

Figure 16:
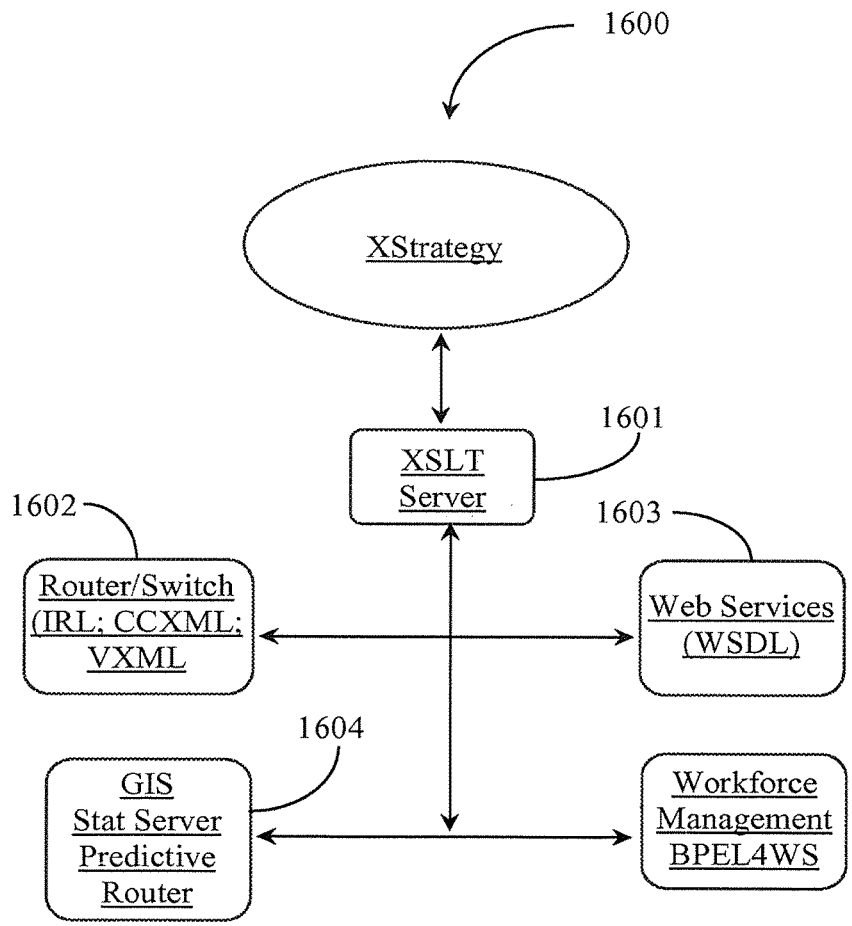

FIG. 16 is a block diagram illustrating at least four basic communication center environments that may be enhanced with XStrategy.

Figure 17:
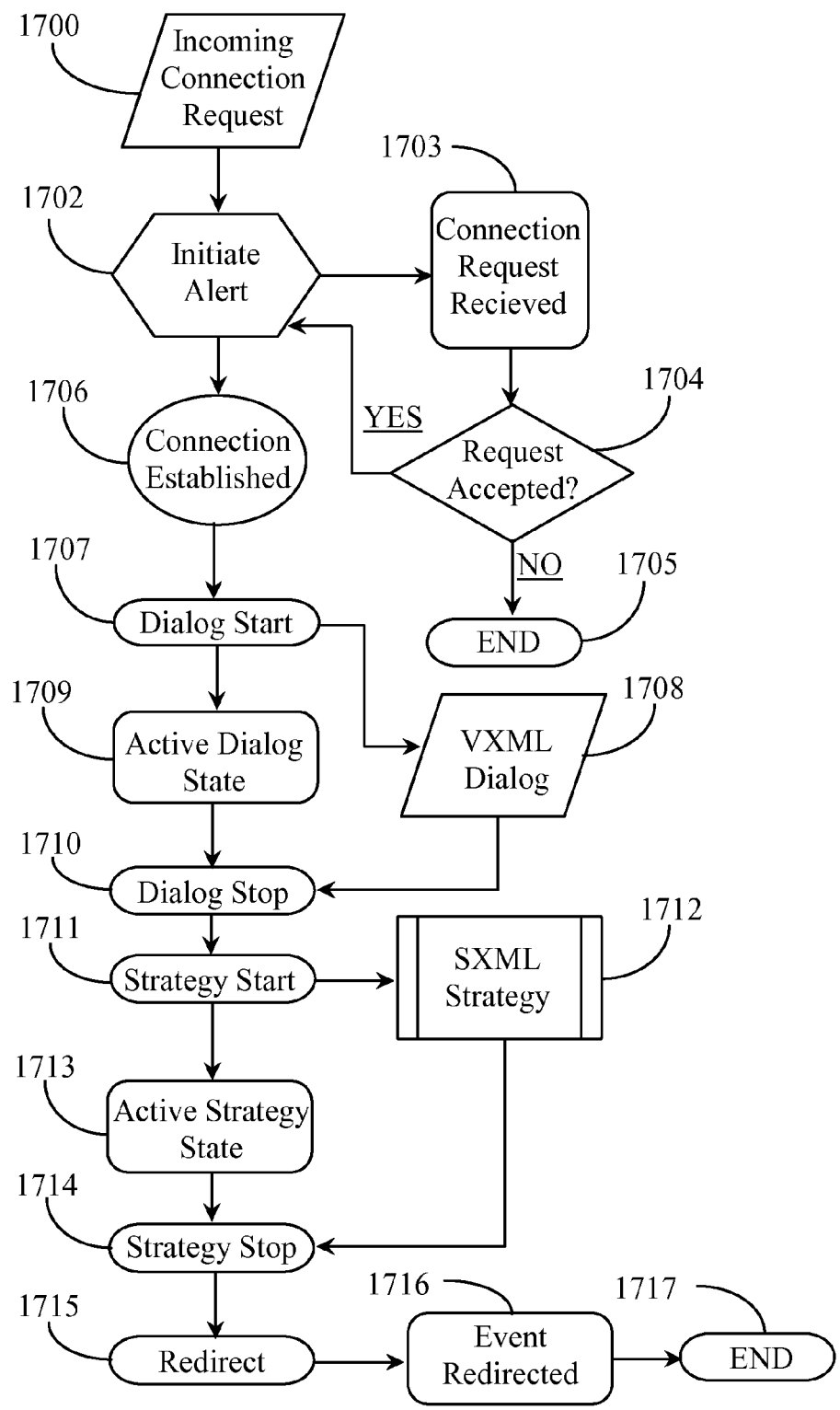

FIG. 17 is a process flow chart illustrating a CCXML telephony script adapted to invoke VXML and SXML according to an embodiment of the present invention.

Figure 18:
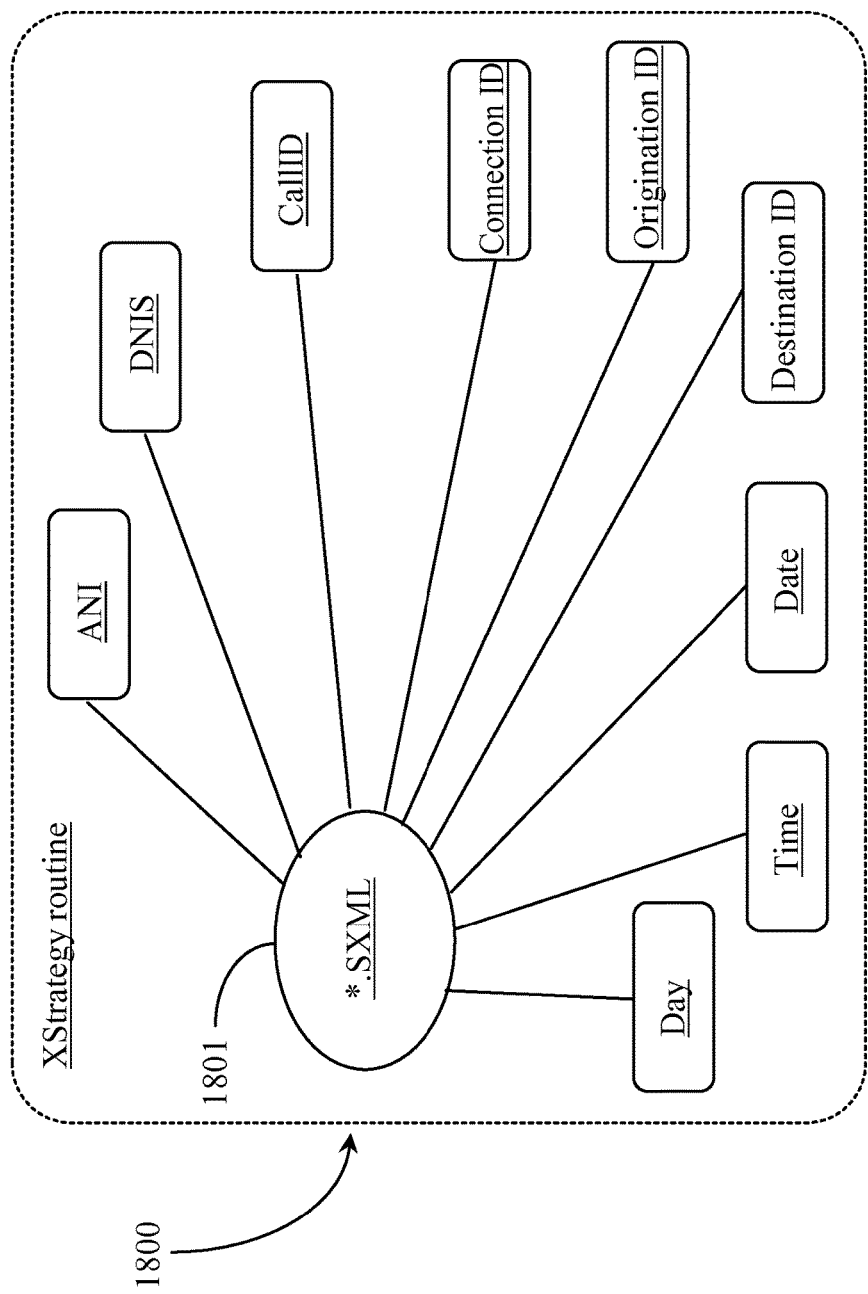

FIG. 18 is a block diagram illustrating keyword options for use in an SXML XStrategy routine.

Figure 19:
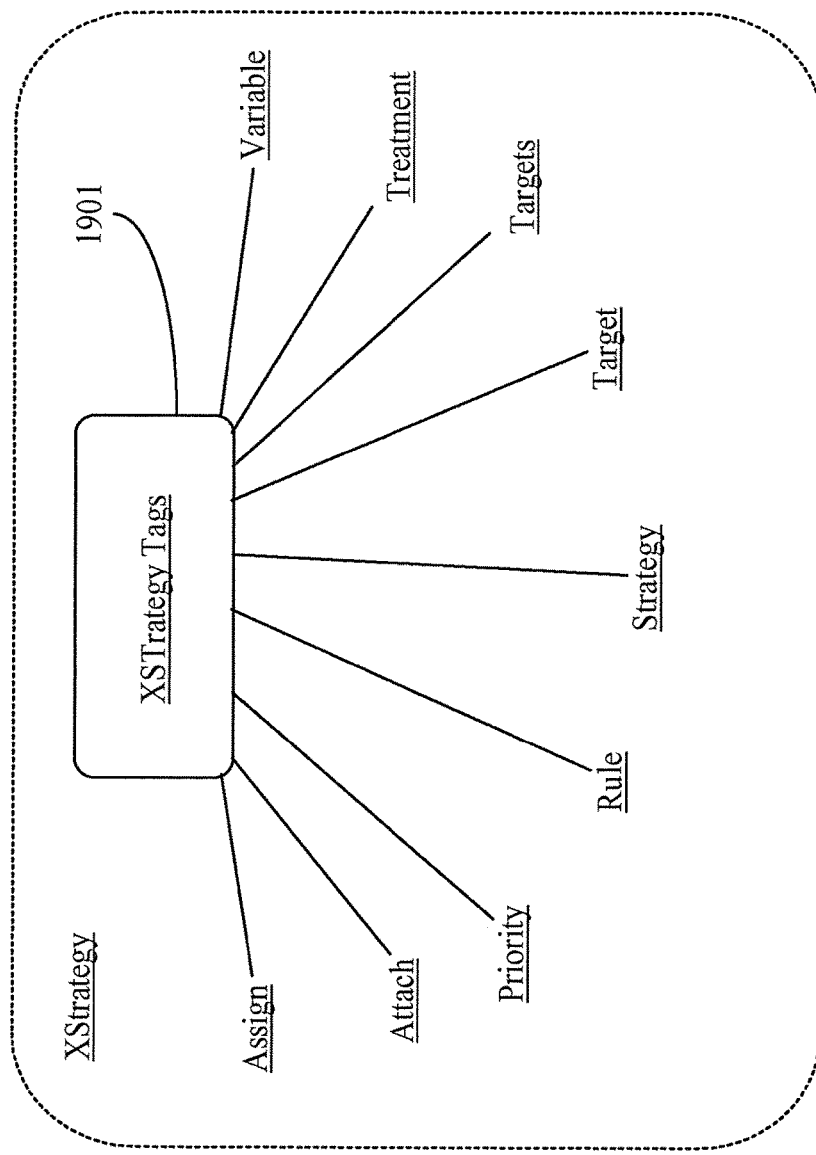

FIG. 19 is a block diagram illustrating optional tags that may be found within XStrategy script according to an embodiment of the present invention.

Figure 20:
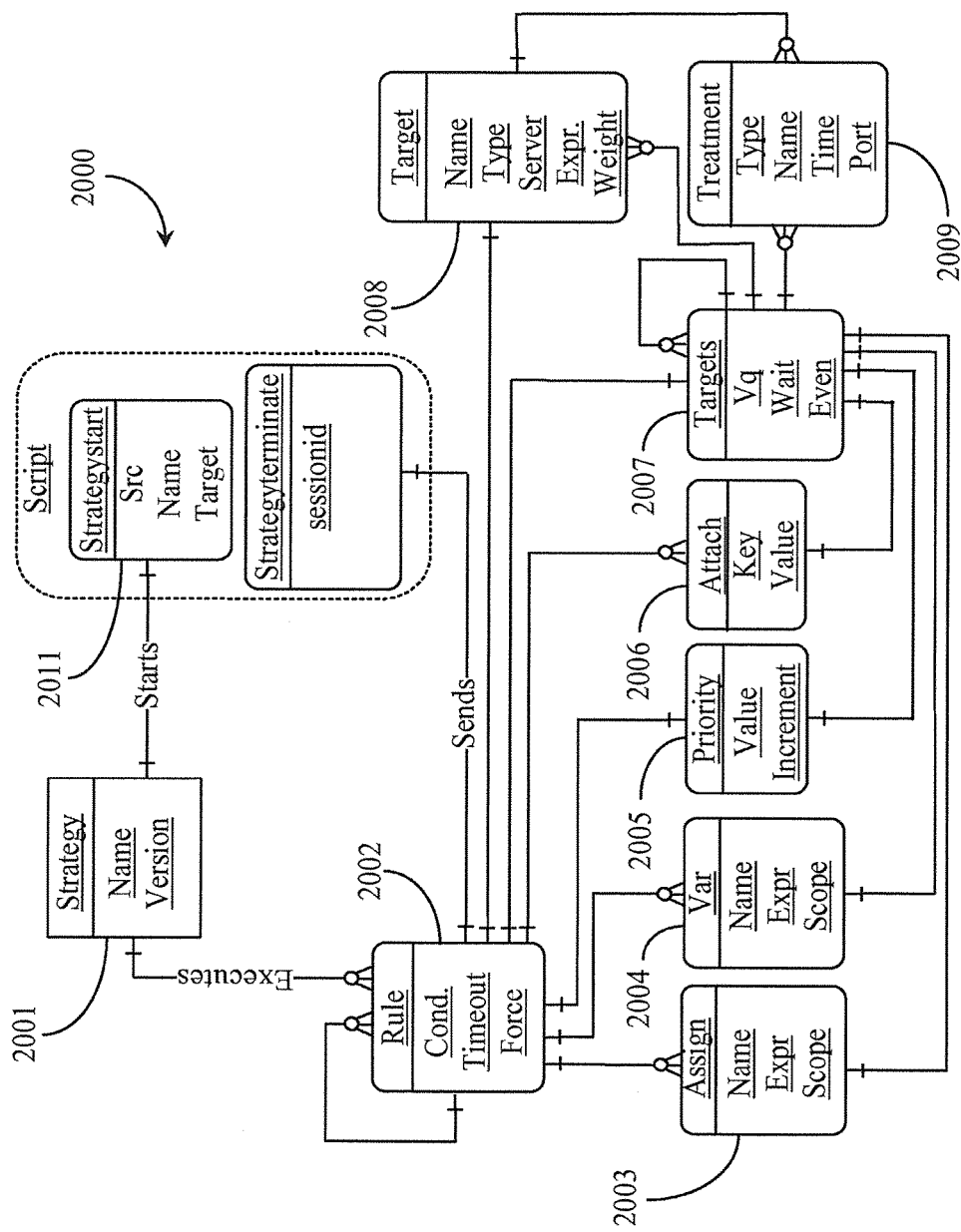

FIG. 20 is an entity relational diagram illustrating tag interrelationships and hierarchy in an XStrategy script 2000 according to an embodiment of the present invention.

Figure 21:
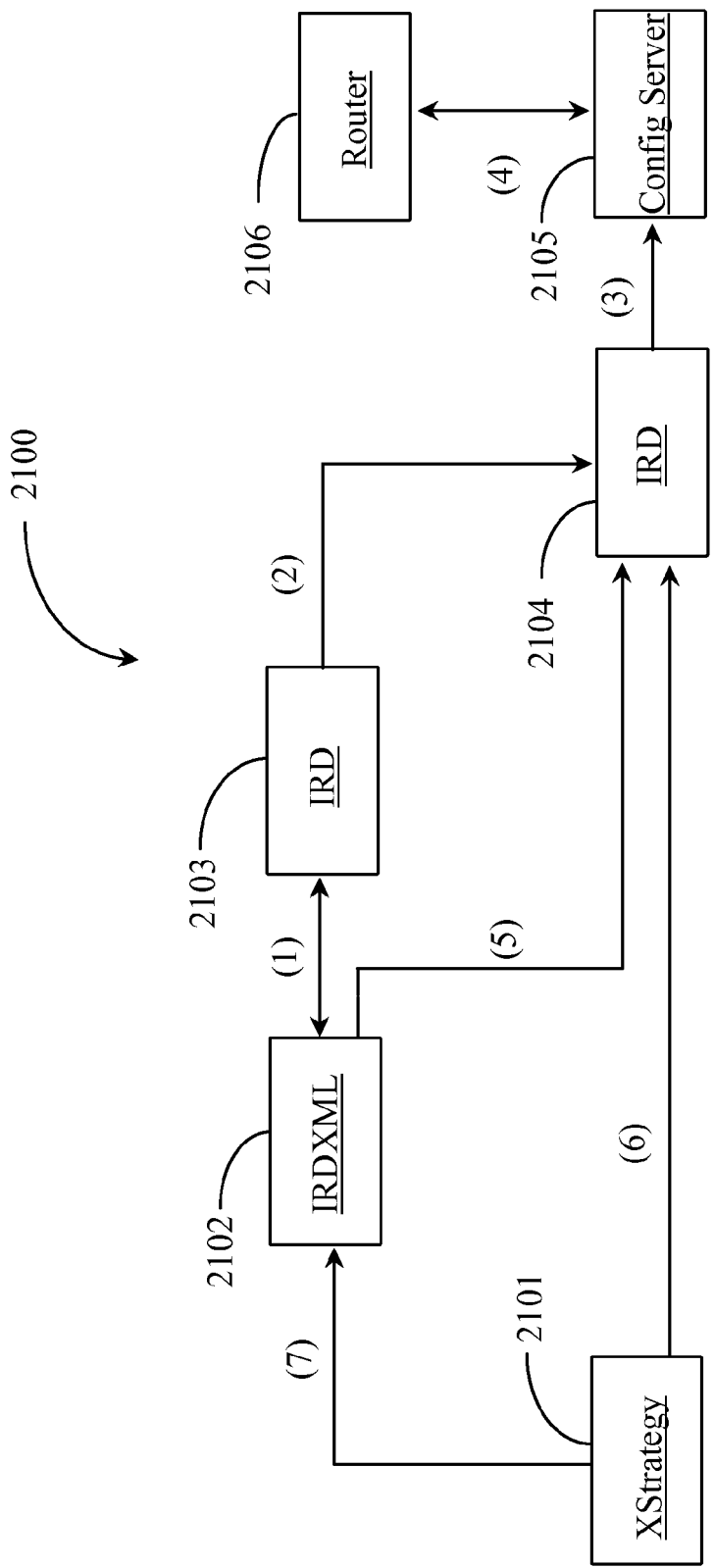

FIG. 21 is a block diagram of a relationship between XStrategy (SXML) and other genetic languages according to one embodiment of the invention.

DETAILED DESCRIPTION

Figure 1:
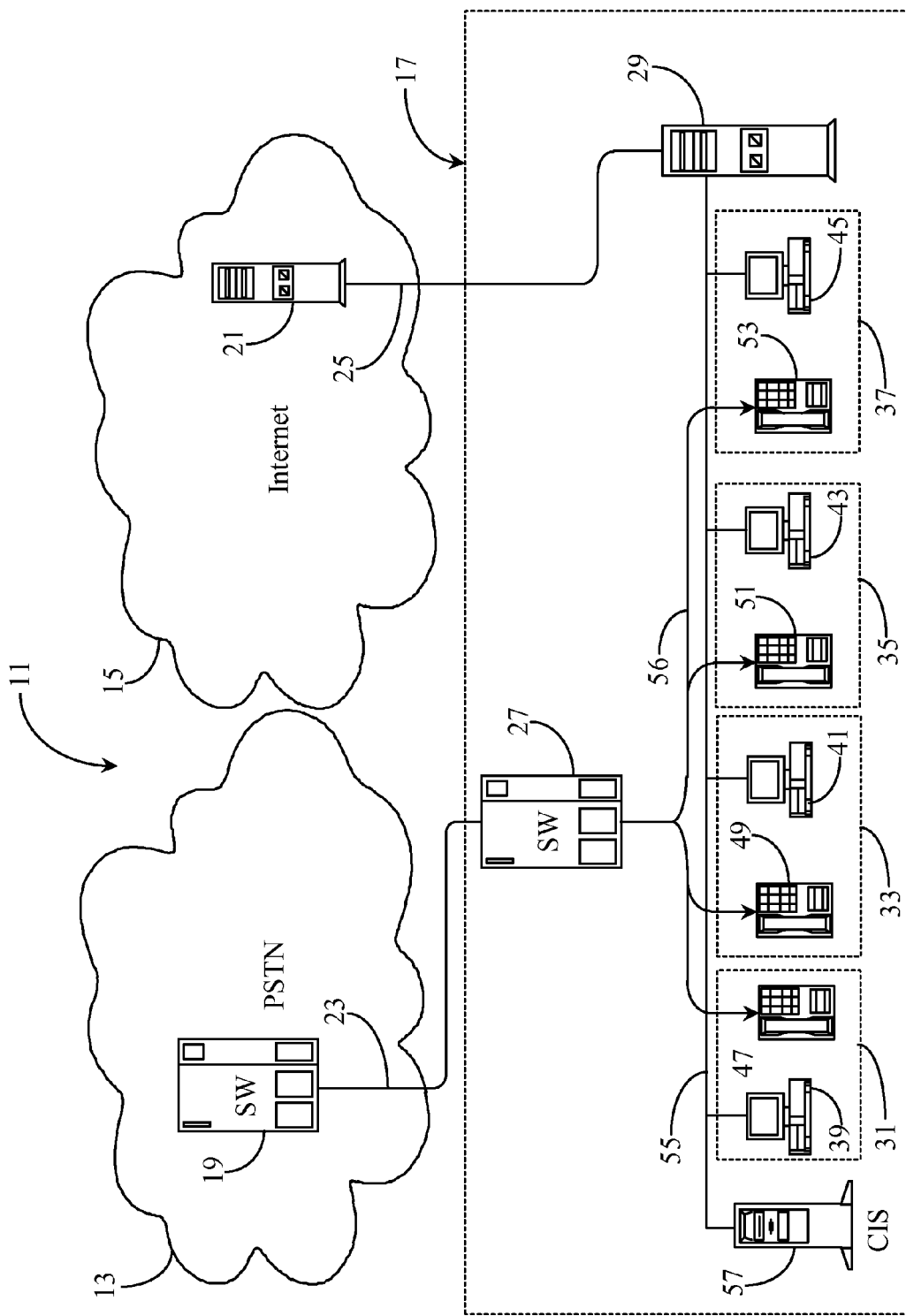
FIG. 1 is a system diagram of a prior art call center and network connections, wherein the call center is capable of both COST and DNT call handling.

FIG. 1 is a system diagram of a prior art call center and network connections, wherein the call center is capable of both COST and IPNT call handling. In FIG. 1 telecommunications network 11 comprises a publicly switched telephone network (PSTN) 13, the Internet network 15, and a call center 17. PSTN network 13 may be a private network rather than a public network, and Internet 15 may be another public or a private data network as are known in the art.

In this basic prior art example, call center 17 is equipped to handle both COST calls and IPNT calls. Both COST calls and IPNT calls are delivered to call-center 17 by separate network connections. For example, a telephony switch 19 in the PSTN may receive incoming telephone calls and rout them over a COST network connection 23 to a central switching apparatus 27 located within call center 17. IPNT calls via Internet 15 are routed via a data router 21 over a data-network connection 25 to an IPNT router 29 within call center 17. In this example, network switch 19 is meant to represent a wide variety of processing and switching equipment in a PSTN, and router 21 is exemplary of many routers and IP switches in the Internet, as known in the art.

Call center 17 further comprises four agent stations 31, 33, 35, and 37. Each of these agent stations, such as agent station 31, for example, comprises an agent's telephone 47 for COST telephone communication and an agent's PC/VDU 39 for IPNT communication and additional data processing and viewing. Agent's telephones 49, 51, and 53 along with agent's PC/VDU 41, 43, and 45 are in similar arrangement in agent stations 33, 35, and 37 respectively. Agent's telephones, such as agent's telephone 49, are connected to COST switching apparatus 27 via telephone wiring 56.

A LAN 55 connects agent's PC/VDU's to one another and to a CPE IPNT router 29. A customer-information-service (CIS) server 57 is connected to LAN 55 and provides additional stored information about callers to each LAN-connected agent. Router 29 routes incoming IPNT calls to agent's PC/VDU's that are also LAN connected as previously described. A data network connection 25 connects data router 29 to data router 21 located in Internet 15. Specific Internet access and connectivity is not shown, as such is well known in the art, and may be accomplished in any one of several ways. The salient feature to be emphasized in this prior art example is that separate connections and equipment are necessary and implemented to be able to handle both COST and IPNT calls at the call center.

Each agent's PC/VDU, such as PC/VDU 45 has a connection via LAN 55 and data network connection 25 to Internet 15 while the assigned agent is logged on to the system, however, this is not specifically required but rather preferred, so that incoming IPNT calls may be routed efficiently. Dial-up connecting rather than a continuous connection to Internet 15 may sometimes be employed.

An agent operating at an agent station such as agent station 33 may have COST calls arriving on agent's telephone 49 while IPNT calls are arriving on agent's PC/VDU 41. In this particular example lack of a connection between router 29 and switching apparatus 27 creates a cumbersome situation, requiring agents to distribute there time as best they can between the two types of calls. Thus, agent time is not utilized to maximum efficiency with respect to the total incoming calls possible from both networks.

Figure 2:
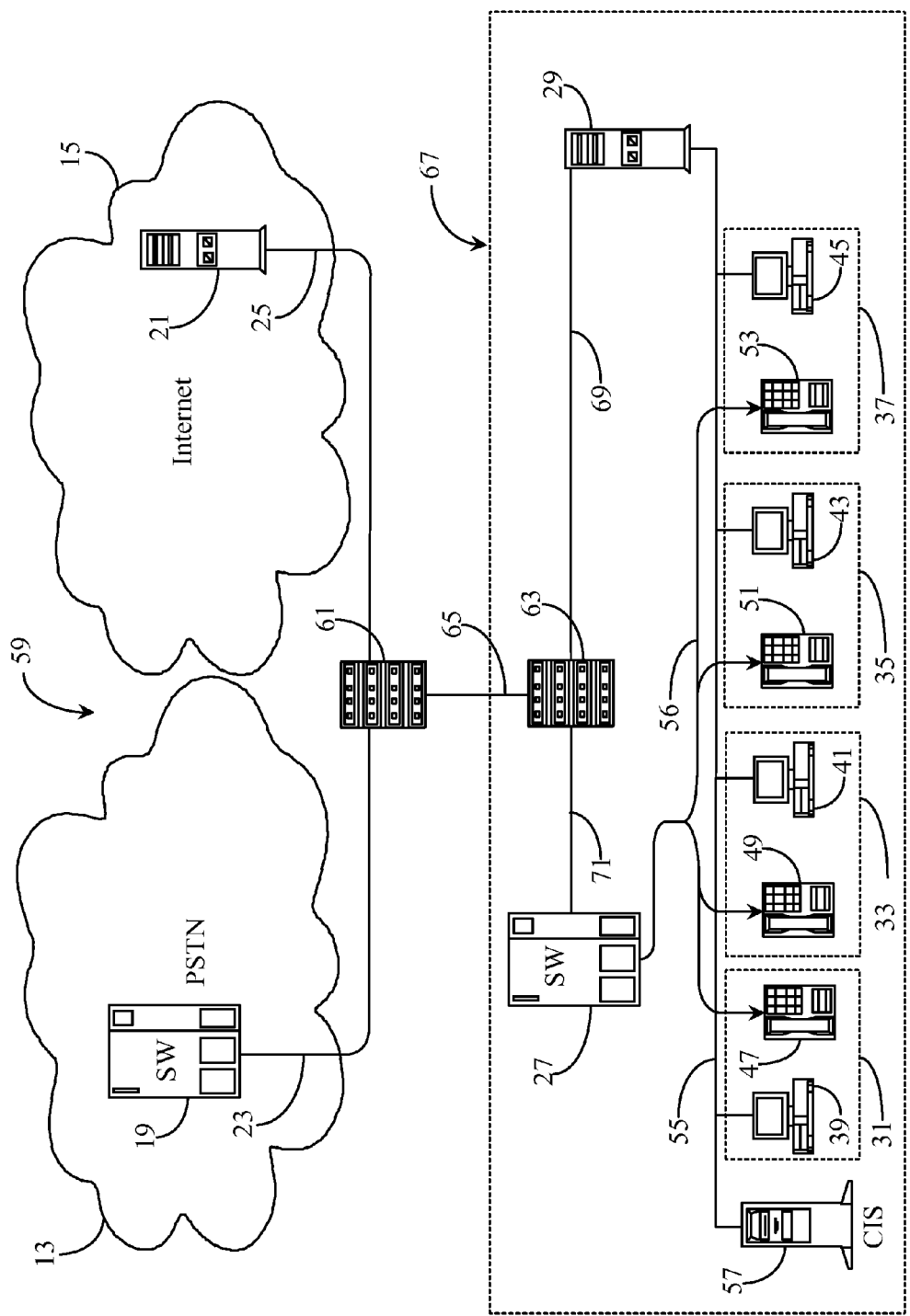
FIG. 2 is a system diagram of a prior art call center having a dedicated bridge connection for both DNT and COST calls

FIG. 2 is a system diagram of a prior art call center having a dedicated bridge connection for both IPNT and COST calls. Telecommunications network 59 comprises PSTN 13, Internet 15, and a call center 67. This prior art example is similar in architecture to the prior art example of FIG. 1 with an exception in how IPNT and COST calls are delivered to call center 67. Therefore, many of the same elements present in FIG. 1 are shown again in this example, such as telephony switching apparatus 27, agent stations 31-37, LAN connectivity, and so on.

Referring again to FIG. 2, a known network data bridging technique and apparatus is provided, most typically by a local phone company, wherein COST calls and IPNT calls may be routed side by side over one trunk to call center 67. This bridge comprises a first telephone-data modem 61, a suitable trunk connection such as a T1 or E1 trunk 65 as is known in the art, and a second telephone-data modem 63. Telephone-data modem 61 resides at the public-network level, typically with a local telephone company's equipment, but could also be in the PSTN cloud or even the Internet cloud. Telephone-data modem 61 is connected to the PSTN by exemplary COST telephony switch 19 via COST connection 23 and to exemplary data router 21 in Internet 15 via data network connection 25. Calls for call center 67 originating from the PSTN and from Internet 15 are transmitted to telephone-data modem 61. Arriving calls are then routed over dedicated channels within trunk 65 to telephony-data modem 63 at call center 67. For example, a certain number of channels within trunk 65 are dedicated to carrying COST calls while the remaining channels are dedicated to carrying IPNT calls and other data. This is not a dynamic, but a fixed allocation, wherein the portion dedicated to COST transmission remains constant.

Calls that are received at telephone-data modem 63 from trunk 65 are routed appropriately depending on type of call. For example, COST calls are routed to switching apparatus 27, and IPNT calls are routed to data router 29. In both cases, further routing to agents is the same as described with reference to the prior art example of FIG. 1.

Although the network-data bridging technique, as described above with reference to FIG. 2, requires only one connection (65) to provide both COST and IPNT service to call center 67, trunk 65 is partitioned and requires expensive hardware on both ends to provide and maintain service. Further, agents face the same issues regarding handling separate types of calls as was previously described with reference to the prior art example of FIG. 1. The dedicated bandwidth issue is still a problem because the allocation of bandwidth in trunk 65 is fixed, while call loading by type will vary.

Figure 3:
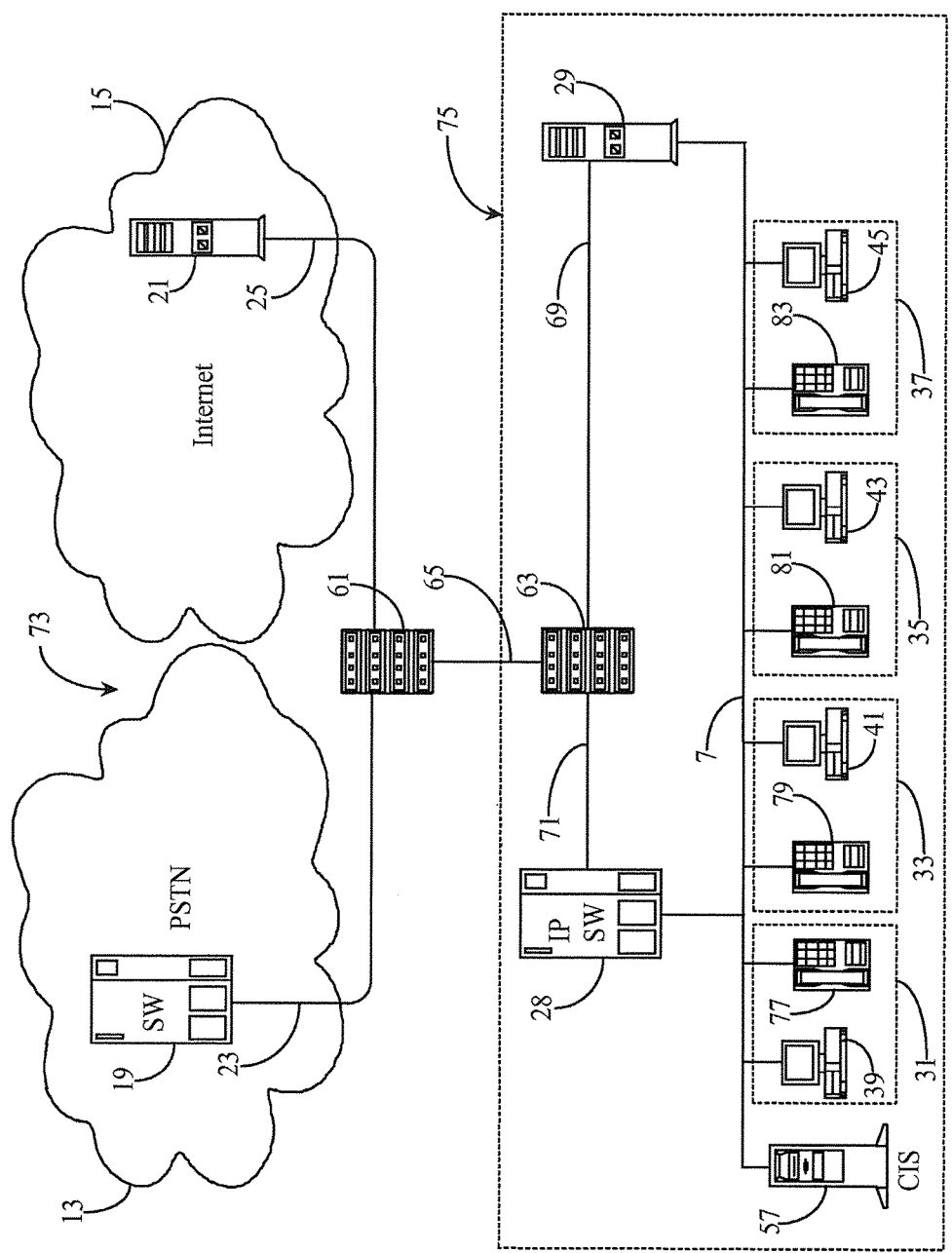
FIG. 3 is a system diagram of another call center with a dedicated bridge connection as in FIG. 2, comprising an IP telephony switch in the call center.

FIG. 3 is a system diagram of another system an art known to the inventors with a dedicated bridge connection as in FIG. 2, comprising an IP telephony switch in the call center. Telecommunications network 73 comprises PSTN 13, Internet 15, and call center 75. The architecture of telecommunications network 75 is similar to the architecture of the prior art example of FIG. 2 with at least two important differences. Firstly, call center 75 is enhanced with an Internet protocol (IP) central-telephony switch 28 that has the ability to convert PSTN call data to IP format, and to distribute the calls as IPNT calls on LAN 7. This enables incoming PSTN calls to essentially be converted into IPNT calls so far as receiving agents are concerned. Secondly, instead of regular ACD type telephones such as agent's telephone 49 of FIG. 2, each agent station 31, 33, 35, and 37 is equipped with an IP-telephone, such as telephones 77, 79, 81, and 83 respectively. Each IP-telephone such as IP-telephone 81, for example, is connected to LAN 77. LAN 77 is enabled for IP data as well as other data that may be transmitted from time to time.

In this prior art example, the requirement for COST telephone wiring such as wiring 56 of FIGS. 1 and 2 is eliminated. Incoming COST calls arriving at telephone-data modem 63 are sent over connection 71 to IP-telephony switch 28. IP-telephony switch 28 converts COST calls to IPNT format before routing the calls to individual IP-telephones over LAN 77. IPNT calls arriving from Internet 15 at telephone-data modem 63 are routed over connection 69 to data router 29 and on to agent's PC/VDU's or agent's IP telephones in the same procedure as described with reference to the prior art example of FIG. 2.

An advantage of this embodiment is that agents may handle both COST-IPNT calls (COST calls converted to IPNT format in IP-telephony switch 28) and regular IPNT calls with either a LAN connected IP-telephone or a LAN connected PC/VDU. Agent time is better utilized. However, the hardware used to facilitate the network-data bridging technique as described with reference to the prior art example of FIG. 2 is not eliminated. Therefore, cost savings is still relatively limited.

Figure 4:
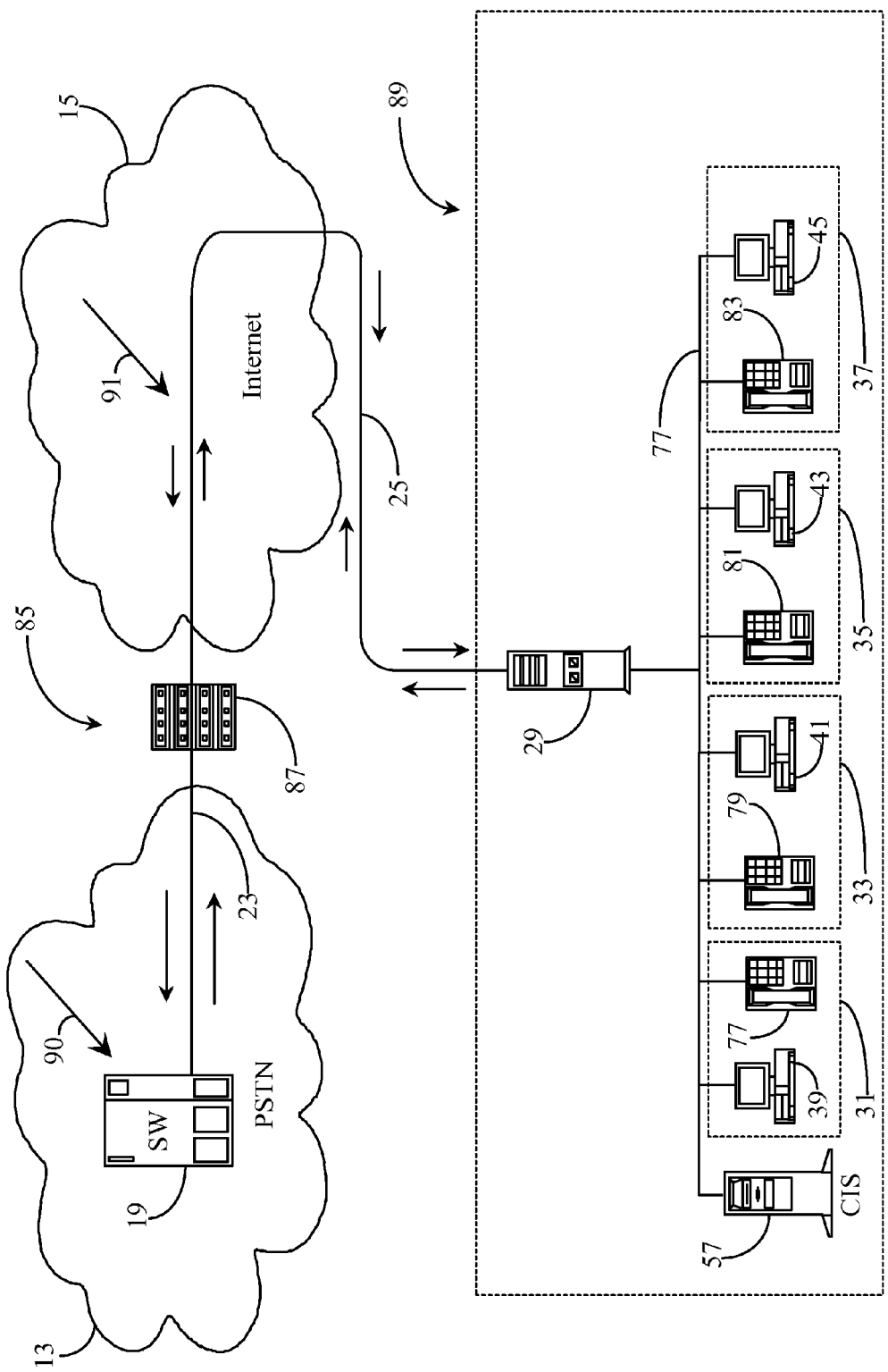
FIG. 4 is a system diagram of a DNT call center and connections to network level, including a unique bridge unit, in an embodiment of the present invention.

FIG. 4 is a system diagram of an IPNT call center and connections to network level, including a unique bridge unit, in an embodiment of the present invention. It is emphasized that the system shown and the description below of the system is exemplary only, and not limiting in the breadth of the present invention. The IPNT aspects of the call center could be implemented in a different, but still data network type protocol. Also the fact of a call center in the example is exemplary. The call center may be any DNT local or customer-premises type system, such as a telephone system at any company.

In this embodiment of the invention COST calls, represented in PSTN network 13 by arrow 90, are converted to IPNT format at the network level before being routed to a call center, and IPNT calls may also be converted to COST calls. This unique and innovative capability would, in a preferred embodiment, be provided by a local telephone company as a service to companies hosting IPNT call centers. The conversion, however, is not limited to the equipment of a local phone company. The conversion bridge may also be in the PSTN or other network, or in the Internet space. Conversion also is not limited to two networks, although examples to follow show two networks for simplicity in description. Bridge units according to the invention may connect to, and operate between three, four, or more networks.

Telecommunications network 85 comprises PSTN 13, Internet 15, and an IPNT-enhanced call-center 89. According to a preferred embodiment of the present invention, a COST-IPNT computerized bridge 87 is provided as a universal bi-directional connection between PSTN 13 and Internet 15. For example, bridge 87 has the ability to convert COST calls to IPNT and IPNT calls to COST format, and also to receive and place calls of both types.

In an example, COST calls received on trunk 23 may be associated with an IP address and routed through Internet 15 to a call center 89, or to any other IP address. In a preferred embodiment IP addresses are associated in a database either resident in the computerized bridge unit or accessible to the bridge. Companies having IP-only call centers may now advertise an 800 (or other no-charge-to-calling-party) COST number, that can be matched via the database to an IP address of a first data-router such as data router 29 within call center 89. Such a database may be relatively limited, such as to clientele of a local telephone company providing the service, or, in the opposite extreme, every COST number assigned in the world may be associated in such a database with an IP address.

Now, a call center such as call center 87 may be implemented as an IPNT-only call center, eliminating much hardware, software, and connectivity associated with prior art call centers. For example, because all incoming calls to call center 87 are now IPNT calls, expensive COST telephony switching apparatus normally found within call centers are no longer required. IP switching apparatus as shown in FIG. 3 is no longer required. COST telephony wiring such as wiring 56 of FIG. 2 is similarly eliminated. A range of other equipment and software associated with COST call centers is also eliminated. Call center functions are substituted with less expensive and easier managed IPNT counterparts running appropriate software applications. Expensive network cabling and hardware used in prior art bridging techniques as described with reference to FIGS. 2 and 3 above is eliminated as well. As a result, companies offering the service as well as companies hosting call centers realize substantial cost reductions related to previously required architecture and infrastructure.

Referring again to FIG. 4, PSTN callers may dial an 800 number, as previously mentioned, that connects them to bridge 87. A matching IP address is retrieved, typically from a database, and the COST call is then converted to IPNT format and routed via the best route available through Internet 15. All quality assurance techniques such as reserving bandwidth, compression techniques, special servers, firewall applications, encryption, and so on, as known to the inventors may be applied.

All incoming calls to call center 89 are now IPNT calls and are received and routed via data router 29 to agents working at agent stations 31, 33, 35, and 37. IPNT calls originating from a caller at a COST number are handled in the same way as IPNT calls originating from Internet 15. Thus, a seamless integration is achieved.

This innovative system and apparatus also works in reverse as follows: An IPNT call may be initiated by an agent within call center 89, perhaps as a call back to a COST caller, and connection may be achieved in a variety of ways. In one embodiment, bridge 87 has voice response or software code capability whereby an agent may offer a COST caller's phone number via spoken voice, software code, key stroke (if using PC/VDU), or touch tone (if using IP telephone) enabling a lookup and subsequent dialing of a COST caller's number. When the called party answers, conversation may ensue between the agent at call center 89 and the called party on a COST telephone connected anywhere to the PSTN network. Also, calls coming from the Internet cloud, represented by arrow 91, may be redirected over the bridge to a COST call center.

In an alternative embodiment, a COST telephone number may be encoded by an agent in call center 89 into an IP address of the bridge, and the bridge is adapted to extract that COST number from the IP address or other header in an incoming IP call from the call center. The coded portion of the IP address may also have just a key instead of the entire COST number, and the key may allow look-up in a stored table at the bridge to certain the COST number to which the call may be connected and translated.

In yet another alternative embodiment, customers may be given IP addresses if they do not already have one so that a general table listing PSTN numbers to IP address numbers may be created and kept both at call center 89 and at COST-IPNT bridge 87. In this instance, customers who do not own a computer would still have a registered IP address for matching purposes. An agent could supply the IP address via voice or other methods as previously described. A database of COST numbers and IP address matches could be far reaching and could conceivably include anyone weather they have patronized a call center or not, or weather they own a computer or not.

In some embodiments of the present invention, data router 29 would not be required. This would be a case wherein the method and apparatus of the present invention is used with a very small call-in location, perhaps operating only a few agent stations or, perhaps, only one agent station. COST-IPNT bridge 87 would route calls directly to the IP address of the agent's computer or IP. Further, routing may be accomplished via an agent's PC/VDU if there is more than one, but a relatively few operating agents.

In still another embodiment, back-up IP addresses may be programmed into COST-IPNT bridge 87 so that when a COST caller dials a free-to-calling-party number, after conversion to IPNT format a first IP address may be replaced by a second or back-up IP address if there is a long wait or if the first IP address is busy. In this case the converted call would be routed to the second choice IP address, and so on. This could be particularly useful for small business wherein only a few contacts are available and expense for a data router would be prohibitive.

Figure 5:
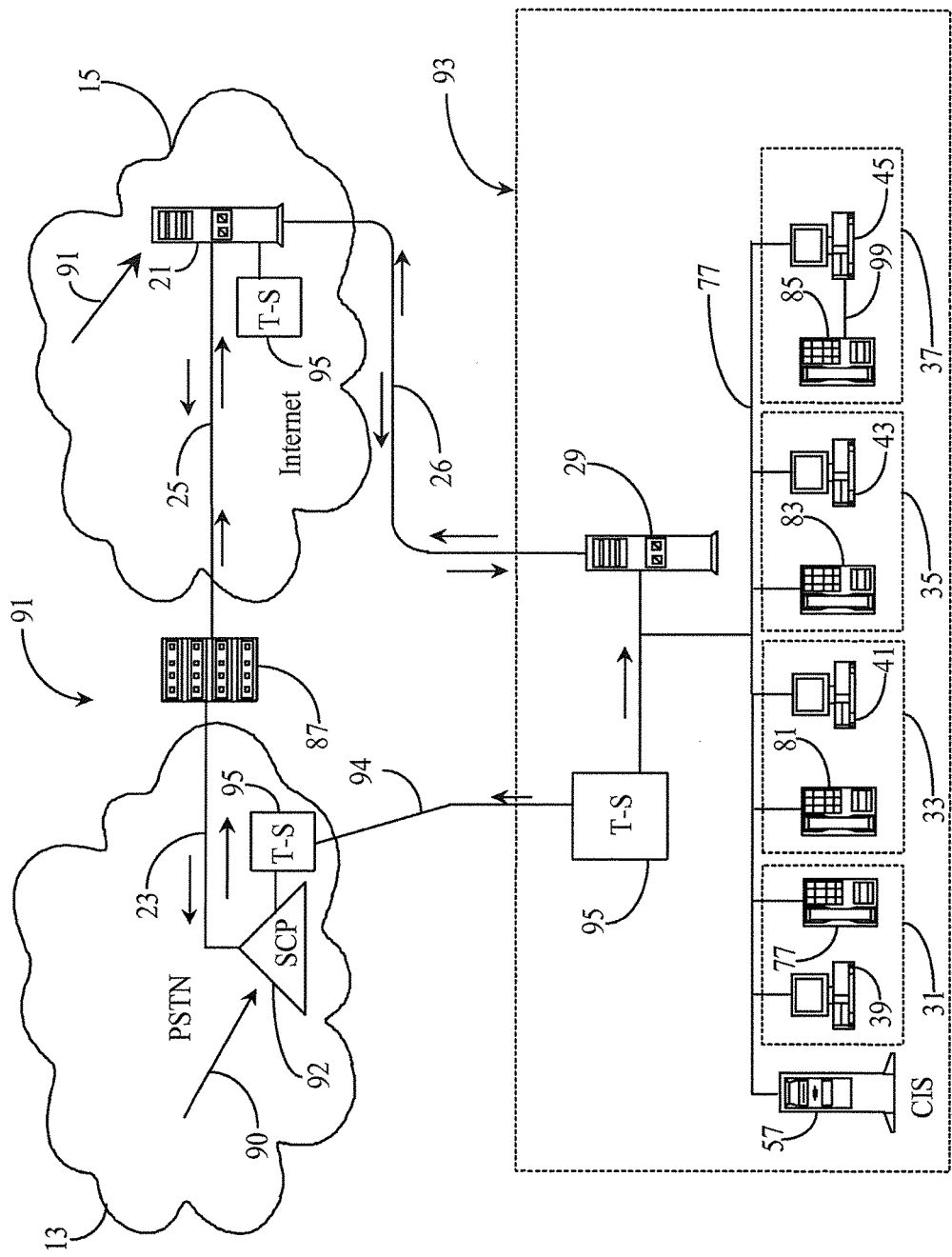
FIG. 5 is a system diagram of the unique call center system and connections of FIG. 4, further showing CTI enhancement.

FIG. 5 is a system diagram of the unique call center system and connections of FIG. 4, further showing CTI enhancement. In this embodiment sophisticated routing rules known to the inventors may be initiated and executed via transaction-server control over certain hardware (i.e. switches and routers) established in both PSTN 13 and Internet 15. This particular embodiment would most likely be utilized by large organizations hosting many call-centers, which may be spread over a large geographical region.

Referring again to FIG. 5, telecommunications center 91 comprises PSTN 13, Internet 15, COST-IPNT bridge 87 and an IPNT call-center 93. A service control point (SCP) 92 processes incoming COST calls represented by vector 90. A CTI processor 95 executing one or more CTI applications, and known as a T-Server (TS) is connected to router 29. T-Server 95 is connected in the call center to router 29, and monitors activity at router 29 and also exercises control at various levels over operation of router 29. That is, T-Server 95 may be informed of all incoming calls, exercise sophisticated routing rules, and control router 29 in following the routing rules. T-Server 95 is not limited to routing rules and algorithms, but may provide a considerable range of CTI functions. Router 91 can act as SCP for IPNT-originated calls, and may route them to the IPNT call center, or via the bridge to the COST network.

In this embodiment a second T-Server 95 is integrated with equipment at the network level, such as with the SCP in PSTN 13. The T-Server at call center 93 and the T-Server at the network level are connected by a digital link 94. Thus certain T-S routing and control routines (known to the inventors) can be executed at SCP 92. CTI hardware such as additional processors, stat-servers, intelligent peripherals, and the like that may be present in PSTN 13 are not shown but may be assumed to be present in this particular embodiment.

When a COST call arrives at SCP 92, information is typically obtained from the caller via IVR or other methods known in the art. This information may include call destination, purpose of the call, caller identity, etc. This information in some embodiments may be transmitted to call center 93 via link 94 before delivery of the actual call. Based on the information obtained at SCP 92 and, perhaps additional data supplied by T-S 95, the call is routed to a predetermined destination, in this case, COST-IPNT bridge 87 over telephone network connection 23. In another embodiment, T-S 95 may cause an incoming COST call to be routed to another COST-IPNT bridge, or some other destination.

As described with reference to FIG. 4, COST calls arriving at bridge 87 are routed through Internet 15 on data-network connection 25 as IPNT calls. The bridge serves as a dynamically translating interface. A data router 21 is shown connected to line 25 within Internet 15 and is used as a first destination of COST-IPNT bridge 87.

In some embodiments T-S 95 at the call center may also interact with router 21, exemplary of routers and IP switches in the Internet, via connection 26. There may also be instances of T-Servers 95 as shown associated with Internet routers and switches, which may communicate with T-Server 95 at call center 93, to provide CTI functions in the network initiated at call center level.

If it is determined by a T-Server 95 that a call has been miss-routed due to error, for example, it can reroute the call to another location in Internet 15, such as another routing point, or it can rout the call back to PSTN 13 through PSTN/IPNT bridge 87 where the call would be converted back to a PSTN call and sent back to SCP 92, or perhaps another location within PSTN 13. In this and other ways T-S 95 may exercise control over calls at the network level before a call arrives at call-center 93.

In the absence of rerouting, calls arriving at data router 29 are further routed to individual agents as they become available to handle calls. Either IP telephones such as IP telephone 83 or PC/VDU's such as agent's PC/VDU 45 may be used to answer calls. Also, conventional telephones may also be connected individually to PC/VDU's as is shown with reference to agent station 37. In this case, IP telephone 85 is not connected to LAN 77 but rather to PC/VDU 45 via a cable 99. Cable 99 would, in embodiments known to the inventors, acts as an interfacing cable connecting the telephones speaker and microphone functions to a sound card on PC/VDU 45 allowing an IPNT transaction to handled by a conventional telephone. There are several ways such an interface may be made.

The embodiment described with reference to FIG. 5 is useful where sophisticated routing rules are to be implemented. Load balancing between call centers, statistical routing, predictive routing, take-back-and transfer, and other functionality known to the inventors can be applied through T-Server control.

It will be apparent to one with skill in the art that the method and apparatus of the present invention may be used in very large call-center embodiments or in very small call-in centers without departing from the spirit and scope of the present invention. COST-IPNT bridge 87 can be set up to facilitate many companies of various sizes. For example, in one embodiment, a two man company or even an isolated salesman operating from a computer-enhanced sales-order desk may subscribe to a service providing advantages according to the present invention and have their IP address or addresses programmed directly into COST-IPNT bridge 87 so as obviate use of expensive telephone call center equipment.

In another embodiment, a large call center host organization may utilize the present invention with T-server control to distribute calls over a wide geographic region with many call centers and routing points. It will also be apparent to one with skill in the art that there may be many more than one COST-IPNT bridge such as bridge 87 distributed over different geographic locations, and that a single company may reserve access to more than one COST-IPNT bridge at those different locations.

Further, it will be apparent to the skilled artisan that the method and apparatus of the present invention may be applied to many varying network and call center architectures and infrastructures without departing from the spirit and scope of the present invention. For example, instead of applying the method and apparatus of the present invention to PSTN 13 and Internet 15, a private telephone network and a separate and private wide area data network may utilized, and so on. Also, call centers subscribing to services according to embodiments of the present invention may be pure IPNT call centers, or a combination of COST and IPNT. Such a case would be a large call center offering many different areas of service via IPNT whereas bill collection or credit analysis is still handled via COST telephony, and so on.

In yet another aspect of the invention, bridges similar to bridge 87 may be provided between any two protocol-incompatible networks. The interface and functionality described is not necessarily limited to connection-oriented networks interfacing with non-connection-oriented networks. Two DNT networks of dissimilar data protocol could be similarly linked, and two connection-oriented networks having incompatible call protocol could also be similarly linked, for example.

Simple Media Control Protocol (SMCP)

Figure 6:
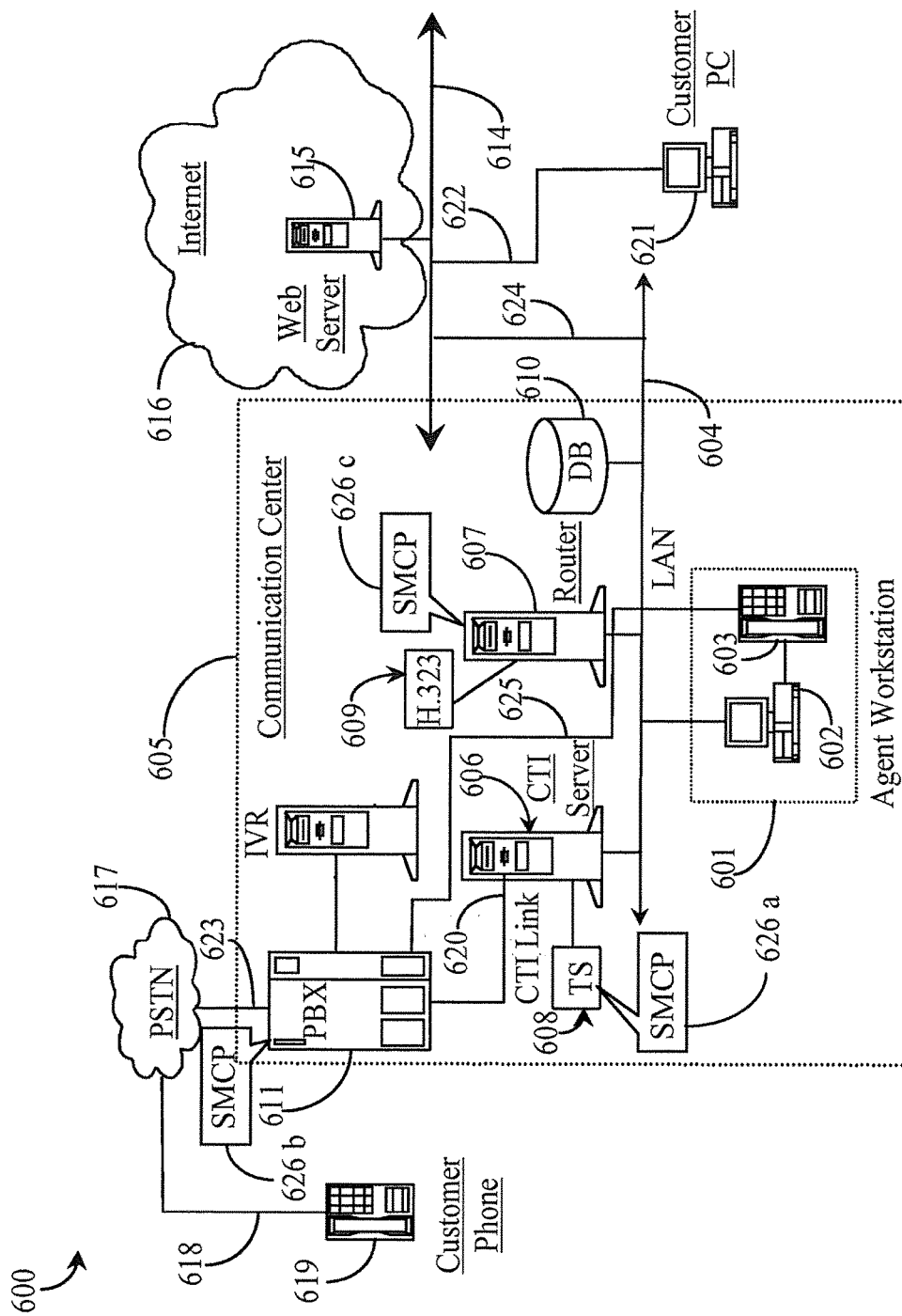
FIG. 6 is an architectural overview of a communication network practicing unique call-model management according to an embodiment of the present invention.

FIG. 6 is an architectural overview of a communication network 600 practicing call-model management according to an embodiment of the present invention. Communication network 600 represents a state-of-the-art network that enables dual communication center capabilities. Network 600 comprises a public-switched-telephony-network (PSTN) 617, a data packet network, which in this example is the well-known Internet network 616, and a dually capable communication center 605.

PSTN network 617 may instead be a private telephone network instead of a public one. Internet network 616 may instead be a corporate wide-area-network (WAN), an Intranet network, or any other type of data packet network (DPN) that supports Internet protocol (IP) telephony. The inventors choose the PSTN network and the Internet network in this example because of high public-access characteristics and because of the existence of already developed and standardized protocols, which enable and enhance integrated telephony.

A customer telephone 619 is illustrated as connected to PSTN network 617 by way of a COST telephone line 618. It may be assumed in this example that within PSTN 617 there are a variety of telephone switches, servers control points, and gateways for enabling cross-network data conversion.

Internet network 616 has illustrated therein a Web server 615 shown connected to an Internet backbone 614. Internet backbone 614 represents all of the lines equipment and connection points that make up the Internet network as a whole. Web server 615 is configured as a customer-interfacing file server through which customers may initiate contact with communication center 605. It will be appreciated by those with skill in the art that a variety of other types of Web servers as well as IP data routers and other network equipment may be assumed to be present in network 616 having connection with Internet backbone 614.

A personal computer 621 labeled herein as a customer PC is illustrated as connected to Internet backbone 614 by an Internet-connection line 622. PC 621 may be any other type of Internet-capable device that supports IP telephony. Internet-connection line 622 may be assumed in this example to include an Internet service provider (ISP) and standard PSTN connection equipment, although none of these are illustrated. Any known Internet connection scheme may be employed with respect to enabling Internet access for PC 621 or equivalent appliance. One well-known common method is a typical dial-up modem connection through the well-known PSTN network using an ISP. Other well-known schemes include digital service line (DSL), integrated services digital network (ISDN), cable-modem connection, wireless Internet connection via a wireless modem, fiber optics, lasers and others. The inventors logically illustrate connection line 622, which is meant to include all possible Internet connection mechanisms and equipment.

Communication center 605 has a central telephony switch 611 illustrated therein, which in this example is a private branch exchange switch. Switch 611 is illustrated as connected to PSTN 617 by telephony trunk(s) 623. Customer phone 619 is meant to represent all possible callers accessing communication center 605 through PSTN 617. Customer PC 621 is meant to represent all correspondents accessing communication center 605 through, in this example, Internet network 616.

As was described in the background section of this specification, communication center 605, as a dually-capable communication center, supports a local area network (LAN), illustrated in this example as LAN 604. LAN 604 is connected to Internet backbone 614 by a network access line 624. Access line 624 logically represents Internet capability of communication center 605 for sending and receiving IP transactions including IP telephony. Actual Internet connection capability of communication center 605 may comprise a 24×7 connection or a dial-up connection. LAN 604 is enhanced to support Internet-based telephony and other Internet-based media transport technologies. In effect, LAN 604 may be considered a sub-network of Internet network 616.

Communication center 605 is capable of sending and receiving COST telephone calls as well as IP telephone calls. For example, incoming COST calls arrive at PBX switch 611 while incoming IP calls arrive on LAN 604 and interface with an IP router 607 illustrated within communication center 605 and connected to LAN 604. It is important to note herein that communication center 605 is not limited to the illustrated configuration represented in this example. For example, considering the network-level bridging capabilities illustrated with respect to FIGS. 3-5 of priority application Ser. No. 09/024,923, center 605 may be adapted and configured to operate according to any one of the illustrated architectures.

The exemplary configuration of communication center 605 shown in this example is used for the purpose of adequately describing various aspects of the present invention. Network-level bridging as described with reference to priority document Ser. No. 09/024,923 may be assumed to be present in this example. Moreover, CTI enhancement representing third-party call control, as illustrated with respect to FIG. 5 above is further enhanced in various aspects of the present invention.

Referring again to FIG. 6, a CTI server 606 is provided and illustrated as connected to LAN 604 via a LAN connection. CTI server 606 is adapted to provide third-party call control over illustrated switching entities (SWE) PBX 611 and IP router 607, to which this server is coupled. CTI server 606 has call control software installed thereon and illustrated in this example as transaction server (TS) 608. For the purpose of simple illustration, TS 608 is shown separately but logically connected to CTI server 606. TS 608 is analogous in many respects to T-S 95 illustrated in FIG. 5 above. For example, TS 608 contains routing and service logic required to successfully route calls from either PSTN 617 or Internet 616 within and in some cases without communication center 605. CTI server 606 is connected to PBX 611 by a CTI link 620. CTI server 606 establishes connection with router 607 by way of LAN 604. It is well known in the art that SW instances such as servers may sit on a variety of different computers in the network, and deliver the same functionality. It is therefore only as an illustration, what specific computers have been assigned which functions.

IP router 607 is adapted to communicate using protocol H.323 (609) as defined in the background section of the specification. Router 607 comprises a virtual switch matrix that defines all of the endpoint routing possibilities within communication center 605. Also connected to LAN 604 is an exemplary Agent's Workstation 601, further detailed by presence of an agent computer 602 and an agent telephone 603. Agent computer 602 is connected to LAN 604 by way of a LAN connection. Telephone 603 is connected to PBX switch 611 by an internal telephony wiring 625. It is noted herein that telephone 603 is also coupled to agent computer 602. This may be, for example, by way of a cable connected to any sound card installed within computer 602. This configuration, known to the s, allows telephone 603 to be used both as a COST telephone and an IP telephone. However, for purposes of the specification it will be assumed that telephone 603 is employed to handle COST calls from PSTN 617 while computer 602 is employed to handle IP calls arriving from Internet 616. Other architecture is possible, such as separate IP and COST telephones. A database facility (DB) 610 is provided and connected to LAN 604. DB 610 is adapted in this example as a customer information database and server (CIS) and is provided as a resource to communication center agents.

As was described with reference to the background section, one of the main challenges to enabling successful telephony with third-party control is maintaining consensus concerning a call model, attributes of which enable all third-party control functions. For example, PBX switch 611 is a vendor-provided switch conforming to a particular call model. TS 608 must have knowledge of that call model in order to be used to build third-party controls. IP router 607 also conforms to a particular call model for, in this example, VoIP conforming to protocol H.323. In order to provide third-party control over router 607, TS 608 must have knowledge of that model. Although it is not shown in this example, it may be assumed that there is also third-party control over network-level switches and IP routers. In this case, TS 608 must also have knowledge of the call models of those switches and routers that are to be controlled.

While telephony, Internet, and device protocols enable some third-party control, more so regarding PSTN control than DPN control, as described in the background section, requiring that all call models be reverse-engineered and emulated by TS 608 adds considerable complexity to a coherent and continually reliable telephone service capability as provided by communication center 605. For example, if communication center 605 replaces switch 611 with a switch from another vendor conforming to a different call model, TS 608 would have to be retooled (reprogrammed) in order to enable third-party control over the new switch. The same would be true regarding router 607. Even with the availability of such tools (e.g. Genesys T-Server™), there is a complexity involved, and that leaves room for mistakes, due to revision levels, SW errors etc.

In an embodiment of the present invention TS 608 is enhanced with an instance of a protocol software termed Simple Media Control Protocol (SMCP) by the inventors. An instance of SMCP 626a is illustrated as integrated with TS 608. An instance of SMCP 626b is illustrated as provided to PBX 611, and an instance of SMCP 626c is illustrated as provided to IP router 607. Instances of SMCP communicate with each other using a low-level software protocol that allows for only one call model to be emulated by TS 608 and provides access to switching entities 611 (PBX) and 607 (IP router).

It is reminded herein that a call model emulates a switch state of a switch or router manufactured by a vendor. It will be appreciated by one with skill in the art that not all switch states are universal and vendors are prone to adding modifications to their switch states, which must then be emulated by CTI software to continue reliable third-party control over such switches and routers. It will also be appreciated that there is a great richness and a variety of state-of-art controls and functions that enable many varying call behaviors. Therefore, the typical call model is very complex indeed. The challenge of providing reliable third-party control is especially difficult when dealing with distributive DPN environments such as VoIP wherein end devices and distributed gateways, if any, share switching intelligence.

SMCP 626 provides that only one call model need be established by the call controlling entity (CCE), namely CTI server 606. SMCP instances 626a, 626b and 626c need only provide definitive access to switching function without necessitating a complex call model. In this way, greater flexibility and reliability is realized in third-party or CTI server control over PBX 611. Moreover, the exact same call model for control over PBX 611 may also be used to control router 607 and provide all of the same PBX-based services to IP callers from Internet 616.

FIG. 7 is a block diagram illustrating a CTI-PSTN call-model management approach according to an embodiment of the present invention. In this example, there are 2 illustrated third-party control states, one at left, and one at right within FIG. 7. In a classic prior-art approach within a PSTN environment a CTI server 608 is illustrated and has a Call Model supported therein, the call model illustrated as an abstraction comprising a plurality of circles and directional arrows. The call model represents the actual switch state of a PBX or other telephony switch. The CTI server 608 may be analogous to CTI server 606 of FIG. 6 in a prior-art sense with no SMCP enhancement. The CTI server 608 communicates with a switch illustrated herein as switch 611a by way of a CTI protocol link 700 analogous to CTI link 620 of FIG. 6.

Software running on switch 611a is illustrated herein as software 621 which contains a Call Model, hopefully identically emulated in server 608. Switch 611 may also have a switching matrix 702, which is the actual physical switch capability of switch 611a. In prior-art then, switch 608 provides a third party control over switching matrix 702 only by being able to identically emulate call model objects common in both call models. Control routines including call service and routing routines utilize the call model objects within their commands. Both machines must recognize and understand, by virtue of software, all included call model objects. If the call model of PBX software 621 is updated or changes in any way, the call model within CTI server 608 must be identically updated or retooled to reflect the update to avoid difficulty or failure.

Referring now to a preferred embodiment illustrated at right, a CTI server 704 is illustrated having a Call Model represented identically as the call model of CTI server 608. In addition to the described Call Model, CTI server 704 also has a thin SMCP stack or layer 705 installed therein and integrated with the CTI server Call Model. This combination is referred to as a Call Control Entity (CCE) in this specification. A Switching Entity (SWE) labeled 611b is assumed analogous to PBX 611 enhanced with SMCP 626b as described in a preferred embodiment with reference to FIG. 6. SWE 611b has identical (to Switch 611a) switching matrix 702 installed therein and also has a thin SMCP stack, which obviates the need for a call model. In actual practice of the present invention, call model objects contained within control routines in commands are described in low-level parameters using SMCP 705, which communicates to SMCP of SWE 611b over a communication link 703. Because SMCP is expressed in a low-level descriptor language, call model objects generic to the call model in server 704 can simply be described along with the commands for controlling switching matrix 702.

In this example, the actual switch state is represented by SWE 611b simply as a descriptor language with no high-level call model objects. In this example, all of the available switching embodiments may be accessed and controlled using SMCP in accordance to only one established call model maintained by the CCE, in this case, server 704.

FIG. 8 is a block diagram illustrating a CTI-IP call-model management approach according to a preferred embodiment of the present invention. This example represents 2 different CTI control states, and a CTI server representing a CCE controls an IP router analogous to router 607 of FIG. 6. A classic prior-art state is represented at the left of FIG. 8 while a preferred embodiment utilizing SMCP is illustrated at right.

Referring now to the classic prior-art representation, CTI server 608 communicates with an IP router 607a utilizing CTI protocol over a link 700. Link 700 may be analogous to LAN 604 of FIG. 6. As represented in FIG. 7, CTI server 608 contains a Call Model that emulates a Call Model provided with an IP router 607a and enabled by a software 621. The Call Model facilitated by software 21 includes a virtual switching matrix 702 defining the actual switch state and capability of IP router 607 a. Call Model objects defined within software 621 must be identically emulated at CTI server 608 with respect to its Call Model.

Virtual switching matrix 702 defines all of the edge computers and end points within a communication center that may accept IP calls. In this classic approach, CTI server 608 communicates through CTI protocol to IP router 607a in order to execute third-party control over virtual switching matrix 702, which defines the functional capabilities of IP router 607a. As was described above in the PBX embodiment with reference to FIG. 7, the mirrored Call Model within CTI server 608 must be retooled to reflect every update or change occurring within software 621 and the affected Call Model of IP router 607a. It will be appreciated by one with skill in the art that the Call Model representing the IP switching environment will add considerable complexity to an emulated Call Model in CTI server 608, assuming that a single call model will be constructed to handle both PBX and IP telephony within a given communication center. Moreover, because IP networks are disparate with respect to protocols, in call-routing and connection methods from a standard PSTN network more complexity is required to integrate CTI and IP communication, which must be accomplished to enable third-party control.

Referring now to a preferred embodiment of the present invention illustrated at right in FIG. 8, CTI server 704 is enhanced with SMCP stack 705 as was illustrated with respect to FIG. 7 above. However, in this example CTI server 704 communicates with a modified IP router 607b. The modification to IP router 607b involves eliminating the need to maintain a Call Model as is illustrated with IP router 607a by virtue of providing a thin SMCP stack integrated with router software. CTI server 704 is termed a CCE and IP call router 607b is termed a SWE. Communication between the illustrated SMCP stacks is accomplished over link 703, which in the example of FIG. 6 is analogous to LAN 604.

Virtual switching matrix 702 is identical in both router a and router 607b. The advantage of using SMCP is that high-level objects do not have to be represented in two separate Call Models. Again, a low-level descriptor language represents the Call Model of CTI server 704 to router software, which in turn by virtue of SMCP, enables CTI access to virtual switching matrix 702. In this example, the Call Model emulated in CTI server 704 maybe identical to the PBX Call Model for providing third party control over a PBX switch. SMCP enables manipulation of virtual switching matrix 702 according to the service logic and intelligence available in the PBX model.

FIG. 9 is a block diagram illustrating an XML-based call-model management approach according to yet another embodiment of the present invention. In this example, a CTI server 800 is enhanced with a capability of providing third-party call control in a classic sense in a PBX embodiment and simultaneously using SMCP to provide control in an IP embodiment.

A CTI server 800 is illustrated with a Call Model 801 and a call-model manager (CMM), which is XML-based meaning that the low-level SMCP descriptor language is in fact XML. Switch 611a, which is analogous to switch 611 of FIG. 6 is a classic vendor-provided switch containing a Call Model and a switching matrix 702. CTI server 800 exerts third-party control over switch 611a by way of CTI protocol link 700 as was described with reference to FIG. 7 at left. A Call Model 801 enabled by CTI software emulates PBX software model 621 and normal CTI protocols are used in communication over link 700. XML-CMM 802 is a virtual Call Model expressed in XML language. XML-CMM 802 contains all of the XML attributes of Call Model 801.

CTI server 800 is the CCE while PBX switch 611a and SMCP-enhanced IP router 611b are SWEs. Note that the switching matrix 702 of IP call router 611b is a virtual matrix and is not identical to switching matrix 702 of PBX switch 611a. In this enhanced embodiment, only a single Call Model (801) is required to control PBX switch 611a in a classic CTI sense and for controlling IP router 611b using the novel SMCP protocol. It is noted herein that in embodiments illustrated and described with reference to FIGS. 7, 8 and 9, SMCP-enhanced SWEs contain no service logic or other intelligent routine logic.

It will be apparent to one with skill in the art that SMCP enhancement as described with reference to FIGS. 7-9 enables use of a single Call Model maintained only by a CCE (third-party controller) and that vendors of telephony switches and data-packet routers then need not maintain elaborate Call Models. All that is required to practice the present invention is to enable low-level access (command control) of a CCE to physical and virtual switching elements maintained in telephone switches and IP routers. As a result, much additional complexity and integration of protocols and provision of updated or revised Call Model objects is eliminated. More detail regarding SMCP capability is described below.

FIG. 10 is a block diagram illustrating SMCP control over interior and exterior call leg construction using a voice-switch commutator according to an embodiment of the present invention. As is known in the art, all telephony including IP telephony communications involve constructed connection states that make up call legs in the art. A call leg is essentially one-half of a connected call. Call legs in a PSTN environment are physical legs that are dedicated-connection oriented. Call legs in a VoIP environment are virtual call legs. A Call Control Entity (CCE) 1005, assumed to be a CTI server analogous to server 606 of FIG. 6, is illustrated herein and adapted to provide third-party control over an illustrated Switching Entity (SWE) 1000, which is assumed to be analogous in this example to IP router 607 of FIG. 6. In this example, CCE 1005 communicates with SWE 1000 via a LAN network 1004. Both CCE 1005 and SWE 1000 are enhanced with an SMCP stack. It is assumed herein that CCE 1005 maintains a Call Model providing all of the service logic and routing intelligence available within an applicable communication center environment.

A plurality of incoming IP telephony trunks 1003 are illustrated as ported to SWE 1000. A virtual switching matrix 1001 serves as a switching interface (software) between IP trunks 1003 and a like number of illustrated connection ports 1008. Call legs 1010, illustrated within switching matrix 1001 identified as interior call legs. For example, the upper-most connection port 1003 on SWE 1000 is illustrated as connected to the lowermost connection port 1008 using two interior call legs 1010. The point represented as the junction of the two interior call legs is a call connection point. That is, an incoming call to any of ports 1003 may be maintained with one interior call leg and any connection point. A second interior call leg must be constructed to complete the connection through switching matrix 1001 to any of ports 1008. Moreover, calls arriving at SWE 1000 wherein the final destination is on the same side of switching matrix 1001 have interior call legs connected to ports on a same side of SWE 1000.

Exterior legs are defined as legs exterior to SWE 1000. Exterior legs are represented in this example by element number 1009. It is important to note herein that legs 1009 do not represent separate physical data lines, but rather open data channels, which are logically illustrated.

In this example there is a grouping 1006 of IP telephony devices (End-User Devices) represented herein by an element number 1007. In this logical representation, it may be assumed that exterior legs 1009 are data channels established over LAN 1004 wherein IP devices 1006 are connected directly to LAN 1004 or indirectly to LAN 1004 through individual workstation computers. It is also noted herein that that CCE 1005 and SWE 1000 are represented as abstract modules in the sense that their physical embodiments depend on the exact architecture of a VoIP network. For example, if SMCP is used in an H.323 network, SWE 1000 may be implemented as a Gatekeeper. In an MGCP-based network, the role of SWE can be played by a Media Gateway Controller (MGC) and so on.

In this example, SMCP software assumes that SWE 1000 implements an abstraction of a commutating device allowing separate control of call legs both interior and exterior. That is, SWE 1000 must be able to ensure that externally invisible calls are kept established even when the commutating device tears down and then re-establishes internal connections (call legs). The SMCP stack of SWE 1000 represents the switching state and accepts commands from CCE 1005, which may be XML based or based on other low-level descriptive languages, the commands containing XML description of the various service objects and options generic to the call model of CCE 105.

FIG. 11 is a block diagram illustrating the voice-switch commutator of FIG. 10 implemented in an enterprise VoIP scenario according to an embodiment of the present invention. This example illustrates how SMCP is utilized in an actual VoIP scenario. A communication center LAN 1106 is used to connect a plurality of IP telephony devices represented herein as devices 1117. Each device 1117 has a virtual port 1116 associated therewith. A CCE 1103 (CTI Server) is running an SMCP stack 1105 and a SWE 1102 is running an SMCP stack. CCE 1103 is directly connected to LAN 1106 while SWE 1102 is illustrated as directly connected to LAN 1106 and to an IP gateway 1101

In this example, calls are routed to the communication center or enterprise center from Internet 1108 via an IP router 1110 onto LAN 1106. IP connections are established by commutating call legs within gateway 1101 by SWE 1102 running SMCP 1104. An IP interface port 1114 is provided as an input to gateway 1101. Gateway 1101 has a virtual switching-matrix modeled therein. Call legs are represented in this example by external legs 1113, and internal legs 1115. External legs are logically illustrated from Internet 1108 through router 1110, onto LAN 1106 and into IP port 1114. Internal call legs are represented from a connection point within gateway 1101 (switching matrix) to virtual device ports 1116, and in one instance, between two virtual device ports 1116. The latter illustration is exemplary of versatility of virtual connection.

Call legs are terminated at endpoints and are associated with physical or virtual ports. However, there are some situations that may arise wherein endpoints do not have associated virtual ports. Some ports can be used for support of multiple simultaneous connections. The parts of call legs outside of a switch or a gateway (1101) are called exterior; connections between them inside switches are interior. In this example, more than two call legs can be connected together to form a multi-party conversation.

Typically, endpoints can terminate only one call leg at a time. However, in some cases (for example, call treatment sources, such as music-on-hold) a single endpoint can be connected to multiple call legs. All endpoints have unique endpoint addresses represented, in preferred embodiments, as ASCII character strings. Depending on an exact application, such strings can be telephone numbers, URLs, E-mails, and so on. The exact naming scheme is application-specific.

Similar to other Internet protocols, SMCP messaging is text based. All messages exchanged between SMCP stacks contain only ASCII printable characters, spaces and tabs. Each message line is terminated with a CR-LF sequence (OD OA hex.). Following is an example of actual message structure.

Message-verb reference-number CR LF
attribute-name: attribute-value CR LF
attribute-value-continuation CR LF
attribute-name: attribute-value CR LF
CR LF Message verbs and attribute names are strings composed of letters, digits and dashes. Attribute values are arbitrary strings of printable characters, spaces and tabs. An attribute value string can span several lines, with continuation lines starting from space or tab. An empty line (line containing only the CR LF sequence) terminates an entire message. All messages sent by a CCE will be referred to as requests, and all messages sent by SWE will be called events or notifications. Both sides must also send replies in response to received messages in a request response IP environment. Message reference numbers are generated by a CCE during communication. Reference numbers are unique decimal integer numbers used to match replies to requests. All requests and notifications must have reference numbers. SMCP protocol enables end devices to be implemented as less complex (intelligent) devices.

FIG. 12 is flow diagram illustrating basic steps for establishing an outbound call connection using XML-based SCMP. The following process steps illustrate a simplest successful outbound connection but do not illustrate optional treatment. At step 1200 there is no connection established as known for a pre-call state. At step 1201, a call request is sent. This step is initiated when a CCE sends a command to SWE to initiate a call request. It is noted herein that if a request is not valid, SWE responds with an error reply. If a chosen port is busy, SWE responds with a busy reply. Assuming herein that the request is valid, SWE allocates a call-leg identifier and returns it to CCE with a calling reply in step 1202. Step 1202 amounts to an outbound call request acknowledgement.

At step 1203, SWE initiates a transport connection to the endpoint selected in step 1201, and sends a Call Setup message to the endpoint, which replies with a Call Proceeding (CP Received) message indicating that the end point will assume further responsibility for completing the connection. SWE also sends a Call Alert message, which is received in step 1204. The CA message indicates that the call has been delivered to the end-user device, and the end user device has begun alerting the user via a ringing event or other alert.

If a called end user answers the event, the endpoint device called replies with a Setup message, thus initiating the process of establishing a transport connection to complete the connection. SWE informs CCE about this event with a Call Answered notification in step 1205. When a transport set-up is completed, the endpoint device replies with a call-connected or established notification in step 1206.

At any time during the sequence after a Calling notification in step 1202, SWE may inform CCE that the requested connection cannot be completed with a Dropped notification (not illustrated). If CCE did not send a Hang-up request for this call already, a Hang-up request must be sent to release the connection after receipt of a Dropped notification. XML primitives communicated through SMCP provide a reliable mechanism for manipulating or commutating the end-point sides of call legs in this example of out-bound calling. Other procedures not illustrated herein include configuration management, encryption, and fault tolerance.

It will be apparent to one with skill in the art that the process steps illustrated herein may be supplemented with many optional side routines integrated therewith out departing from the spirit and scope of the present invention. For example, intelligent routing routines and multiple party connections may also be implemented and integrated with the basic scheme of this example.

FIG. 13 is a flow diagram illustrating basic steps for establishing an incoming call connection using XML-based SMCP. For managing inbound calls arriving within an enterprise communication center SMCP utilizes four basic protocol data units Ring, Send CP, Send CA, and Answered.

In step 1300, there is no connection as the system is in the state of pre-arrival of an incoming call. At step 1301 SWE detects an Arriving call or attempt to set-up a transport (port to port) connection accepts the request and reads the set-up message. SWE alerts CCE about the incoming event with a ring notification. At step 1302, CCE commands SWE to send a Call Proceeding message to the calling party with a Sending CP request in step 1302. At step 1303, a notification from SWE is received at CCE indicating that the Call proceeding message was sent and arrived at the calling party.

In step 1304, CCE instructs SWE to send a Call Alert (CA) notification to the requested calling party and wait for an OK reply. At step 1305, the Call Alert has arrived and the calling party is notified by a ringing event or other notification. At step 1306, CCE answers the call and requests that SWE perform the transport protocol negotiation with an Answer request, and wait for an OK reply.

In step 1306, SWE sends notification to CCE about success or failure of the requested negotiation. If the transport connection was successful the requested connection is considered established or answered in step 1307 and SWE sends an Answered notification to the CCE. It is important to note herein that at any time after an original Ring notification in step 1305, SWE may notify CCE that the requested connection was abandoned with a Dropped notification. If CCE did not send a Hang-up request for this call, this request must be sent to release the connection after receipt of a Dropped notification. After receiving any reply or notification pertaining to the current call leg, CCE may command SWE to drop the connection with a Hang-up request. After issuing a Hang-up request CCE waits for a Dropped notification from SWE before assuming that the port is available for a next call attempt.

SMCP media-stream commutation allows interconnecting existing exterior call legs in an arbitrary manner. The connections are established with a Make request and are torn down with Break or Hang-up requests. It is important to note that interior connections for different media streams related to a same call leg are different connections, and can be independently established or torn down. It is also noted herein that interior call legs may be established before exterior legs are completed.

It will be apparent to one with skill in the art that the process steps illustrated herein may be supplemented with many optional and or additional side routines integrated therewith out departing from the spirit and scope of the present invention as was described above with reference to FIG. 12. For example, advanced intelligent routing routines and multiple party connections may also be implemented and integrated with the basic scheme of this example. The inventors intend that the simplified process of this example represent just one basic implementation of connecting or establishing an inbound call using SMCP in a VoIP scenario.

Using XML-based primitives as a low level language for SMCP protocol enables one to control exterior and interior call legs. The control procedures allow one to develop different and varied third-party services whose logic is placed into the CTI Server as was described with reference to FIG. 6 above. Created services may include, but are not limited to any standard PBX-based service as well as complementary services like call transfer, call forwarding, conferencing, call hold, etc. These services and more may be provided in a VoIP environment without duplicating a call model in the SWE. Moreover, a wide variety of specific services can be provided that are not supported by standard PBXs.

Referring now back to FIGS. 12 and 13, XML messaging as used in SMCP provides a reliable mechanism for CCE, SWE communication and call leg commutation. Following is an actual example of an XML message Ring notification.

```
<?xml version="1.0"?>
<SMCP version="1.0">
<RING
    leg_ID ="12345"
    port="1392"
    protocol="h323v2"
    user_information="SMCP_Callcenter_representative_007"
    DNIS="9131346"
    Caller="9131104"
    ANI="4371100"
    Ring_tone="urgent"
    peer_type ="conference">
    <codec
        media-type ="audio"
        codec-type ="g711"/>
</RING>
</SMCP>
```

The first line is a line common for all XML documents. It says that the following is a XML document and XML is of version 1.0. The second line contains a root tag <SMCP> telling that the XML document is a document related to SMCP vocabulary. In other words it says that the present XML application is SMCP protocol.

The third line opens a tag <RING> that corresponds to SMCP message RING. This tag has 9 attributes corresponding to parameters of the message. These are leg identification (ID), port, protocol, user information, destination number identification service (DNIS), caller, automatic number identification (ANI), ring tone, and peer type. The tag contains tag <codec> as a constant. The tag <codec> in its turn has two attributes media-type and codec-type corresponding to parameters of a Ring message. This fact enables use of multiple codec tags. The last two tags of the XML message terminate the message.

It will be apparent to one with skill in the art that the method and apparatus of the present invention may be utilized in any telephony environment including PBX, standard DNT and in VoIP type environments without departing from the spirit and scope of the present invention. In one embodiment, both classic PBX and VoIP architectures may be supported by a single server and call model. There are many possibilities.

XML-Based Routing and Workflow Strategies

In one embodiment of the present invention the inventors provide an XML vocabulary and method for enhancing existing routing strategies for multimedia interactions in a way that is universally applicable between different routing systems and multimedia types. The methods and apparatus of the invention in this aspect are detailed below.

FIG. 14 is an architectural overview of a multimedia communication center 1403 enhanced for intelligent routing and workflow management according to an embodiment of the present invention. Multimedia communication center (MMCC) 1403 represents any type of contact or call center capable of processing and routing incoming and outgoing multimedia communications both in a digital environment and in a connection oriented switched telephony (COST) environment. There may be many variant architectures and equipment groupings represented within MMCC 1403 without departing from the spirit and scope of the present invention. The inventors intend that MMCC 1403 represent just one example of a dual capable communications center that may field interactions such as but not limited to COST voice interaction, Voice over Internet Protocol (VoIP) interaction, Internet messaging, and Web service interaction.

MMCC 1403 has access to a public switched telephony network (PSTN) 1401 and has access to the well-known Internet network 1402. One with skill in the art of network bridging technologies will recognize that interactions may be routed between Internet network 1402 and PSTN 1401 in seamless fashion over communications line 1406 using a suitable communications gateway such as a signal seven (SS7) (not illustrated) or other known gateway.

MMCC 1403 has a computer telephony integration (CTI) enhanced private branch exchange (PBX) telephony switch 1407 provided therein and adapted as a central office telephony switch for routing incoming and outgoing telephone interactions incoming from PSTN 1401 and outgoing from MMCC 1403. PSTN may be a private or public telephone system without departing from the spirit and scope of the present invention. PSTN 1401 includes a service control point (SCP) 1404 adapted to route any incoming calls from anywhere in PSTN 1401, as illustrated by directional arrow, to MMCC 1403, or more specifically, to PBX 1407 over a connecting communications trunk. PBX 1407 is CTI enhanced in this embodiment, as previously described. PBX 1407 is also enhanced with transaction server (TS) software 1408a, known to the inventor. TS 1408a is adapted to provide intelligent agent level routing within MMCC 1403 including system treatment by automated subsystems. In this example, PBX 1407 has interactive voice response (IVR) 1426 provided thereto as part of CTI enhancement. IVR 1426 is adapted to solicit information from callers through voice interaction to aid in internal routing performed by PBX 1407. It will be understood by the skilled artisan that many other intelligent routing routines may be in place.

Internet network, hereinafter referred to as Internet 1402 in this specification has a contact server (CS) 1405 provided therein and adapted as a digital portal or other communications catalyst between customers and potential customers of MMCC 1403 and MMCC services. Server 1405 may be a Web server containing electronic information pages detailing services including interactive contact forms, contact options, and live communications options. These may include Web service transactions, email contact options, VoIP options, telephone contact options, instant messaging options, and live chat options. Video conferencing may also be provided through interaction with server 1405.

Interaction occurring within server 1405 is monitored and serviced by MMCC 1403. Live interactions and requests may be routed from server 1405 to MMCC, or more particularly, to an Internet protocol router (IPR) 1413 provided within the center. In this example, IPR 1413 has a firewall application (FW) 1414 installed thereon and executable there from. FW 1414 is adapted to provide network security and to prevent unauthorized data from entering MMCC 1403. IPR 1413 also has a soft private branch exchange (SPBX) telephony switching software 1415 installed thereon. SPBX 1415 is adapted to route incoming IP voice interactions internally to live agents, systems, or to PBX 1407 for further routing. SPBX 1415 is enhance with a version of TS software 1408d for providing intelligent SPBX routing in much the same fashion as was described with reference to TS 1408a on PBX 1407.

MMCC 1403 is enable via a local area network (LAN) 1423, which may also be a series of connected LANs, a WAN, or some other digital network capable of transfer control protocol/Internet protocol (TCP/IP) and other necessary protocols for communication and data transfer. LAN 1423, also referred to herein as a backbone 1423, supports CTI PBX 1407, IPR 1413 and other systems and equipment groups described further below.

Backbone 1423 supports an email (EM) router or server 1427, which is adapted to receive incoming email messages internally sourced and those sourced from Internet 1402. In this case, all email identified at IPR 1413 might be forwarded directly to EM 1427 for distribution to agents and/or automated systems. EM server 1427 is enhanced with a version of TS 1408b. TS 1408b is adapted to intelligently route emails according to any strategy created for the purpose. Backbone 1423 also supports an instant messaging (IM) router or server 1428. IM server 1428 receives and routes all incoming instant messages either sourced from within MMCC 1403 or incoming from Internet 1402 and forwarded to server 1428 via IPR 1413. IM server 1428 also has a version of TS 1408c provided thereto to add some intelligence to IM routing.

It is noted herein that EM sever 1427 and IM server 1428 may be directly ported to Internet 1402 and may function independently from IPR 1413 without departing from the spirit and scope of the present invention.

Backbone 1423 supports a data repository system (DRS) 1410 for managing customer relations, customer information, product and service records, purchase records, and other important data required by MMCC to operate. DRS 1410 includes a data server (DS) 1411 adapted to serve any requested data to live entities within MMCC 1403 or to requesting system including routing strategies and workflow management strategies. DS 1411 has access to data stores 1412. There may be fewer or many more data stores provided to server 1411 without departing from the spirit and scope of the present invention. Data stores 1412 may be optical storage disks, RAID disks, magnetic disks, hard disks, or any other storage space adapted to store digital data.

An agent-scripting server (ASS) 1409 is provided within MMCC 1403 and is adapted to retain and server agent scripts upon request. ASS server 1409 may contain scripts, for example, that are used to prompt an agent as to how to handle a specific class of interaction. Part of the routing routine in such cases might be to call ASS 1409 during the course of interaction routing and to have the appropriate scripts delivered to the target agent desktop so that they are available at the time of the interaction. Still other systems supported by backbone 1423 include a statistics server (STS) 1416 and an XStrategy server (XST) 1417.

STS 1416 may compile and report statistics collected from ongoing interactions in the center. Another possible use for STS 1416 is to provide statistics values for requesting routing routines. For example, a specific target agent may at the time of a call, be statistically more likely to be available than another agent which may be part of a target group of agents handling the class of incoming calls. In this case the routing routine responsible for selecting which agent queue to deliver the call into consults STS 1416 for an up-to-date value that identifies the agent that is statistically most likely to become free to handle the incoming call.

XST server 1417 is provided and adapted to contain all of the required XML constructs to represent routing strategies used by MMCC 1403 and the generic constructs used by various routing machines such as IM server 1428, EM server 1427, IPR 1413, and CTIPBX 1407. XST 1417 may also contain representative constructs equating to TS variables and constructs. XST server 1417 has a software instance SW 1418 installed thereon in permanent or removable fashion and which is executable there from. SW 1418 is an application that enables existing routing routines to default to server 1417 for certain intelligent routing routines and routing routine extensions that would otherwise not be available to the routing routines working in one or more existing languages such as VXML, CCXML, or interaction routing languages (IRLs) known to the inventor. It is noted herein that XStrategy documents have a file name of .sxml, hence the acronym SXML is used to define an XML document containing XStrategy constructs and attributes. An SXML document (.sxml) and may include existing markup features and attributes as well as new and novel features and attributes without departing from the spirit and scope of the present invention. More detail about XStrategy markup language will be provided throughout this specification.

Backbone 1423 supports a plurality of agent workstations 1419, 1420, and 1421. Agent workstations 1419-1421 represent target agents who would be charged with handling various incoming interactions. Each station 1419-1421 includes, at minimum, an agent desktop computer and a telephone as illustrated by the enclosed icons at each station. Each agent desktop has LAN connection to backbone 1423. Each agent telephone, in this example, is connected to PBX 1407 via internal telephone wiring 1422. In other embodiments, the telephones may be Internet Protocol (IP) telephones connected as peripherals to their host desktops, or connected directly to LAN backbone 1423.

In practice of the present invention, server 1417 aided by software 1418 may be consulted during routing of any routable form of communication incoming or outbound from MMCC 1403. In one embodiment, SW 1418 is an automated language conversion application that provides intelligent routing strategies that may be "invoked" by any existing routine and that may execute within or along side existing routing scripts on the fly. In this way, extra intelligent handling of communication events may be implemented when such handling may be required by or order from any executed routine.

In one embodiment of the present invention, a programmer operating at any one of agent stations 1419-1421 or perhaps, a similar dedicated programming station may use SW 1418 to create intelligent routing routines in XSML and may launch those routines such that the target routing system that will call the routine may use the routine as written without requiring any other language conversion. In this case, all of the routing function and capabilities or task routines generic to the machine are provided in the new language. In still another embodiment, SW plug-ins (not illustrated) may be provided to each targeted routing system including any illustrated herein. The plug-in capability may provide interjection of the new routing routines into existing routines by tagging to provide on-site intelligence to those routing systems.

To understand the method of the present invention, assume that a communication event (CTI telephone) call is incoming and queued at CTIPBX 1407. IVR interaction with the call may determine that the caller requires routing to a specific agent operating at 1419. CCXML may simply report a busy state at station 1419. An XST rule may be in place for such an event and TS 1408a may call server 1417 in the event of a busy determination to call a routine according to an XST start tag, for example, embedded in CCXML. The intelligent routine executes in place of or in conjunction with the current routing routine and may run in parallel with the routine until a particular goal of the strategy is satisfied. If there is a rule that requires a second look-up of all qualified agents and then routing to one of those agents that is "best qualified" of the target pool after the "busy agent", the XST module may run in the server to activate the strategy and to communicate one or more routing commands to a TS application monitoring the queued event. The TS server may then correctly route the call based on the extra routine, which may also involve a value served from STS 1416. The value served by STS 1416 may be served to XST 1417 when executing the alternate routing treatment. The TS instance understands the new routine and can communicate that routing command to the switch.

SW 1418 may be distributed in the form of "language transformation modules" to any machine responsible for any routing of communication events. XML-based constructs may be developed for routing based on date and time, parameters of the call, agent skills, customer data, CC statistics, and so on. Moreover, constructs for specifying call treatments, priorities, waiting time, timeouts and the like are possible. In one embodiment, XST may be implemented as an extension of simple media control protocol (SMCP) known to the inventors for communicating call models represented in XML primitives or other low level descriptor languages.

XST may be used in various embodiments in different environments. For example, XST may be used with a simple object application protocol (SOAP) or Xpath transport mechanisms in conjunction with back end data services as well as with Web service defined by Web Service Description Language (WSDL) or Web Service Flow Language (WSFL). It can be integrated into workflow management languages like Business Process Execution Language for Web Services (BPEL4WS) and XML Process Definition Language (XPDL). By tagging the existing scripts with an XST start tag, a predefined routine may be executed. More detail about XST will be presented below.

FIG. 15 is a block diagram illustrating components of SW 1418 according to an embodiment of the present invention. SW 1418 may reside in a server analogous to XST server 1417 described with reference to FIG. 14 above. In this embodiment, XStrategy is used to compliment current interaction routing languages (IRLs) that may be used in current routing systems to route communications events. TS software may be in place, as illustrated here, to monitor the states of events in queue or otherwise registered at any routing point and to communicate with like instances to receive and pass on intelligent routing instructions and routines. A routing point may be a PBX switch, a SPBX switch, a message router or any digital terminal capable of performing some treatment related to or that may effect routing of an event.

SW 1418 includes an XStrategy Language Generator (XSLG) 1501, which is adapted to assemble XST script from primitive XML constructs according to any prevailing rule that might be relevant to an incoming TS request from a routing point. XML constructs are stored in a data storage media and are server by an XML server accessible through an XML server interface 1502.

A TS request will provide details related to the event to be routed and may be generated based on a tag inserted into the existing routing script used at the routing point. In this embodiment, a tag inserted in the script has triggered a TS call to XSLG 1501. The TS request will also identify the correct rule or rule set that may be relevant to the event and/or to any parameters associated with the event. An interface to a rules base (not illustrated in this simple block diagram) may be assumed present in this example.

When SW 1418 processes a request, XSLG may assemble a complete XML script that represents a routing routine or process that may contain one or more target values and, perhaps, one or more treatment assignments. In one embodiment, the XML routines may already be in place for static assignment. In another embodiment, the routines may be dynamically assembled, as is the case here. A routing routine is generated and then transformed into the generic routing language used. In this case the XML strategy is transformed into IRL using extensible Style sheet Language Transformation (XSLT) module 1504. Module 1504 has access to an IRL construct server through an IRL server interface 1503. In this case, the XML constructs and IRL constructs may be matched one for one to aid in generation of a usable IRL script, which contains the XST routine. An IRL generator 1500 provides the corresponding IRL script.

The IRL script, enhanced with the new intelligent routine may be embedded as text into a TS response back to the router. The TS response will contain the complete IRL script and any added routing command or treatment command provided by the XST now expressed as IRL for execution by the router. SW 1418 may have several different language transformation interfaces between it and various routing points depending on the mix of multimedia routing points in use and enhanced, in this case, with an instance of TS.

In one embodiment, the routing may be very simple such as the following example:

```
<strategy version="0.1" name="Example 1">
  <rule cond="Date=07/04/96 & (Time > 9:00 & Time < 18:00)">
    <targets vq="">
      <target name="1234@SF.A" type="agent"/>
    </targets>
  </rule>
</strategy>
```

The XST script above defines a strategy that routes the event to target if the interaction arrives on Jul. 4, 1996, between 9:00 am and 6:00 pm. The strategy defines only one target (tag <target>). The target type is "agent" and the target address is 1234@SF.A. Note that this strategy is expressed with one rule (tag <rule>).

The same strategy in IRL may appear as follows:
Date=Jul. 4, 1996 & (Time >9:00 & Time <18:00)"->Targets [1234@SF.A]
In this embodiment, a routing exception may be based on data and time rules recorded at the time of the incoming event.

A slightly more complex XST routine using only one rule may appear as follows:

```
<strategy version="0.1" name="Example 2">
  <rule cond="(Day>=Monday & Day<=Friday) & (Time > 9:00 & Time < 18:00)"
        timeout="30s" >
    <priority value="10" />
    <treatment type="Mandatory" name="Music" time="15s" port="20" />
    <targets vq="">
      <target name="2503" type="agent" />
      <target name="2504" type="agent" />
      <target name="2506" type="agent" />
    </targets>
  </rule>
</strategy>
```

The above strategy consists of one rule that has the same condition of routing using time and date as the first strategy. However, this strategy defines an attribute "timeout" specifying a time 30 seconds for waiting for a target to become available. If no target becomes available within 30 seconds, the interaction is routed to a default target that is not specified in this strategy. The interaction in the strategy has a priority 10 tag and it will be routed before any interactions in queue having lower priorities. Music from a device defined as source port "20" may be played for 15 seconds while the interaction is queued and waiting for an available target. Three targets of "agent" type are defined in this strategy.

Converted to IRL, the script may appear as follows:
(Day>=Monday & Day<=Friday) & (Time >9:00 & Time <18:00)"->{Music[20]:15} Timeout[30] Priority[10] Targets[""", 2503, 2504, 2506].
More detail regarding the flexibility of XStrategy scripts will be presented later in this specification.

One with skill in the art will recognize that SW 1418 may be distributed in whole or in parts to a variety of nodes including server nodes, routers, CTI processors, message routers, or even on desktop routers without departing from the spirit and scope of the present invention.

FIG. 16 is a block diagram illustrating at least four basic communication center environments that may be enhanced with XStrategy. An XStrategy or XST script 1600 may be adapted for use in different ways in differing environments within a MMCC without departing from the spirit or scope of the present invention. An XSLT server 1601 may be provided and adapted to reside in-between the XST script and one of several targeted service environments. XSLT server 1601 may provide language transformation services so that a router or switch 1602 enhanced for IRL, CCXML and/or VXML may understand and execute XST transformed scripts.

XST scripts may be transformed into script that integrates with WSDL used to create functional Web services 1603. Likewise, XST may be created and used to represent Genesys Interface Server (GIS) routines (known to the inventor), statistics based routing routines, and predictive routing routines represented by a block 1604.

In one embodiment, XStrategy may be used to enhance workflow management that is internal or Web-based and defined by BPEL4WS, in the case of a Web-based service, or in some other markup. In one embodiment, tagging can be used in a routing script to spawn multiple XST processes to run in parallel with the script wherein those processes involve separate resources including routing resources, statistics servers, script servers, and workflow management servers. Many processors support multiple threads running in parallel. Therefore, a linear routing approach may be enhanced to include other processes in order to perform a same amount of work in a shorter period of time.

One with skill in the art will recognize that in creating strategies using XStrategy constructs, tags may be created and embedded in existing markup scripts such as CCXML and VXML whereby those embedded tags may invoke the completed scripts. In one embodiment, a single tag may force a lookup of more than one strategy whereby a specific strategy is selected to start based on criteria used for selecting that available strategy. In still another embodiment, XStrategies are dynamically assembled from the available constructs based on the data related to the actual interaction and one or more rules governing the interaction.

FIG. 17 is a process flow chart illustrating a CCXML telephony script adapted to invoke VXML and SXML according to an embodiment of the present invention. At act 1700, an incoming connection request is received in queue or otherwise registered at a routing point. The event may be an incoming voice event requesting routing to an available target such as a live agent for example.

At act 1702, the routing system initiates an alert that a connection request requires processing. The alert may be generated to a transaction server or other responding system. The alert may be received through state monitoring of a queue or switch or it may be in the form of a notification to a processing entity.

At act 1703, the connection request and any associated data is received by the processing entity. At act 1704, a determination is made to accept or to deny the connection request. If at act 1704, the request is not accepted, the process flow may end at act 1705 and the event may be ignored, dropped, or redirected by default to an automated system for example. If the connection request is accepted then the queuing system is notified and the switching entity establishes a connection at act 1706. In this example the connection may be established via CCXML call control script and the connection is to an automated voice dialog system running VXML.

At the beginning of the script a dialog start tag is executed at act 1707. At this point in the flow a VXML dialog executes at act 1708. The VXML may contain one or more dialogs and may further involve the caller in interaction. The VXML dialog state runs in parallel with the CCXML script and at act 1709, the state of the script is reported as active dialog state or VXML interaction is active.

At act 1710 the VXML dialog has finished and, perhaps as a result of the VXML interaction, an XStrategy script will be called. At act 1711 an XStrategy script is called and like the VXML script may execute in parallel with the running CCXML script. At step 1712, the XSML strategy ensues. At act 1713, the running script state is active for the SXML strategy. In this example, the SXML routine may be an intelligent routing routine that is actually selected or invoked from the VXML routine preceding it in the CCXML script. However, that is not required in order to practice the present invention. The SXML routine may be started from any place in the routing script. Moreover, multiple SXML scripts may be associated to a CCXML or other generic routing script and may be started wherever their tags appear in the script. In one embodiment, SXML routines may be launched from other SXML routines that are started from a generic script like a CCXML script or a VXML script. There are many possibilities.

In one embodiment, the SXML routine may be directed toward finding available resources and causing redirection to those resources from an existing routing point, perhaps a queue. In another embodiment, a SXML routine associated with a routing script may perform some other function like making an adjustment to a workflow process or schedule. Integration of SXML between disparate MMCC processes enables multiple tasks to be started at the time of a transaction resulting from an interaction in process.

At act 1714, the SXML routine has completed and results in a redirect tag that executes at act 1715. The routing entity then redirects the event at act 1716 and at act 1717 the process may terminate if there are no other routing requirements existing, or that may be created as a result of the redirect action.

The strategy start tags represented in the CCXML flow has at least three attributes in its format. For example, the attribute src denotes the character string that identifies the universal resource locator (URL) of the XStrategy (*.sxml) document that is the subject of the start tag. The attribute name is the name of the variable that will receive a session name associated with the launched routine. The attribute target is the name of a variable that will receive the address of a target determined by the launched routine. The strategy start tag only has one attribute "sessionid" that is the session identification generated at the start tag and which is stored by a variable identified in the name attribute of the start tag. The strategy stop tag is actually sent to the running CCXML script by the SXML when it is no longer needed.

In one embodiment if a planned XStrategy document cannot be started, a tag "strategy.notstarted" may be sent to the CCXML script indicating some error in processing. The CCXML flow represented in this example reflects only a very simple architecture. However, much more complex architectures are feasible and practical.

FIG. 18 is a block diagram illustrating keyword options for use in an SXML XStrategy routine. An XStrategy routine 1800 is illustrated and includes at least one *.sxml document 1801. The documentation contains all of the necessary elements to successfully represent and communicate a strategy for routing or workflow. It may be assumed that a condition set for a routing rule may include any one of a number of keywords, which are widely used in other markup like CCXML and VXML for example.

It may be assumed herein that strategy 1800 is a routing strategy by the selection of keyword options that may be used as rule condition attributes. The script or *.sxml document contains a rule having a condition, which may represent any of the following keywords illustrated herein and labeled from top moving in a clockwise direction. The options include automated number identification (ANI); dialed number identification system (DNIS); caller identification (CallID); connection identification (Connection ID); origination identification (Origination ID); and destination identification (Destination ID). It is noted herein that CallID is the identification of a call assigned by a switch and connection ID is the identification for an event assigned by a transaction server like TS, which is known the inventor.

The remaining keyword options are date, time, and day, which may be used single or in combination as a single attribute. Used in this way, widely recognized and standard keywords may be used as conditions in routing rules executed within the strategy.

FIG. 19 is a block diagram illustrating optional tags that may be found within XStrategy script according to an embodiment of the present invention. XStrategy tags 1901 may optionally include from top right and moving in a clockwise direction, a variable (var) tag; a treatment tag; a targets tag; a target tag; a strategy tag; a rule tag; a priority tag; an attach tag; and an assign tag.

A var tag enable the script creator to implicitly declare a variable for consideration by the strategy. A treatment tag enables the script creator to specify some treatment such as interactive voice response (IVR), playing of music, or playing an advertisement. The tag targets enables the script creator to specify a set of routing targets or resources. The target tag enables the script creator to specify a single target or resource. The strategy tag enables the script creator to define and package the entire set of tags and elements as an executable document that includes all of the scripted sub-routines and elements thereof.

The rule tag enables the script creator to specify one or more rules used by a strategy. The priority tag enables the script creator to set a priority for an interaction waiting for a target or resource. The attach tag enables the script creator to specify what types of data may be attached to the routine and/or any sub-routines. The assign tag enables the script creator to assign specific values to variables.

One with skill in the art of XML extensions will appreciate that XStrategy, in addition to incorporating new constructs, may also incorporate constructs that are used in other similar languages like CCXML or VXML. Variable, for instance, is a commonly used tag. In typical use some tags are always required while some other tags are optional.

FIG. 20 is an entity relational diagram illustrating tag interrelationships and hierarchy in an XStrategy script 2000 according to an embodiment of the present invention. XStrategy script 2000 includes a strategy tag 2001, which is the parent tag in the routine. Tag 2001 has a name and a version that uniquely identifies it and separates it from other routines. Strategy tag 2001 may be launched from a generic routing script through invocation of a strategystart tag 2011. Strategystart tag 2011 has attributes src, name, and target. Src is a character that identifies the URL of the strategy document to be called. The attribute name, in this case, is the name of the variable that will receive the session name identifying the strategy. The attribute target, in this case, is the name of the target or resource that will be determined by the strategy. It is important to note herein that strategy 2001 may be invoked from a generic script by execution of the strategystart tag. Therefore, strategystart tag 2011 starts strategy 2001 from some generic script in this example.

Strategy 2001 invokes at least one rule, in this case, a rule 2002. Rule 2002 has an attribute condition (cond.), and attribute timeout, and an attribute force. The attribute condition may include one or more keywords as described above. The condition attribute is part of the condition under which the rule applies so it may include any of the previously described keywords related to routing, or it may include other keyword types related to other process types like workflow, or data management operations.

The attribute timeout provides a time limit for an interaction to wait in queue before forced routing or treatment. The attribute force provides a yes or no option in the rule for forcing routing to a specific target based on any condition. If force is set to no there is no forced routing to a specific target, rather the target is selected by other factors in the rule. If set to yes, there may be immediate forced routing to a specific target based on true or false condition.

One rule may contain other rules, which may execute serially or in parallel if there are sub-routines involved. Rule 2002 has child elements, which are the tags described further above. Each tag has its own attributes and some tags also have child elements. A tag labeled assign 2003 has the attributes name, expression (expr) and scope. Assign 2003 works hand in hand with a var tag 2004. That is to say the assign tag assigns a value to a variable tag such as tag 2004.

Name is the variable name, expression indicates the new value of the variable and may be represented as a valid IRL markup, and scope defines the scope of the variable. A single rule may have more than one assign tag. Likewise, one rule may carry more than one variable 2004. Var 2004, like assign 2003 includes the attributes name, expr, and scope defined identically to those same attributes in assign 2003.

Rule 2002 may optionally include a tag labeled herein as a priority tag 2005. Tag 2005 can be used to set a priority in queue for the interaction being routed by the strategy. Priority may be based on any number of static or dynamically discovered criteria including identification, payment history, interaction history, and so on. The priority setting value is generally a number such as from 1-10, for example. Another attribute in the priority tag is increment, which allows for a timed increase in priority. For example, every 60 seconds, a priority value may be incremented by 1. In that case a priority of value=1 will be a priority of value=10 in the span of 9 minutes.

Rule 2002 may optionally include one or more tags attach 2006. Attach tag 2006 is used to attach some data to the interaction routing notification or to the event itself if supported by the media type and platform environment. Tag 2006 has attributes key and value, which cooperate as a key/value (KV) pair for retrieving and attaching data to the interaction.

The SXML sample below illustrates the process of data attach to an interaction.

```
<strategy version="0.1" name="Example 14
<!-- Attaching Data to the Interaction -->">
    <rule cond="DNIS=5108632549">
        <targets vq="">
            <attach key="customer_age"
                value="XData[dbserver1,Procedure,Retrieve_Age,
                param=account]"/>
            <target name="2283@SF.A" type="agent"" />
        </targets>
    </rule>
</strategy>
```

Rule 2003 may optionally include a tag 2007 labeled Targets. Targets tag 2007 defines a set of more than one target such as several agents sharing a queue. Tag 2007 includes the attributes virtual queue (vq), wait, and even. Vq identifies the name and address of the queue the agents are working from. The attribute wait defines a time for waiting in queue, and the attribute even contains one or more statistical values that enable interactions to be evenly distributed among the several targets within the target set. A sample of SXML using a target set may appear as follows:

```
<strategy version="0.1" name="Example 2">
    <rule cond="(Day>=Monday & Day<=Friday) & (Time > 9:00 &
    Time < 18:00)"
        timeout="30s" >
        <priority value="10" />
        <treatment type="Mandatory" name="Music" time="15s"
        port="20" />
        <targets vq="">
            <target name="2503" type="agent" />
            <target name="2504" type="agent" />
            <target name="2506" type="agent" />
        </targets>
    </rule>
</strategy>
```

Targets tag 2007 may have child elements assign, var, priority, attach, and targets. A set of targets 2007 defines more than one target, labeled herein as target tag 2008. Target set 2007 may optionally include one or more than one treatment, illustrated herein as treatment tag 2009. A treatment may include playing music, playing a voice advertisement, or some other type of automated treatment applied during an interaction while the interaction is waiting for a target and so on. There may be two different types of treatments, mandatory treatments and busy treatments. Mandatory treatments are always delivered before an interaction is routed to a final target. A busy treatment occurs during a wait time such as waiting in queue.

Treatment tag 2009 includes attributes type, name, time, and optionally, port. Type identifies the treatment as mandatory or busy. Name specifies the method of treatment such as ring back, silence, or busy treatment. The following sample SXML illustrates application of more than one sequential treatment specifying type, method and time of each treatment.

```
<strategy version="0.1" name="Example 15">
<!-- Using Treatments -->
  <rule cond="date=10/15/96">
    <targets vq="">
      <targets vq="">
        <treatment type="Busy" name="RingBack" time="10s"/>
        <treatment type="Busy" name="Silence" time="10s"/>
        <treatment type="Busy" name="Busy" time="5s"/>
        <target name="2311" type="agent" />
        <target name="2309" type="agent" />
      </targets>
    </targets>
  </rule>
```

A treatment may optionally include a method of playing music or some other audible presentation such as an advertisement. In this case the attribute port may be included to specify the port or source location of the audible presentation to be played, for example, while the interaction is waiting in queue for availability of a target agent. The following SXML fragment illustrates use of a music treatment.

```
<strategy version="0.1" name="Example 16">
<!-- Using Treatment Music -->
  <rule cond="date=10/15/96">
    <targets vq="">
      <targets vq="" >
        <treatment type="Mandatory" name="Music" time="10"
          port="1200"/>
        <target name="2309" type="agent" />
      </targets>
    </targets>
  </rule>
</strategy>
```

Rule 2002 may have a single target tag rather than a declared set. A target tag 2008 has the attributes name, type, expression, and weight. Tag 2008 specifies a single target. The name attribute specifies the name of the target. The attribute type specifies the type or class of the target. The target type may include, but is not limited to agent (A), agent place (AP), queue (Q), group of agents (GA), group of places (GP), routing point (RP), and skill. The attribute server in target tag 2008 specifies the name of a statistics server. This attribute is used for targets having a skill type associated with them wherein that skill indication may be used in routing consideration (skill-based routing). The attribute expression in tag 2008 specifies the "skill" expression used for skill-based routing. The attribute weight sets a percentage value for routing among several targets.

One with skill in the art of object modeling will recognize that rule 2002 including associated tags and attributes may be constructed in other configurations with relation to child elements and attribute mix and definition without departing from the spirit and scope of the present invention. For example, some attributes are mandatory while other attributes are optionally included. Likewise, new tags and attributes may be provided without departing from the spirit and scope of the present invention. Moreover, the strategy routines of the present invention may be provided with fewer tags and attributes than illustrated herein without departing from the spirit and scope of the present invention.

XStrategy (SXML) enables a programmer to represent routing routines and treatments uniformly across multiple routing systems and platforms by expressing those routines in primitive constructs that may be easily associated to the analogous constructs understood by those routing systems. In this way, one routine may be applied to more than one routing program and may even apply to more than one media type. In an embodiment wherein generic routing protocols are enhanced by creating and implementing SXML routines, the tags, which invoke the new routines are embedded and are understood by the routing scripts already in use. Many different routing platforms may be abstracted to perform routing of events according to a single or similar set of abstract routing rules.

The concept of the present invention is to provide on base language markup that may be used to create or enhance event routing scripts, web service scripts, and workflow management scripts whereby the capabilities of lookup and retrieval of resources and data are transferred to the system performing the actual work.

FIG. 21 is a block diagram 2100 illustrating a relationship between XStrategy (SXML) and other generic languages according to another embodiment of the present invention. Interaction Routing Designer 2103 is a design tool known to the inventor for representing routing information including graphics. An IRD strategy is expressed in the form of IRD XML 2102. That is to say that IRD 2103 may be used to create IRD XML representing an IRD Strategy, or an IRD strategy may be imported into the interface, typically a graphics user interface (GUI) from separately created IRD XML. This is indicated in the example by a double arrow labeled (1).

IRD XML 2102 then is an interchangeable format language for representing all of IRD functionality including workflow control including graphics representation. It should be noted herein that the goals of IRD XML and XStrategy are quite different. XStrategy provides among other things, a natural extension of CCXML and VXML for the purpose of enabling those regimens to capture rich contact center functionality. It provides target and resource lookup procedure capabilities base on interpretation of external data such as data and time, and interaction attributes according to rule. This extra added value enhancement is absent from generic IRD strategies.

In typical practice, an IRD strategy whether created by the designer or incorporated therein from external IRD XML, is transferred into a more abstract interaction routing language (IRL) 2104, which is also known to the inventor. A directional arrow labeled (2) illustrates this action. The IRD XML notation is oriented towards an exchangeable format rather than towards a routing language. For this reason it reflects a graphics structure of an IRD strategy including embedded tags for representing graphical data on a computer screen.

IRL 2104 is then transferred into an internal binary format and subsequently is recorded into a configuration server 2105 as illustrated by a directional arrow labeled (3). At this point router 2106 may access server 2105, read the strategy, and enact the strategy during interaction routing. In one embodiment, IRD XML may simply be transferred directly into IRL but the graphics components are lost tin the transformation. This action is represented in this example by a directional arrow (5)

Use of XSLT script or another language transformation tool enables XStrategy to be transferred directly into IRL, generally with a one-to-one construct equivalence. This option is illustrated in this example by arrow (6). XStrategy 2101 may likewise be transformed directly into a valid subset of IRD XML as is illustrated by the arrow labeled (7).

It may be apparent to a skilled artisan that SXML may be used as a base extension to IRL and has an intelligent enhancement to CCXML/VXML regimens without departing from the spirit and scope of the present invention. SXML routines for intelligent routing may be tagged onto existing less intelligent CCXML routines, for example, by embedding a start tag into the CCXML routine. It may be created as an abstract base language or as an extension to an existing XML-based language without departing from the spirit and scope of the present invention.

In one embodiment, XStrategies are standalone strategies. In another embodiment, they are integrated into existing strategies to enhance those strategies. In still another embodiment, XStrategies may server as abstract base strategies for creating Web services and workflow management routines. In one embodiment, SXML server as added routines to existing CCXML and VXML that would otherwise not be available. One embodiment includes use of transaction server communication to carry XStrategies between systems such that the actual notation in integrated with TS script.

The method and apparatus of the present invention should be afforded the broadest of scope under examination. The spirit and scope of the present invention is limited only by the claims that follow.

What is claimed is:

1. A method for supplementing an interaction processing routine comprising:
    identifying, by a processor, an attribute associated with an interaction;
    executing, by the processor, the interaction processing routine for routing the interaction, the interaction processing routine including an embedded tag;
    executing, by the processor, the embedded tag in the interaction processing routine;
    invoking, by the processor, a rule in response to executing the embedded tag, wherein the rule is selected based on the identified attribute;
    assembling, by the processor, a routing script based on the invoked rule; and
    executing, by the processor, the routing script for controlling the routing of the interaction during the interaction processing routine, wherein the routing script is executed concurrently with the interaction processing routine.

2. The method of claim 1, wherein the interaction processing routine and the routing script are executed concurrently in run-time.

3. The method of claim 2, wherein the interaction processing routine adheres to a first programming language that is different from a second programming language of the routing script.

4. The method of claim 1, wherein the assembling operation comprises selecting an existing routing script according to the rule and the identified attribute.

5. The method of claim 1, wherein the assembling operation comprises dynamically assembling the routing script from primitive constructs according to the rule and an attribute associated with the interaction.

6. The method of claim 1, wherein the rule comprises a plurality of sub-rules.

7. The method of claim 1, wherein the attribute comprises a condition, timeout data, and forced routing data.

8. The method of claim 1, wherein the executing of the routing script includes executing the routing script as assembled without routing language conversion.

9. The method of claim 1 further comprising:
    transforming, by the processor, the routing script from a first programming language to a second programming language to generate a transformed routing script; and
    outputting, by the processor, the transformed routing script for execution.

10. A system comprising:
    a processor; and
    a non-transitory memory, wherein the memory has stored thereon instructions that, when executed by the processor, causes the processor to:
        receive information corresponding to an interaction;
        execute a first routing script for routing the interaction, the first routing script including an embedded tag;
        execute the embedded tag in the first routing script;
        invoke a rule in response to executing the embedded tag, wherein the rule is selected based on the information corresponding to the interaction;
        assemble a second routing script based on the invoked rule; and
        execute the second routing script for controlling the routing of the interaction, wherein the second routing script is executed concurrently with the first routing script.

11. The system of claim 10, wherein the first routing script adheres to a first programming language and the second routing script adheres to a second programming language different from the first programming language.

12. The system of claim 11,
    wherein the second programming language comprises an extensible markup language (XML), and
    wherein the first programming language comprises at least one of voice extensible markup language (VXML), call control extensible markup language (CCXML), or interaction routing language (IRL).

13. The system of claim 12, wherein the second programming language comprises XStrategy extensible markup language constructs.

14. The system of claim 11, wherein the second routing script enables routing routines that are unavailable in the first programming language.

15. The system of claim 10, wherein the instructions further cause the processor to:
    transform the second routing script from the second programming language to the first programming language; and
    output the transformed routing script for execution.

16. The system of claim 10, wherein the instructions further cause the processor to:
    receive an output in response to executing the second routing script; and invoke a third routing script in response to the output, wherein the third routing script is executed concurrently with the executing of the interaction processing routine.

17. The method of claim 1 further comprising:

receiving, by the processor, an output in response to executing the routing script; and invoking, by the processor, a second routing script in response to the output, wherein the second routing script is executed concurrently with the executing of the interaction processing routine.

\* \* \* \* \*